(12) United States Patent
Bricaud et al.

(10) Patent No.: US 7,066,748 B2
(45) Date of Patent: Jun. 27, 2006

(54) SMART CARD CONNECTOR WITH SLIDER

(75) Inventors: Herve Bricaud, Dole (FR); David Ferraton, Crissey (FR); Yves Pizard, Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/220,517

(22) Filed: Sep. 7, 2005

(65) Prior Publication Data

US 2006/0057892 A1    Mar. 16, 2006

Related U.S. Application Data

(63) Continuation-in-part of application No. PCT/EP2004/050163, filed on Feb. 19, 2004.

(30) Foreign Application Priority Data

Mar. 10, 2003   (FR)   .................................... 0302939

(51) Int. Cl.
*H01R 13/62*   (2006.01)
(52) U.S. Cl. .................................... 439/159
(58) Field of Classification Search ......... 439/152–160
See application file for complete search history.

(56) References Cited

FOREIGN PATENT DOCUMENTS

| EP | 0 468 146 | 1/1992 |
|----|-----------|--------|
| FR | 2 633 754 | 1/1990 |
| WO | WO 02/089040 | 7/2002 |

*Primary Examiner*—Javaid H. Nasri
(74) *Attorney, Agent, or Firm*—Peter Van Winkle

(57) ABSTRACT

A smart card connector with a slot into which a smart card can be inserted, includes a slide assembly (251) that initially receives the smart card and moves the card forward to a fully installed operating position, and that can be moved to move the smart card a distance rearward to a retracted position and allows the rear card end to be easily pulled out of the connector. The slide assembly includes a card holding slider (500) that includes a sheet metal plate that lies under the card, and a retention bar (524) at the rear end of the plate that abuts the rear edge of the card. When the slider has been moved rearward to a retracted position, the retention bar can be lowered by bending the sheet metal plate, so the card can be grasped and pulled out. The slide assembly also includes a slidable carriage (250) that is mounted at one side of the card-receiving slot and connected to the slider to move with it, that is urged rearward by a coil spring (254), and that is coupled to a double click mechanism on the housing.

16 Claims, 101 Drawing Sheets

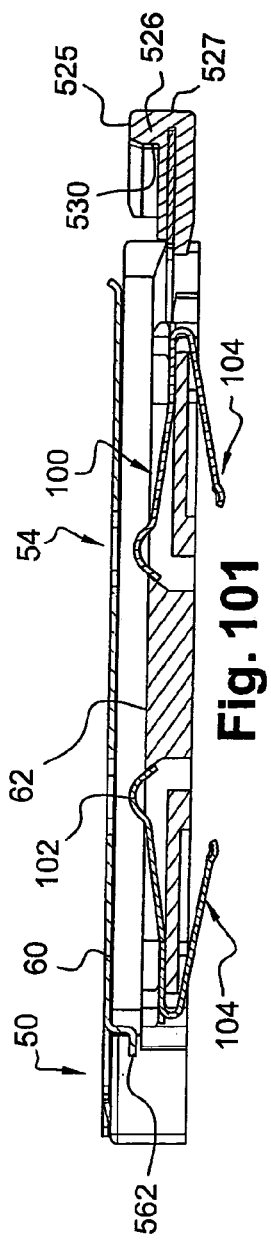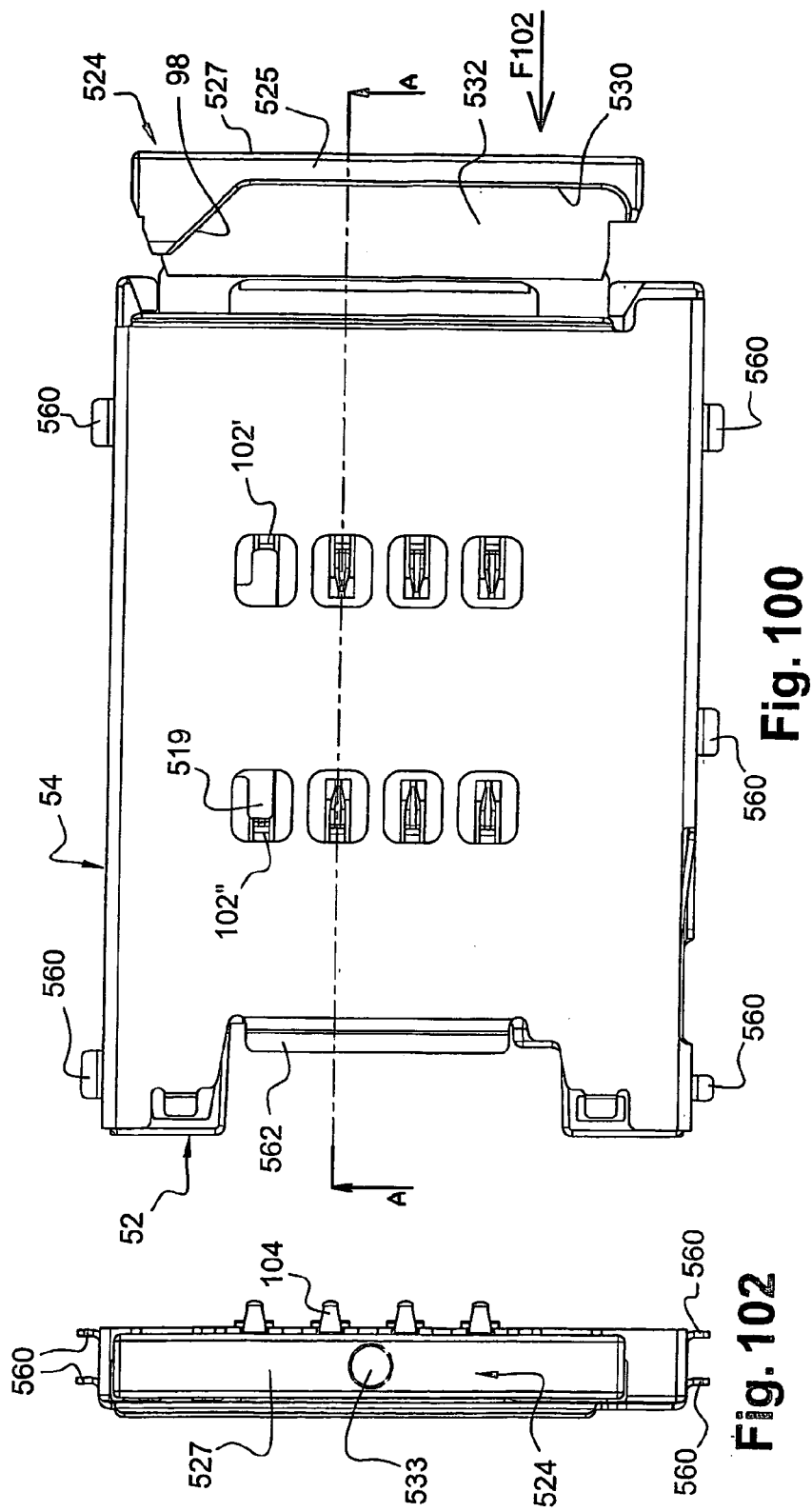

US 7,066,748 B2

SMART CARD CONNECTOR WITH SLIDER

CROSS-REFERENCE

This is a continuation-in-part of PCT application PCT/EP2004/050163 filed on 19 Feb. 2004, which claimed priority from French application 0302939 filed 10 Mar. 2003.

BACKGROUND OF THE INVENTION

A smart card is a card of about the size of a credit card or smaller, and that has an embedded memory chip connected to contact pads on the lower face of the card. One type of connector for reading information into or out of such a card, has a card-receiving slot into which the card can be inserted. The card is pushed forward until the card reaches an operating position wherein contact blades of the connector engage the contact pads of the card. The connector requires means for guiding forward card movement, for holding the card in the operating position, and for later moving the card rearward to a rest or extraction position at which a person can move the card out of the connector, all in a simple and low cost manner.

SUMMARY OF THE INVENTION

In accordance with one embodiment of the present invention, a smart card connector is provided of the type that has a housing forming a card-receiving slot that receives a card inserted forwardly to an operating position. The connector includes a slide assembly that slides forward and rearward with the card, and that has a retention bar that lies at the rear of the card. The retention bar is urged toward an upward retention position wherein the bar lies directly behind, or rearward of, the card rear end. This allows the retention bar to abut the card rear end to push the card forward and to retain the card in its fully inserted operating position. However, when the slide assembly is moved rearward to a retraction position, the retention bar is downwardly deflectable to a release position that is largely below the card rear end, wherein it eliminates or reduces any obstruction directly rearward of the card to allow the card to be easily removed.

The slide assembly includes a resilient sheet or plate that lies facewise against the lower face of the card and that slides forward and rearward with the card. The retention bar is fixed to the rear end of the sheet. The resilient sheet is bendable about a lateral axis, to lower and raise the retraction bar. A means is provided in the path of retraction bar lowering, to prevent the bar from being lowered until the slider has moved rearward of its operating position. Such a means can be provided by equipment such as a circuit board that is used with the connector and that has a part that lies under the retention bar only in the forward operating position of the slide assembly. The retention bar can form a barrier of small height that lies against only a lower portion of the card rear end in the operating position, and a ramp the extends at a rearward-upward incline behind the barrier of small height.

The novel features of the invention are set forth with particularity in the appended claims. The invention will be best understood from the following description when read in conjunction with the accompanying drawings.

BRIEF DESCRIPTION OF THE DRAWINGS

FIG. 100 is a top view of an alternative embodiment of a connector according to the invention for a MICROSIM card, the contact blades of which have output ends of the "solderless" type;

FIG. 101 is a longitudinal sectional view on line A—A of FIG. 100;

FIG. 102 is an end view looking along the direction of the arrow F102 in FIG. 100.

DESCRIPTION OF THE PREFERRED EMBODIMENTS

1. Limited Description of the Invention

Figure 2:
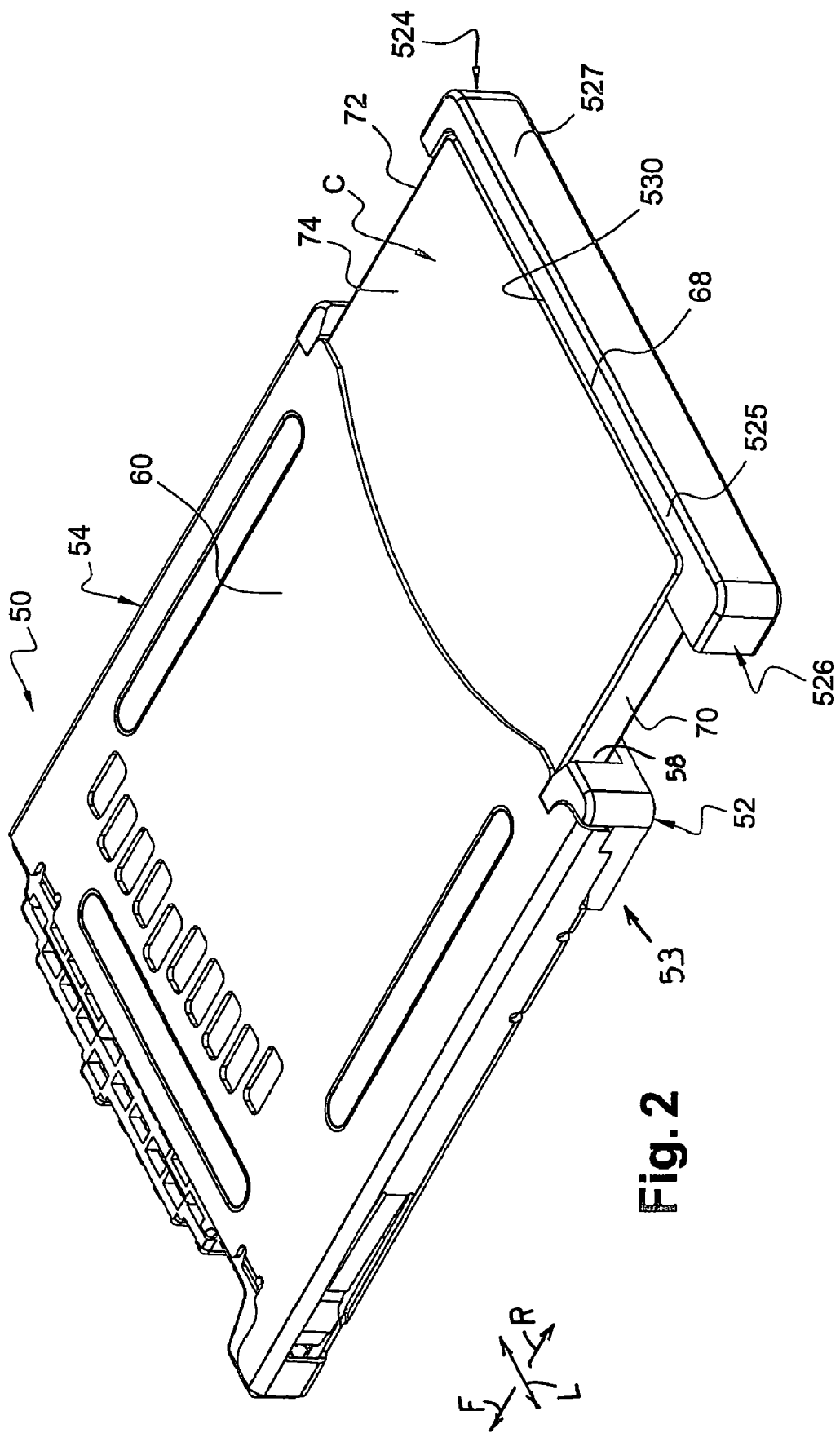
FIG. 2 is a top left rear isometric view illustrating a connector according to the invention, which is shown with a card in the operating position.
Figure 10:
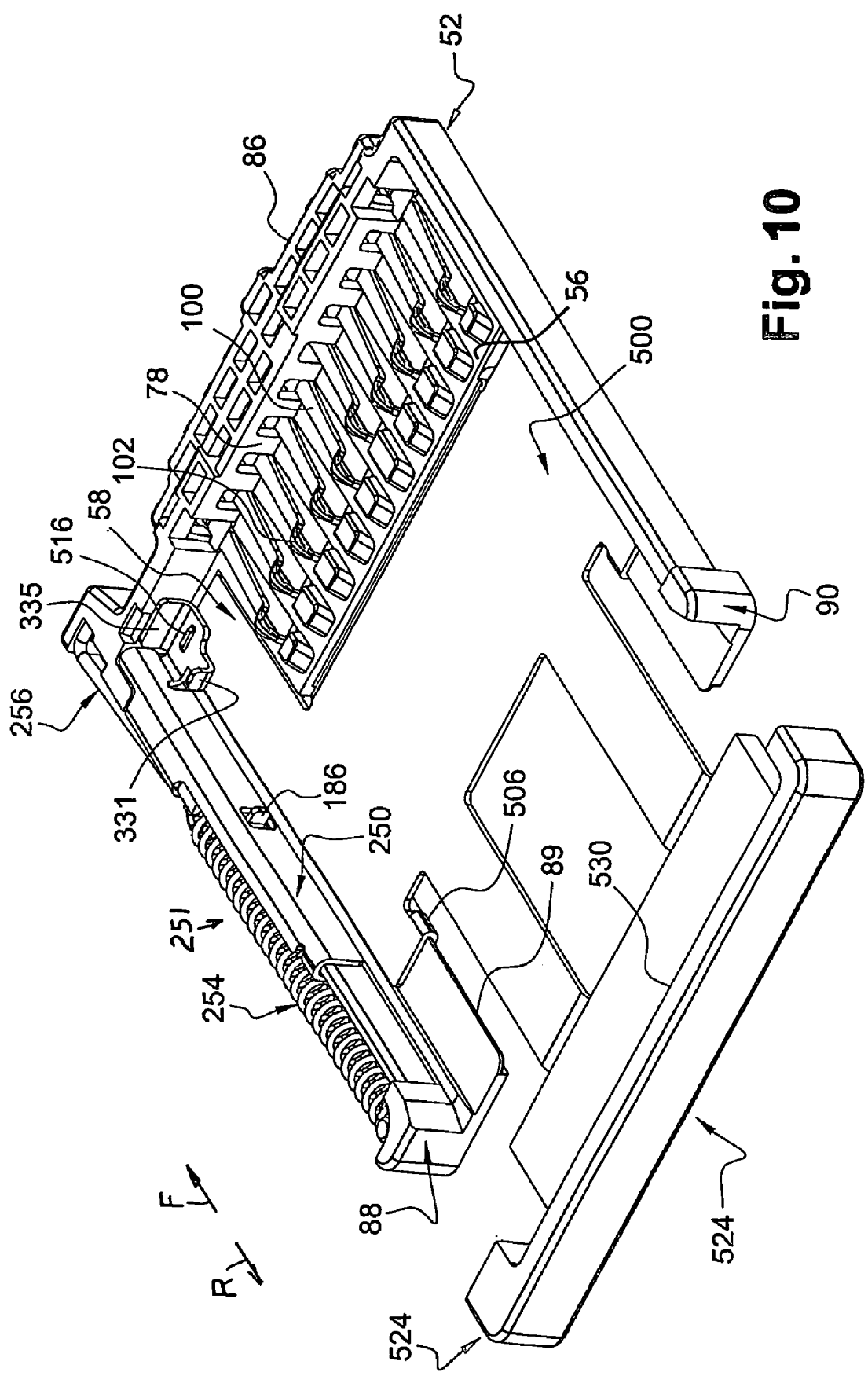
FIG. 10 is a view similar to the previous one, at another viewing angle
Figure 11:
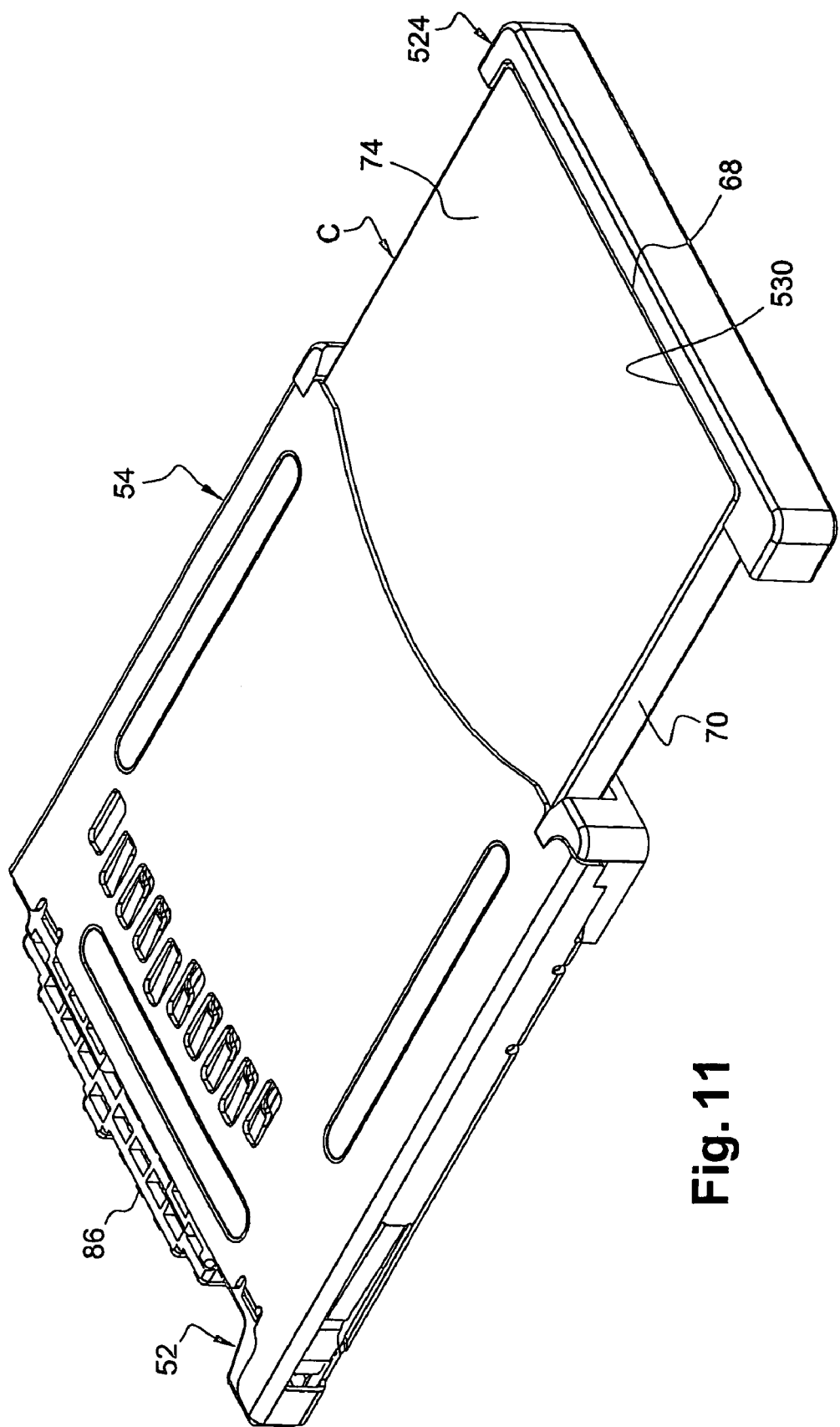
FIG. 11 is a view similar to that of FIG. 2, in which the card and the slide assembly are shown in the retracted, or ejected rear position, with the gate-forming retention bar in the raised position.

FIG. 2 illustrates a card connector 50 which has a housing 53 that forms a card-receiving slot 58 for receiving a smart card C. The slot has a small vertical thickness on the order of magnitude of a millimeter, while the lateral width of the slot is a plurality of times greater. The card has been inserted into a slide assembly and the slide assembly has been pushed forwardly F to an operating position. FIG. 10 shows that the slide assembly 251 includes a slider 500 that comprises a sheet or plate that lies under the card and slides with it, and a carriage 250 that lies beside the card-receiving slot and that is biased rearwardly R by an ejection spring 254. The carriage and slider are connected together to slide together by a finger 516 formed in the rear of the slider that projects upward into a slot in a side extension of the carriage. However, the slider 500 and carriage 250 are separately guided in front and rear sliding.

Figure 1:
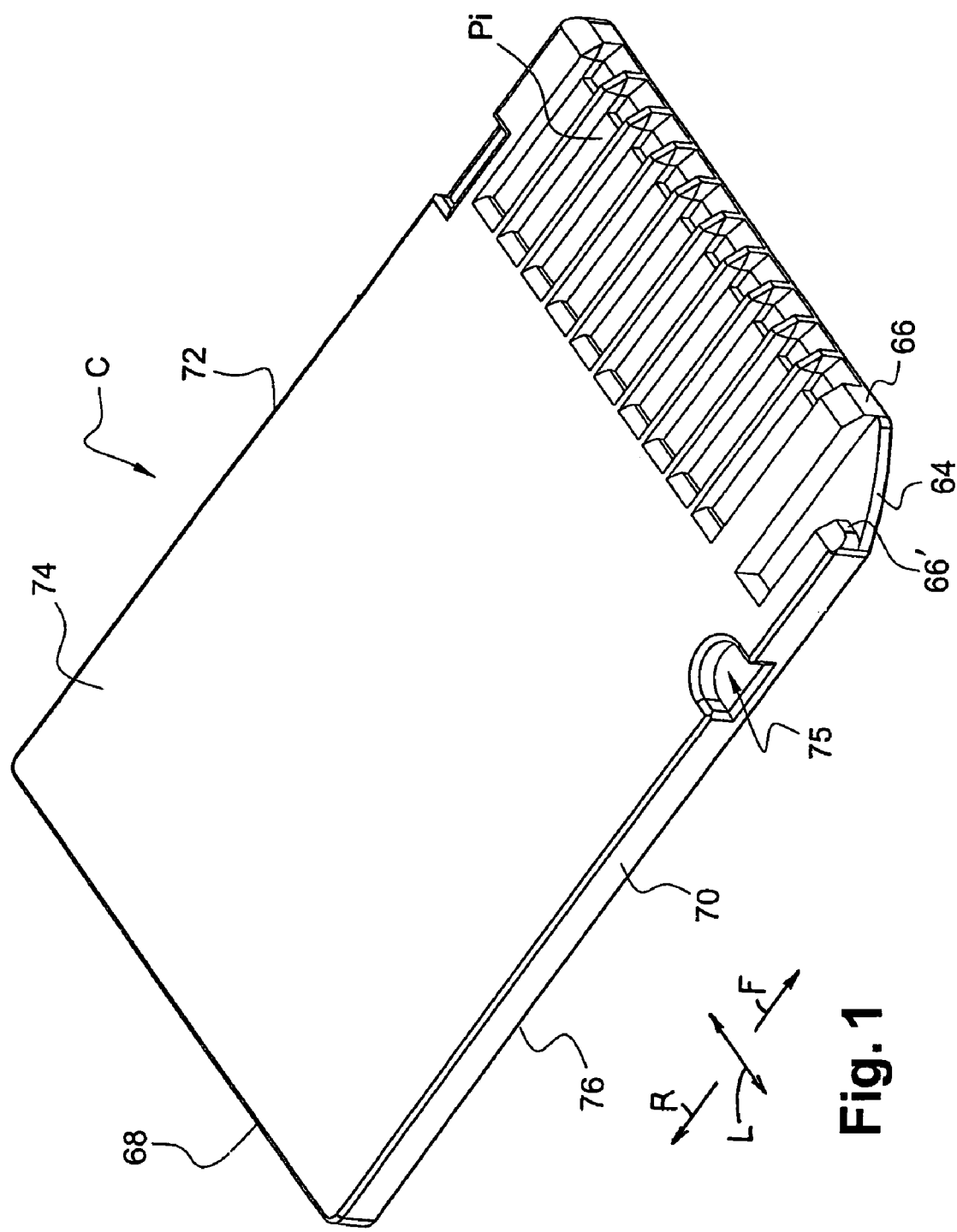
FIG. 1 is a bottom left front isometric view of a Memory Stick Duo card.

The connector includes an insulative support 52 and a plurality (here there are ten) of blade contacts 100 mounted on the insulative support. The blade contacts have pad-engaging ends 102 that engage contact pads of a card that lies in an operating position. The particular connector illustrated in FIG. 10 is designed to receive a "Memory Stick Duo", or MSD memory card of a type sold by Sony, and which is illustrated in FIG. 1. The card has a bottom face 74 with front and rear ends or edges 66, 68, with transversely or laterally L spaced opposite sides 70, 72, and with a notch 75 in one side. The front of the card has a front edge part at 66 and has a setback at 66'. The front edge of the card can be engaged by a tab 335 (FIG. 10) on the carriage, and the setback of the card can be engaged by a drive branch 331 on the carriage.

Figure 7:
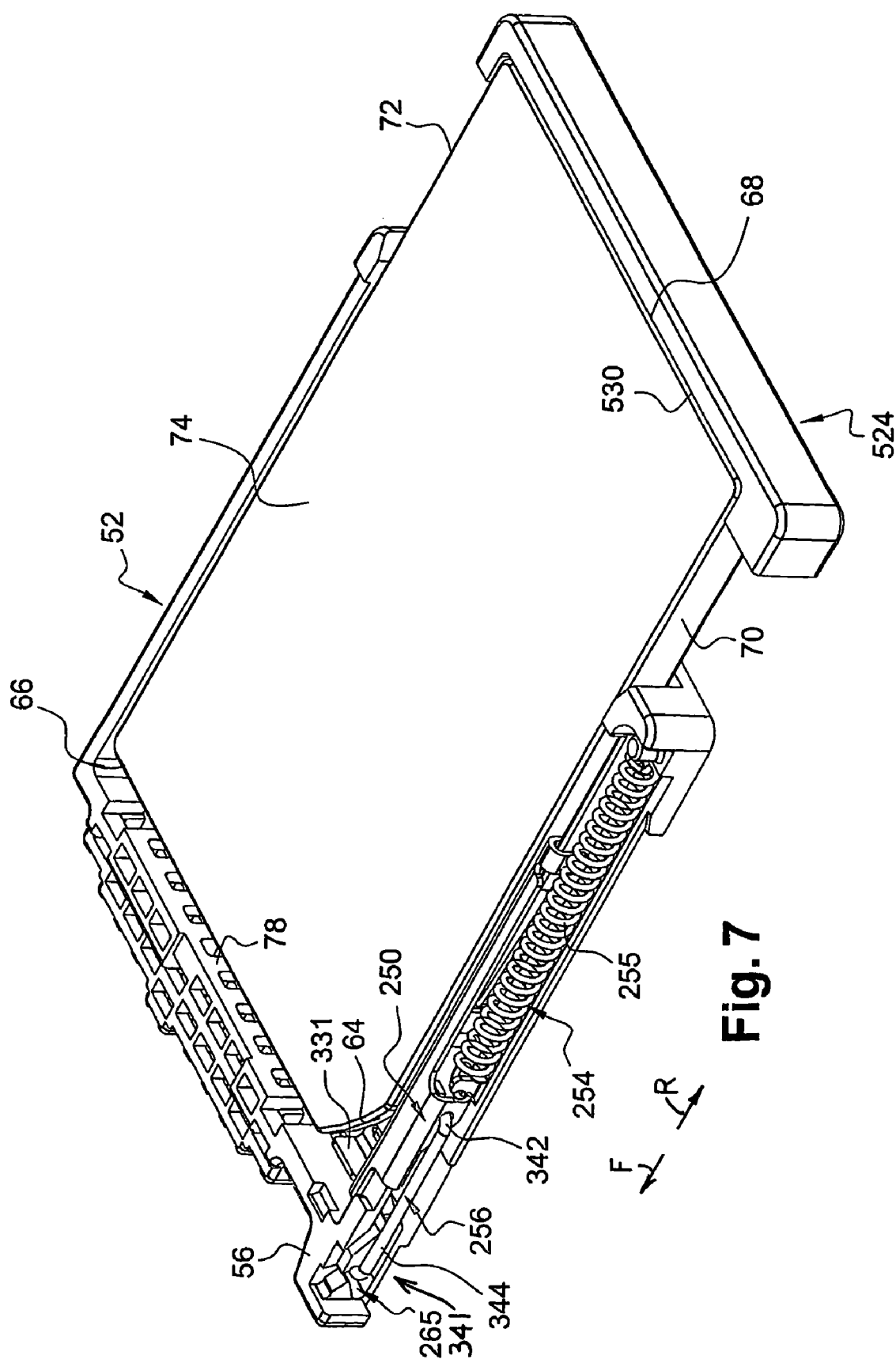
FIG. 7 is a view similar to that of FIG. 2, without the protective cover.
Figure 8:
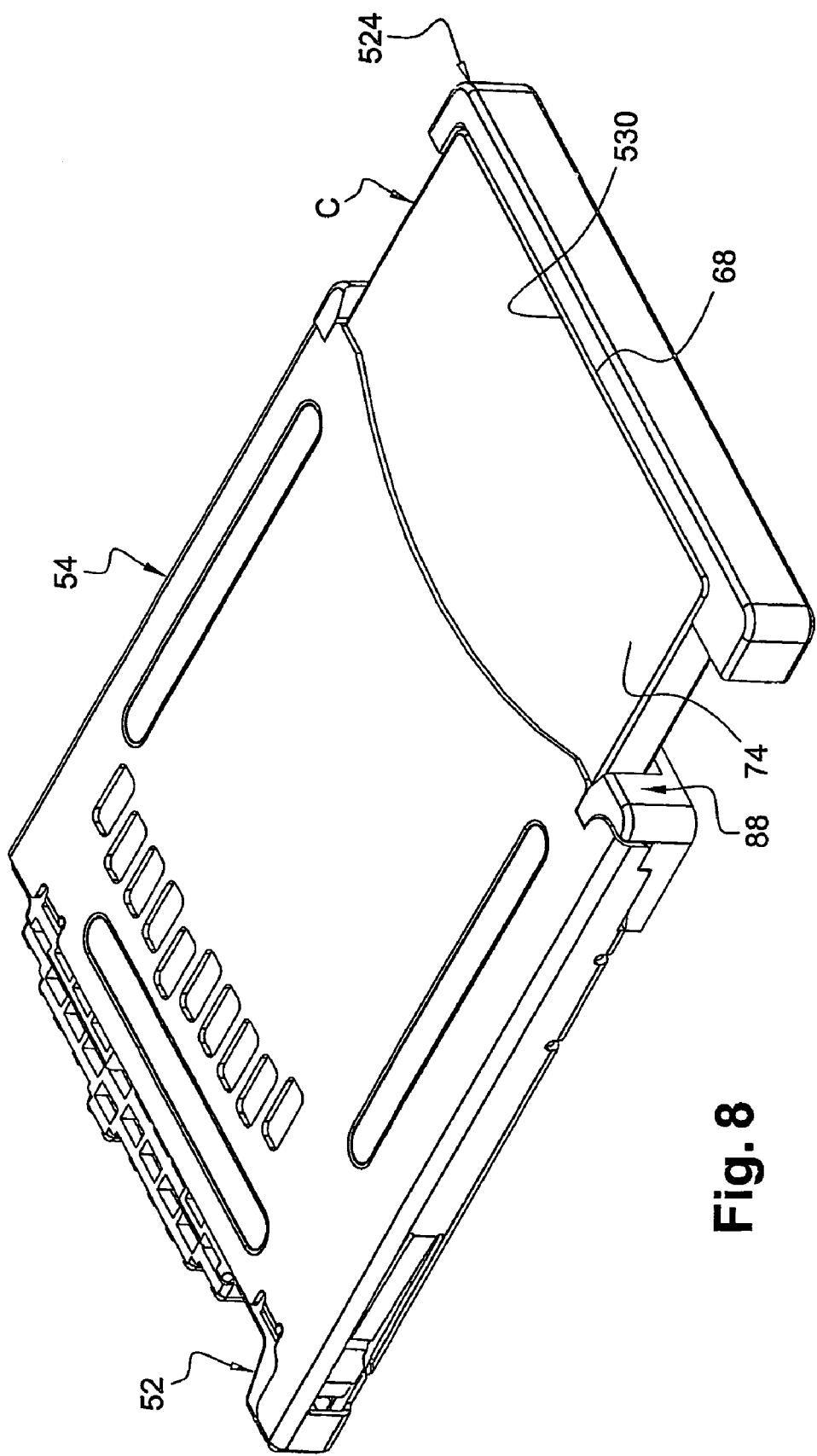
FIG. 8 is a view similar to that of FIG. 2, in which the card-holder carriage and the card are in the pushed-in position, which is the position of maximum forward travel during insertion, for the purpose of locking or unlocking.
Figure 12:
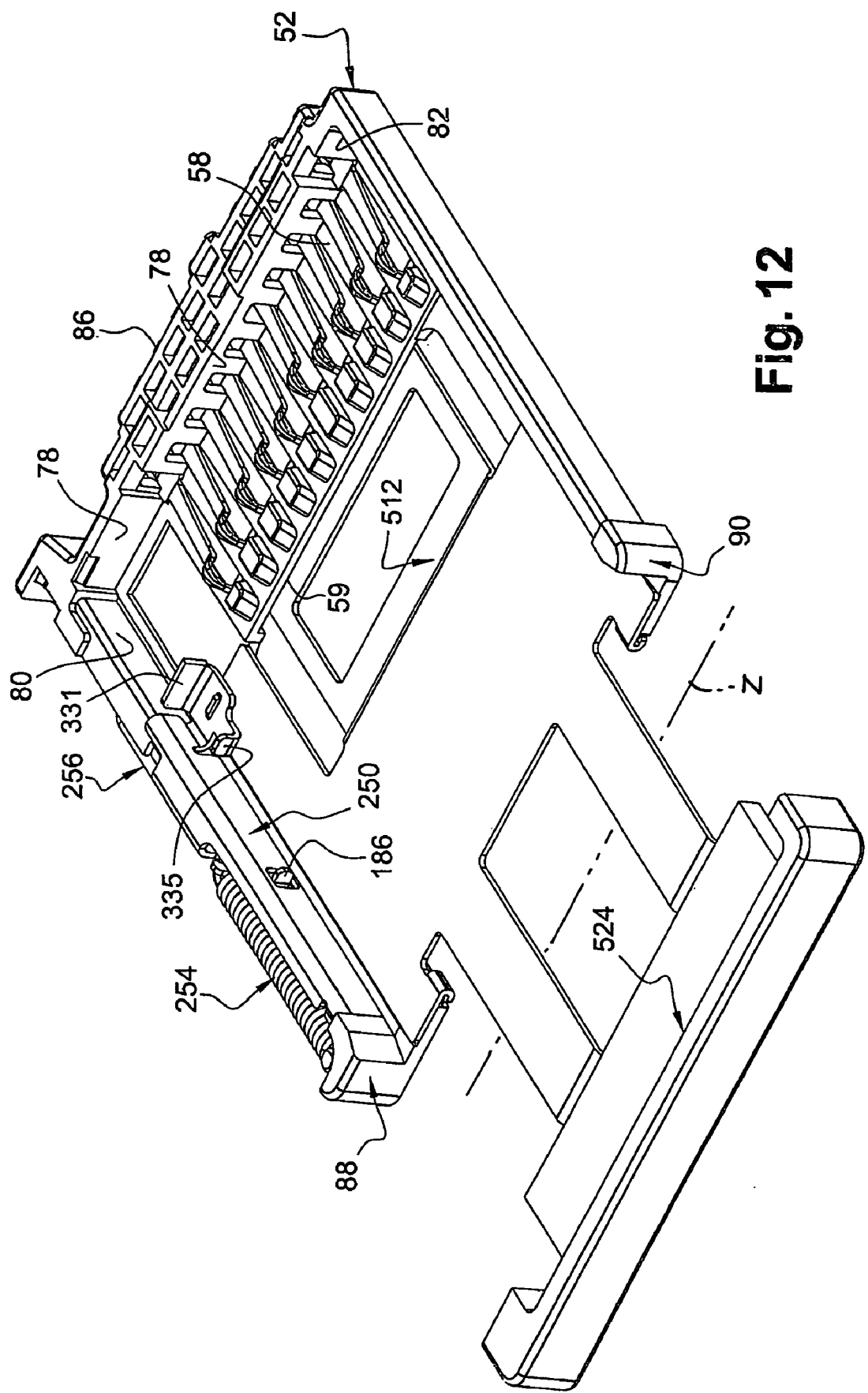
FIG. 12 is a view similar to that of FIG. 10, in which the carriage is in the retracted position.
Figure 13:
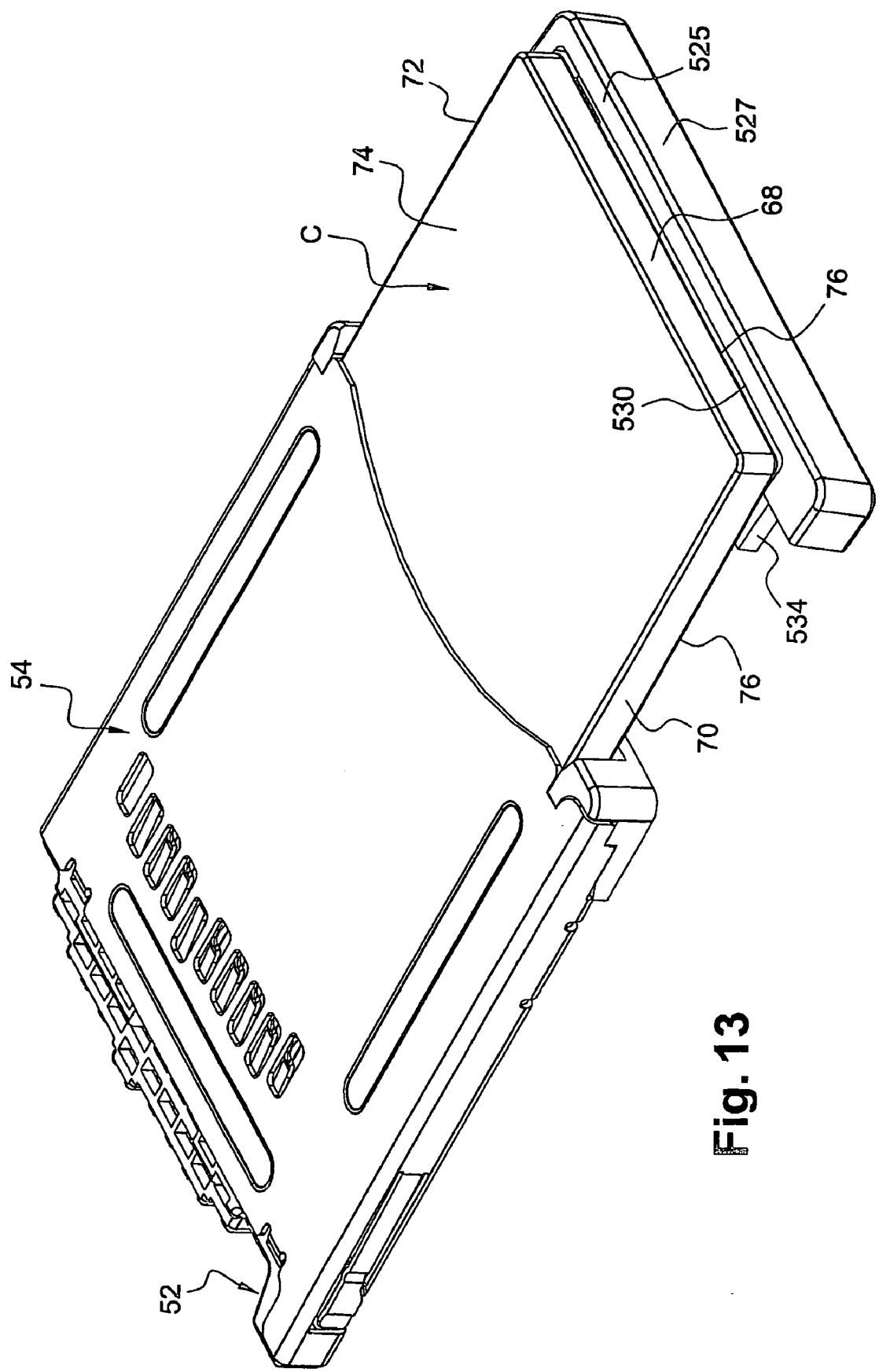
FIG. 13 is a view similar to that of FIG. 2, in which the card and the slide assembly are shown in the retracted position with the gate-forming retention bar in the lowered position.
Figure 14:
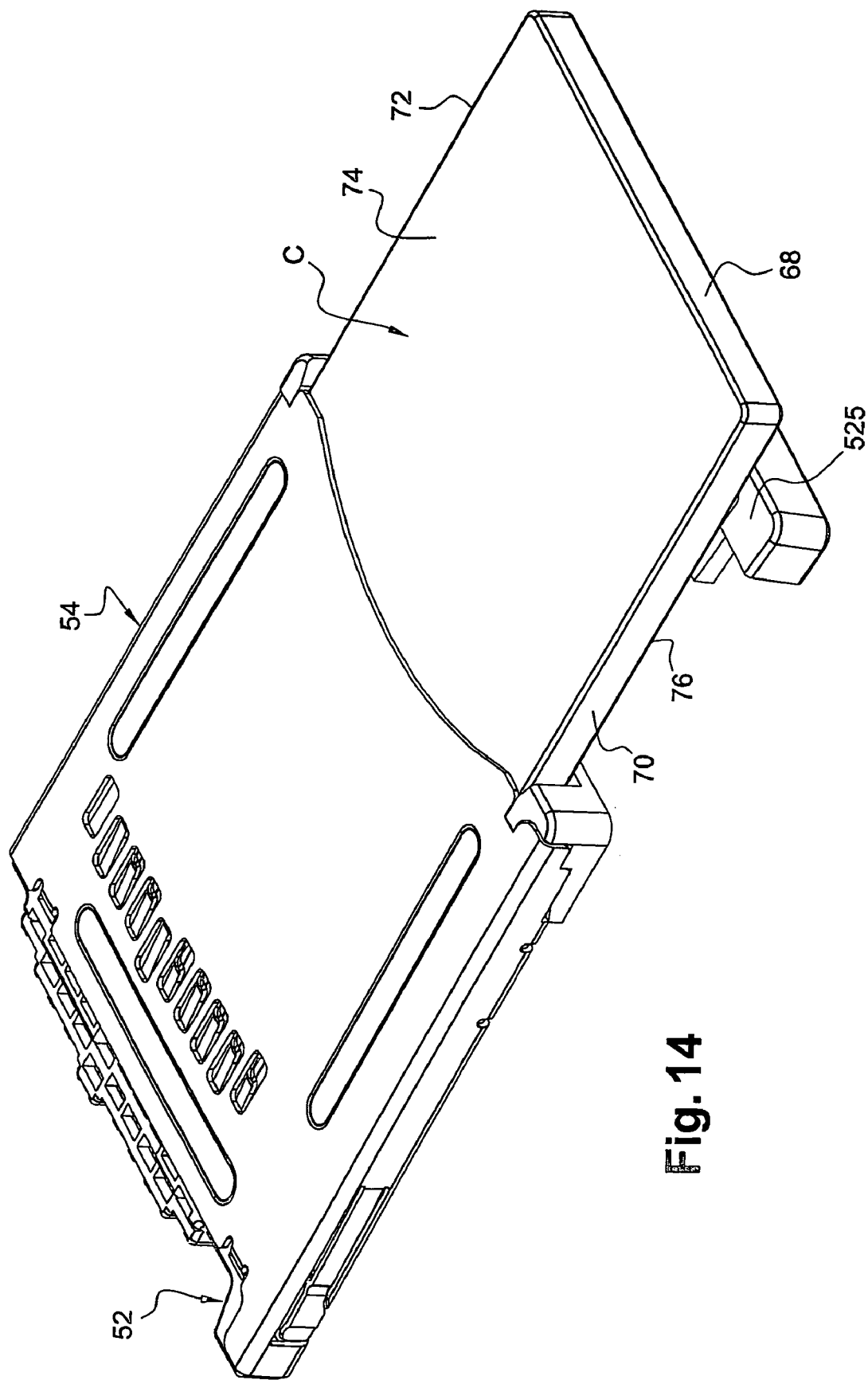
FIG. 14 is a view similar to that of FIG. 2, in which the card and slide assembly are in the retracted position, the bar in the lowered position and the card in a partially extracted position.
Figure 15:
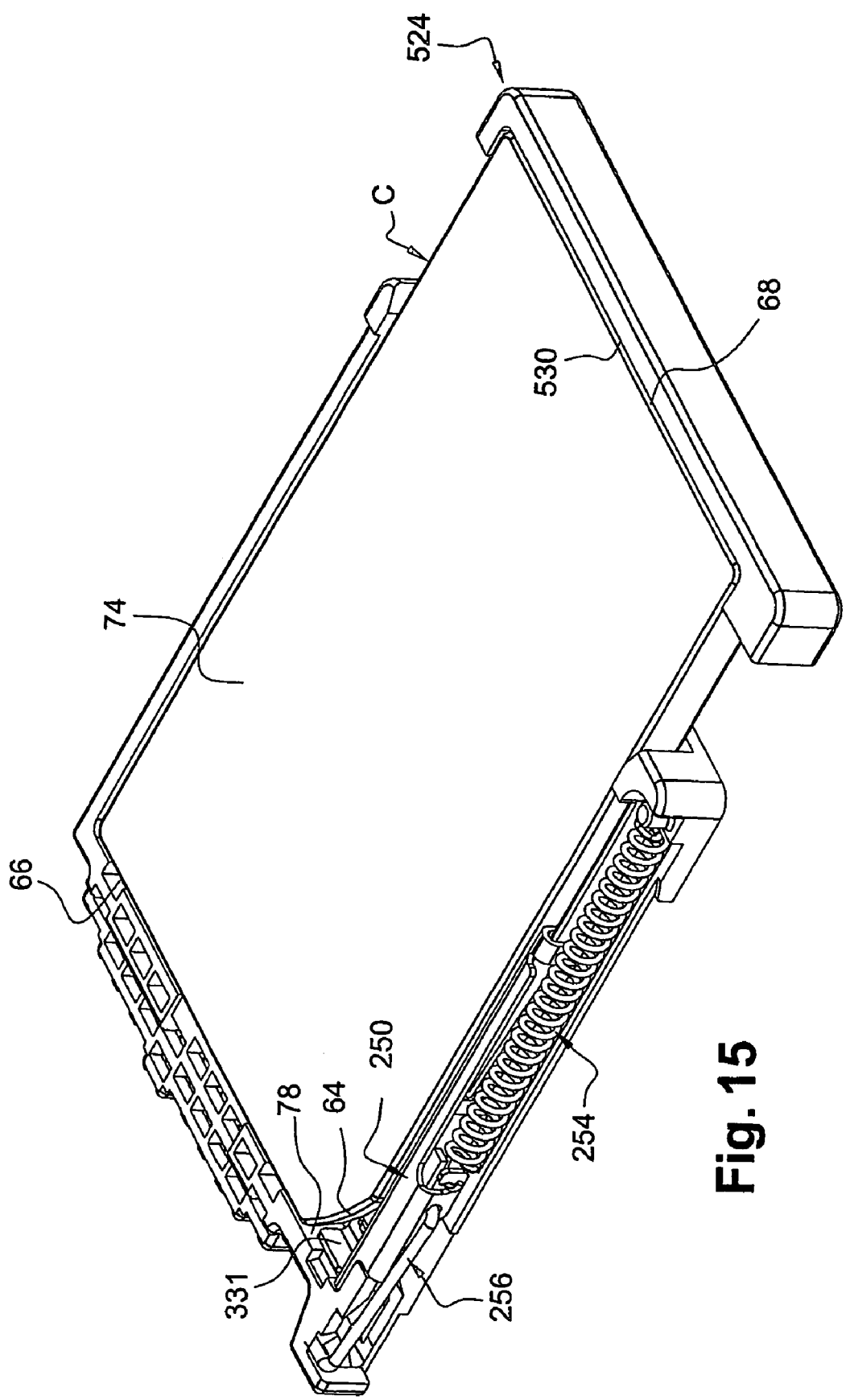
FIG. 15 is a view similar to that of FIG. 8, without the protective cover.
Figure 16:
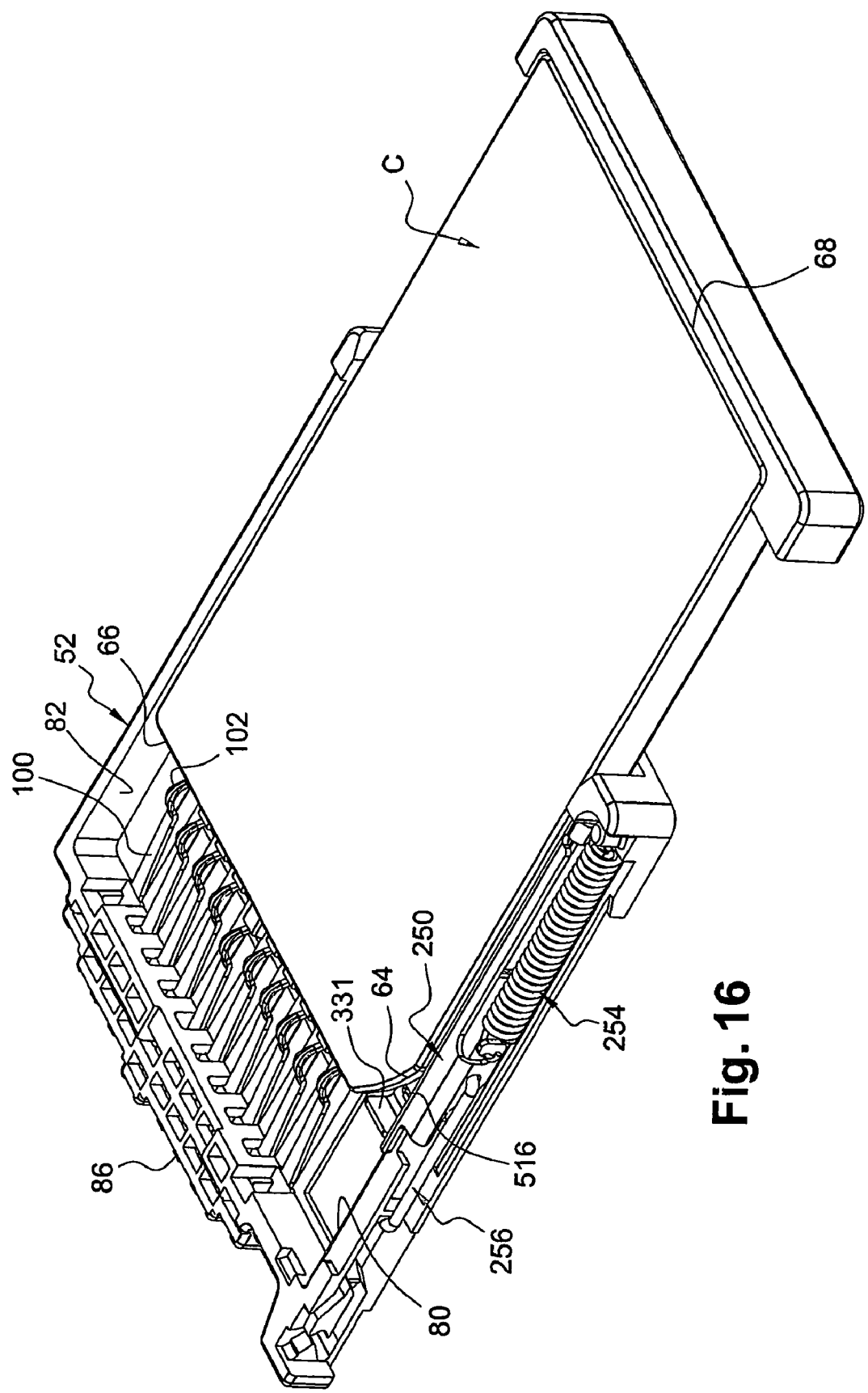
FIG. 16 is a view similar to that of FIG. 11, without the protective cover.
Figure 17:
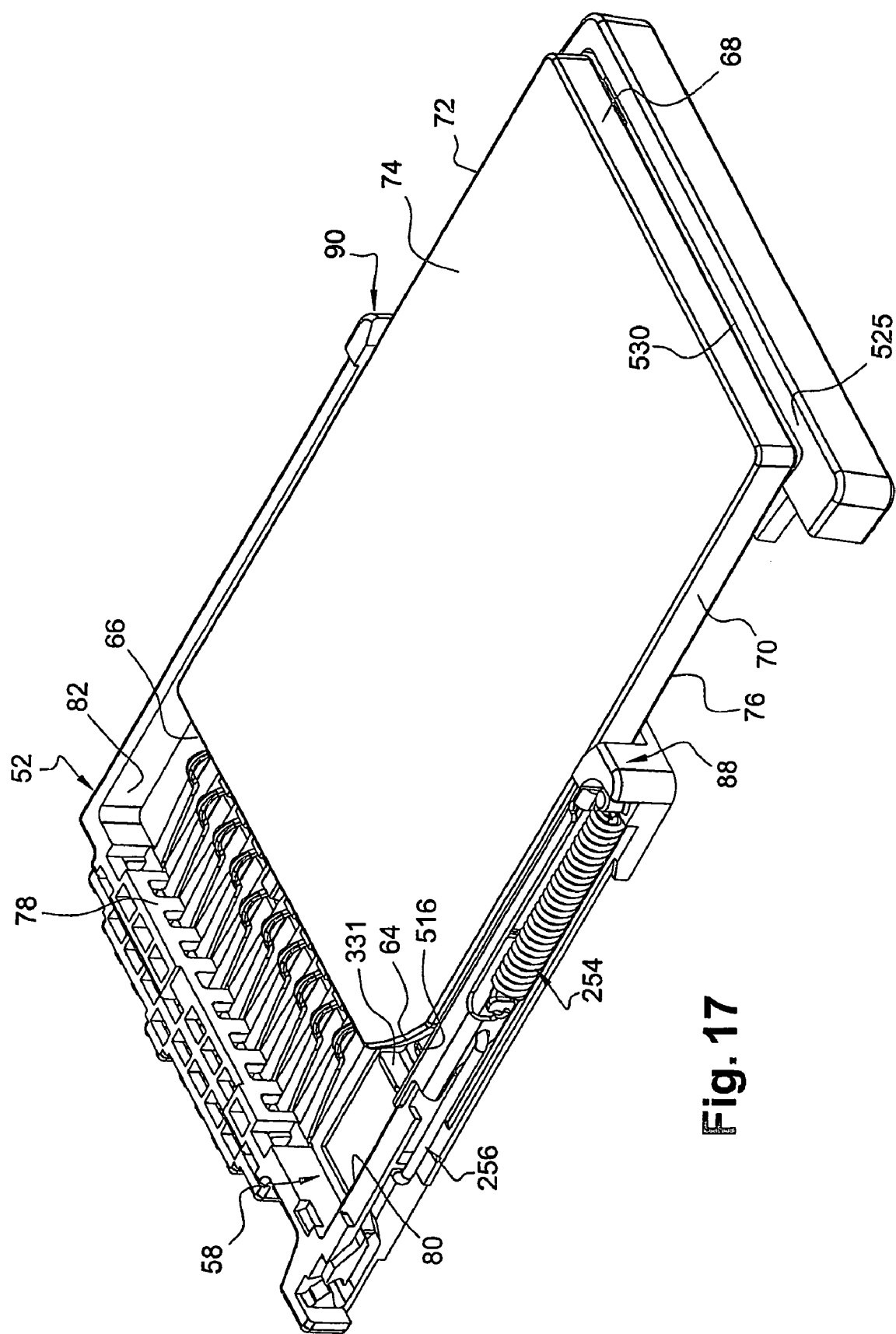
FIG. 17 is a view similar to that of FIG. 14, without the protective cover.
Figure 18:
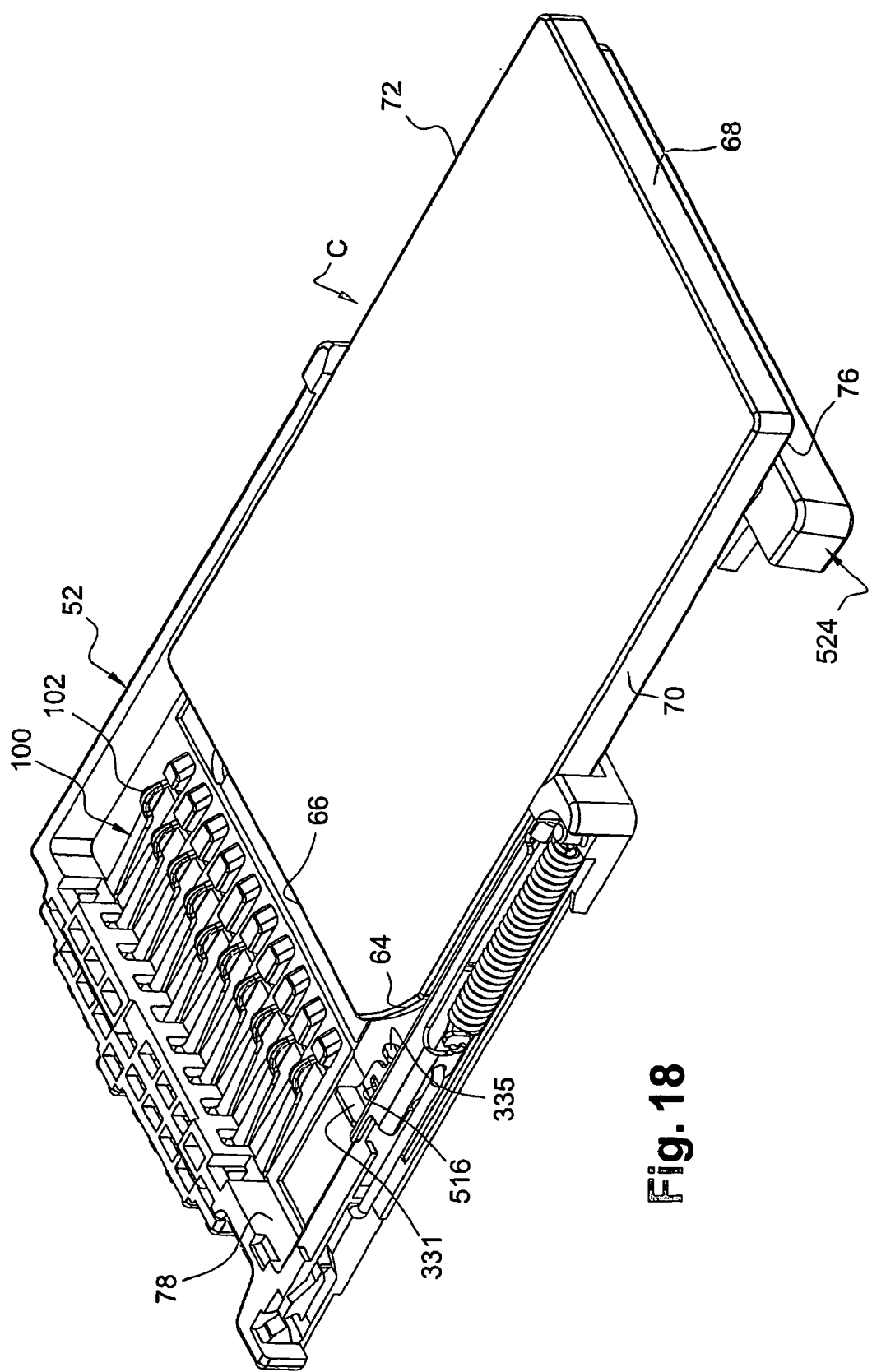
FIG. 18 is a view similar to that of FIG. 14, without the protective cover.

FIG. 7 shows that the carriage 250 is connected to the front end of an assembly or carriage spring 254 which biases the carriage rearwardly R. A double click mechanism 341 couples the carriage to the insulative support of the housing. This type of mechanism, which is well known, includes a heart-shaped cam 265 and a wire member with a rear end 342 pivotally mounted in the housing and a front end that lies in the groove formed by the heart-shaped cam. The first time the carriage is pushed forward, the mechanism latches the carriage in the forward operating position, which is a few millimeters rearward of the extreme forward position. The next time that the carriage is pushed forwardly by about two millimeters, the mechanism releases the carriage to move rearward by at least half a centimeter to a rearward release or retracted position. In the retracted position the rear of the carriage abuts a stop formed by the rear of an arm 88, as shown in FIG. 12.

Figure 28:
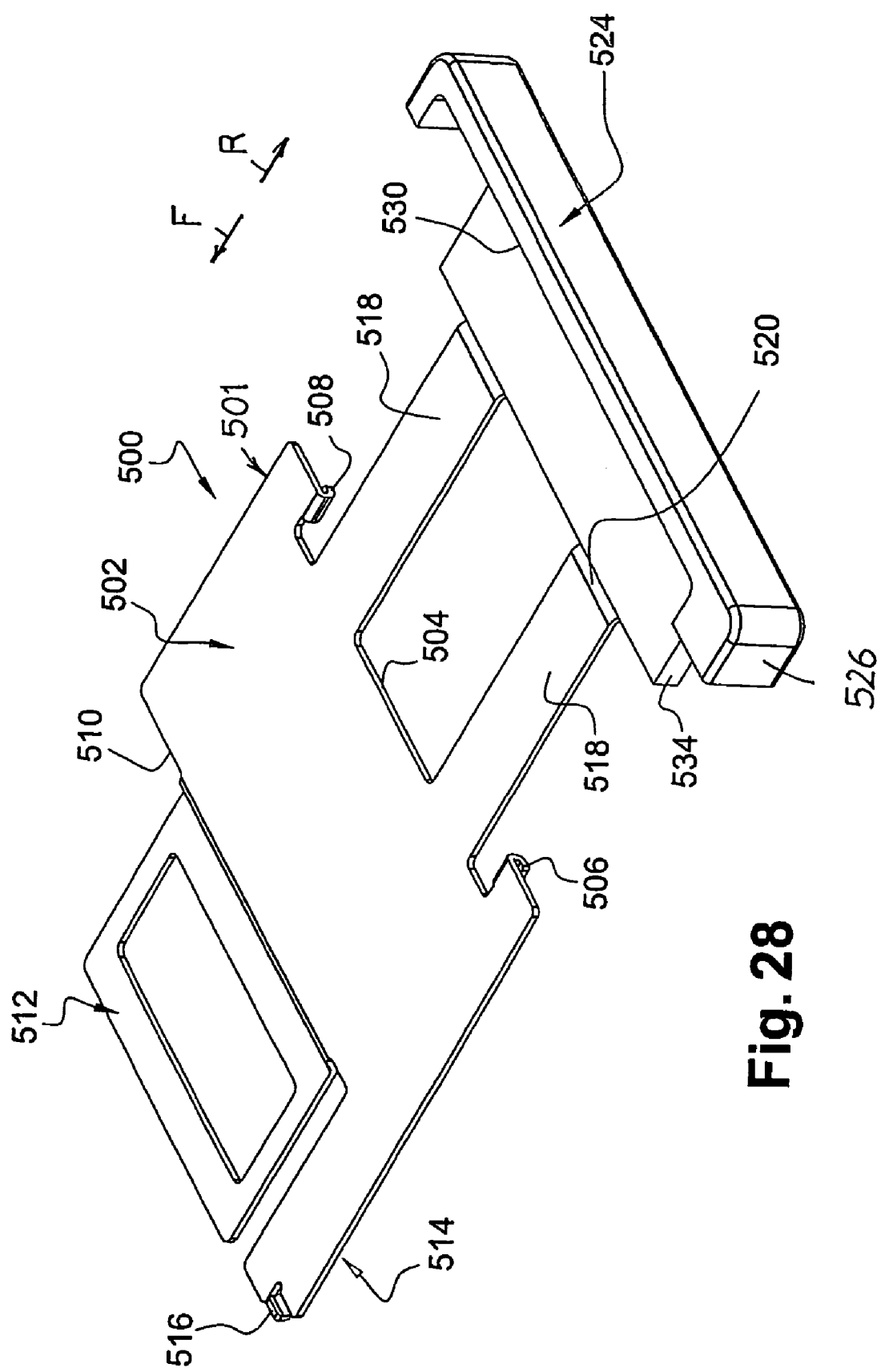
FIG. 28 is a view of the slider of FIG. 9 with its gate-forming rear bar, this bar being shown in its high rest position towards which it is elastically returned.
Figure 29:
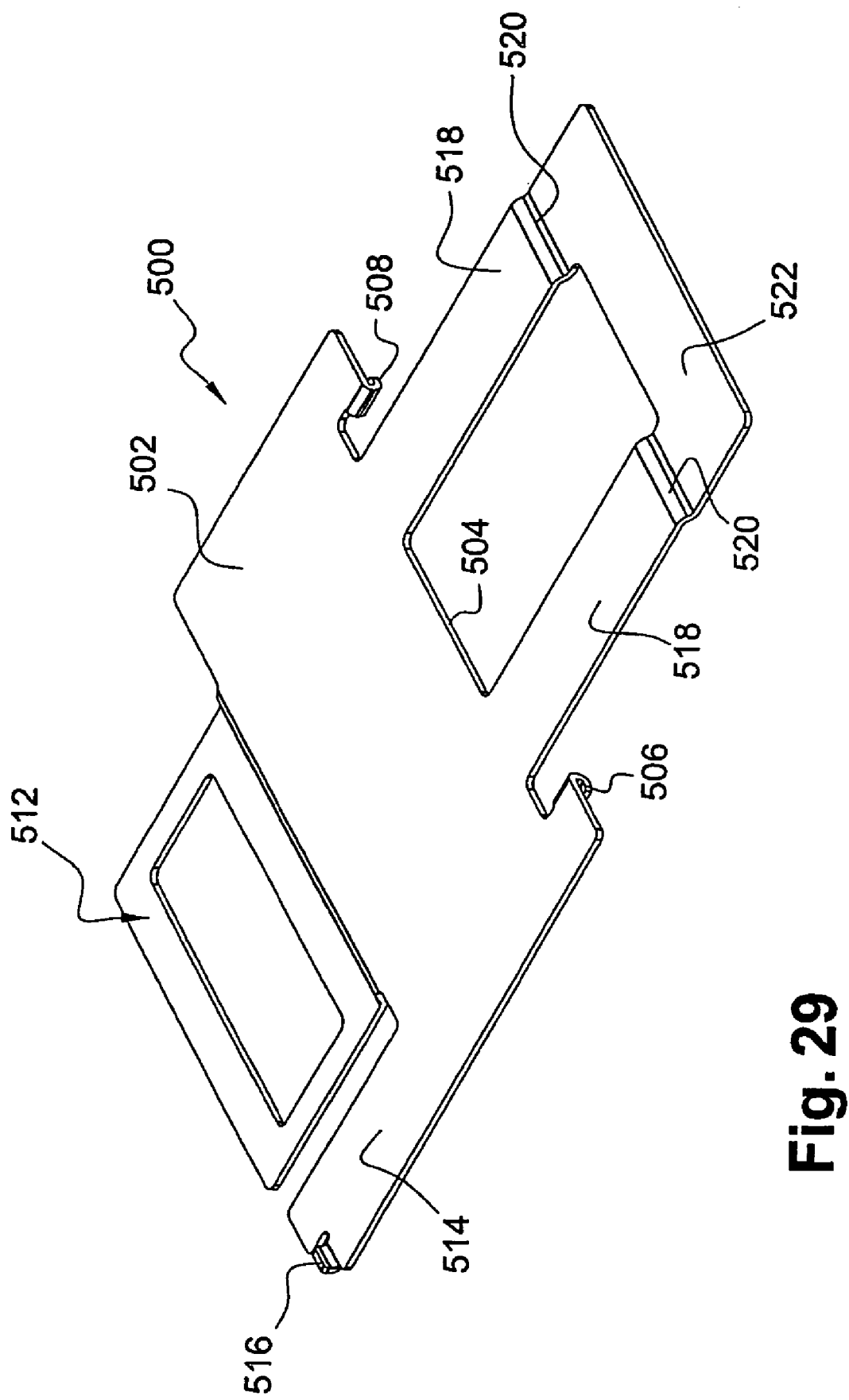
FIG. 29 is a view similar to that of FIG. 28 of just the slider.
Figure 30:
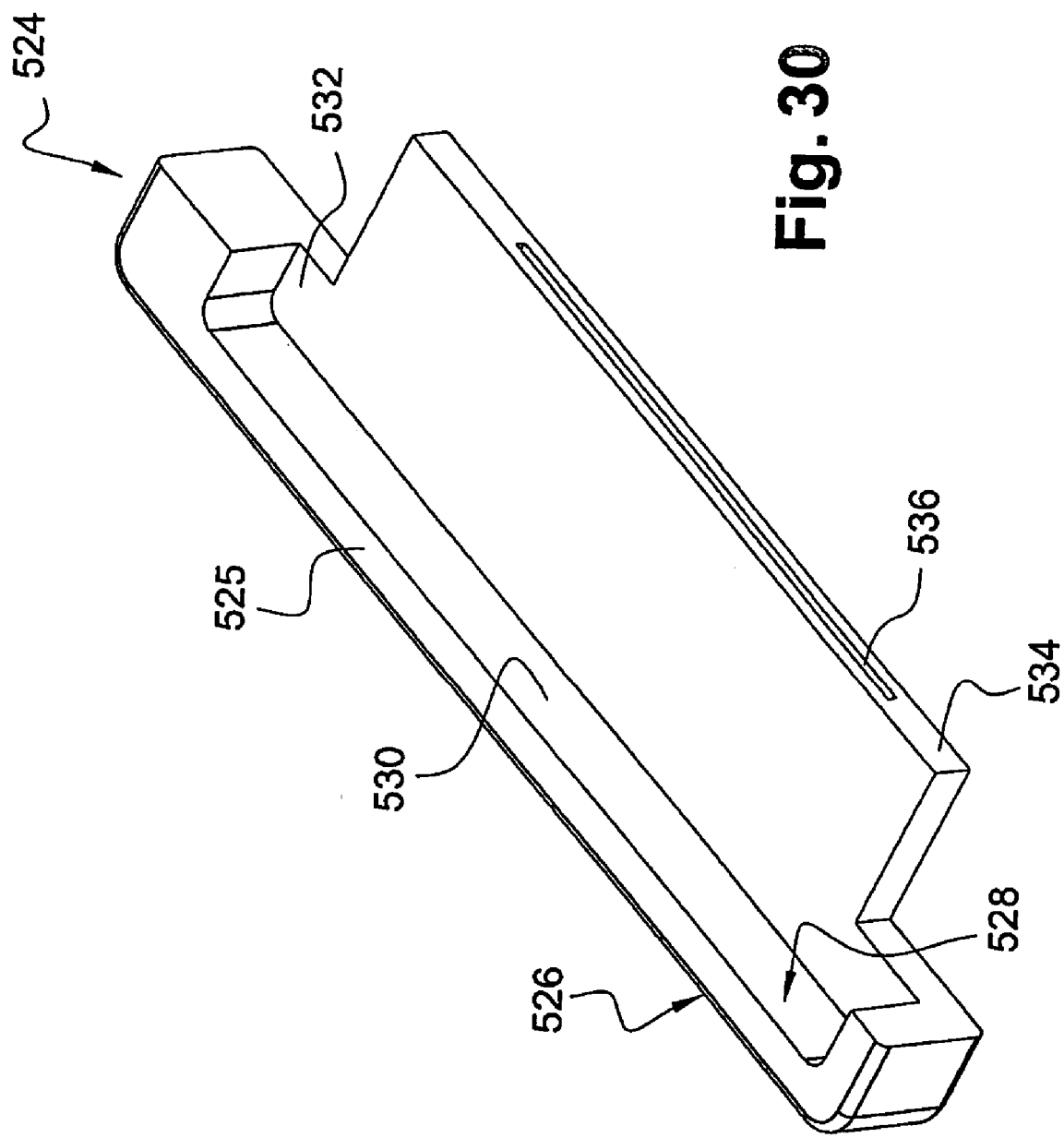
FIG. 30 is a rear isometric view of the gate-forming bar.
Figure 31:
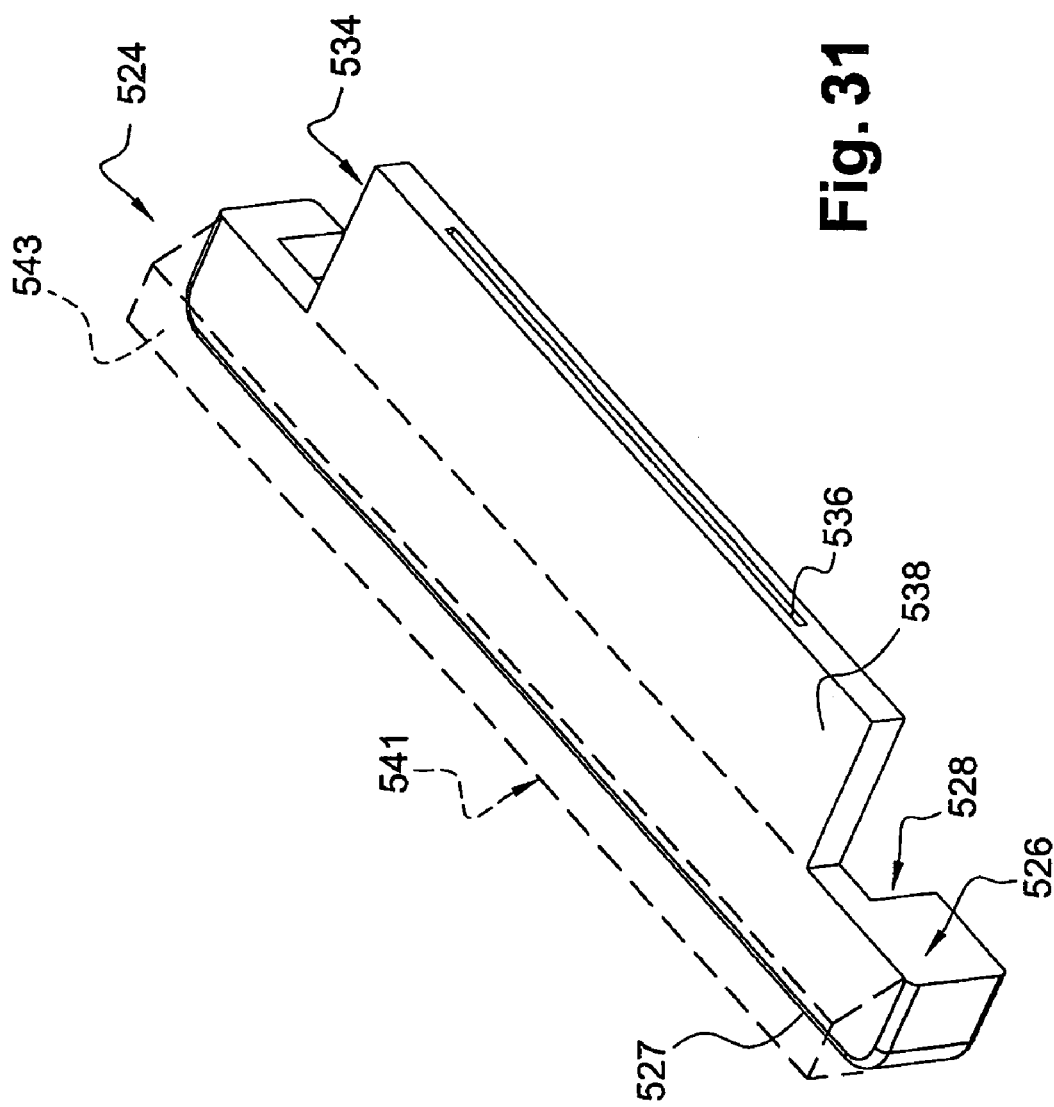
FIG. 31 is a bottom view of FIG. 30.
Figure 32:
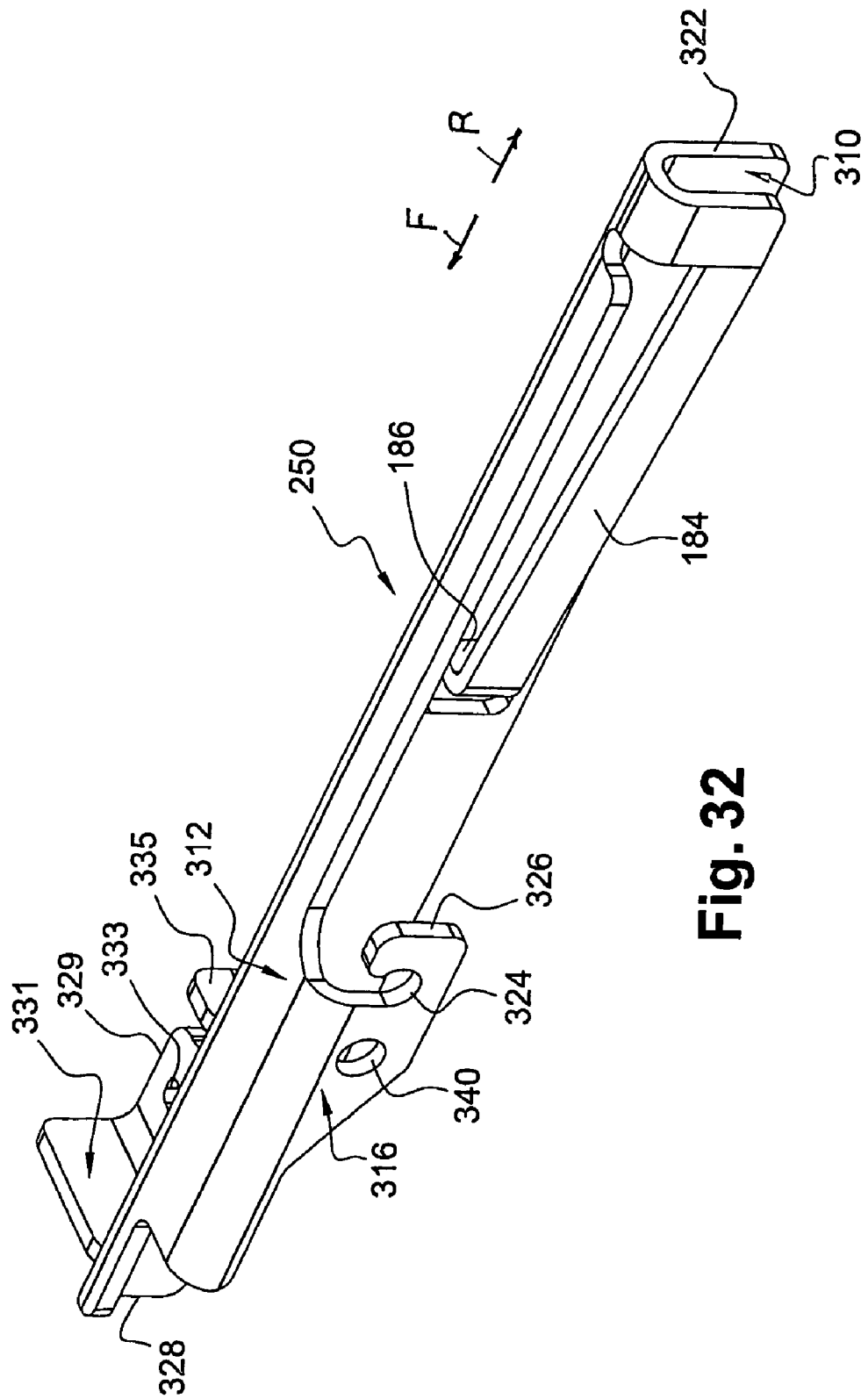
FIG. 32 is a view of just the ejection slide or carriage of FIG. 9.
Figure 33:
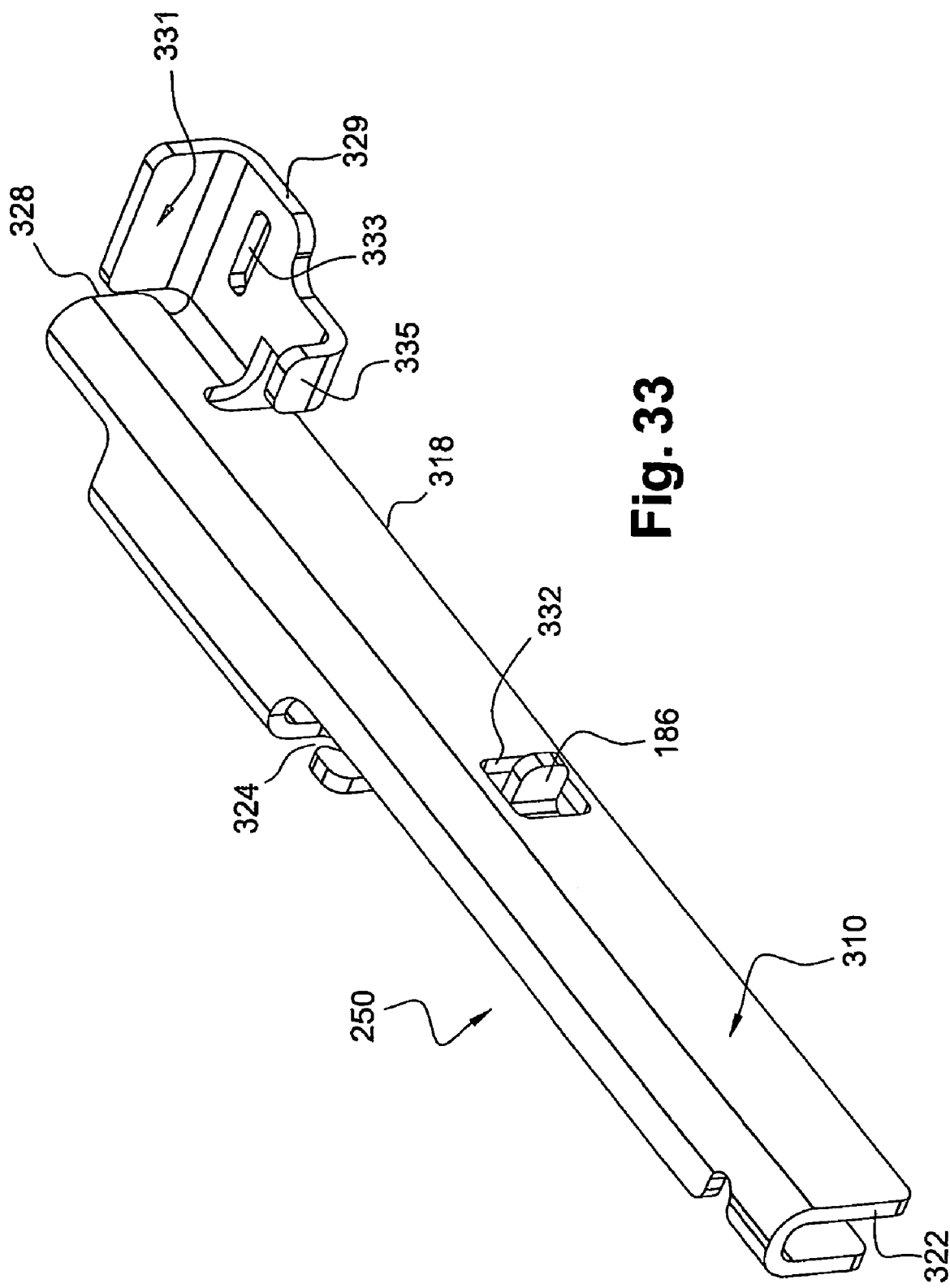
FIG. 33 is a view similar to that of FIG. 33 at another viewing angle.

FIG. 28 shows that the slider 500 includes a plate 501 of resilient sheet steel which has a central plate part 502 and a pair of flat resilient arms 518 that project rearwardly from the central plate part. A rear gate 524 with retention bar 526 is fixed to the rear ends of the flat arms. The retention bar has a card-abutting front face 530 that abuts the rear end of a card.

Figure 19:
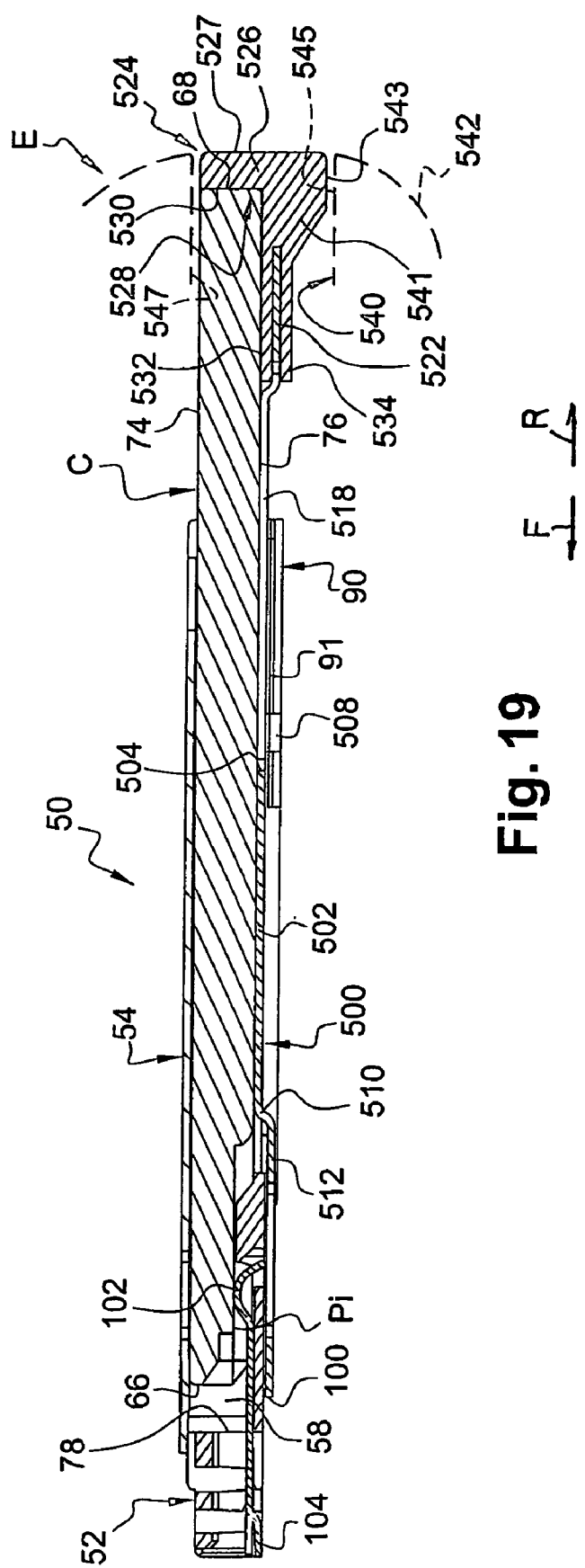
FIG. 19 is a longitudinal sectional view of FIG. 2.
Figure 20:
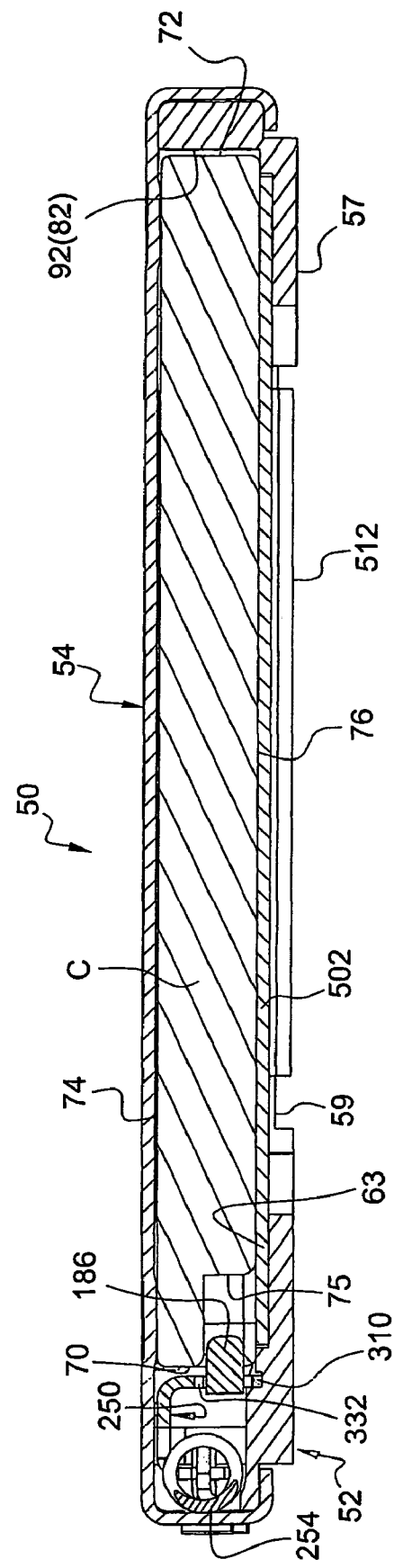
FIG. 20 is a cross-sectional view of FIG. 2.
Figure 21:
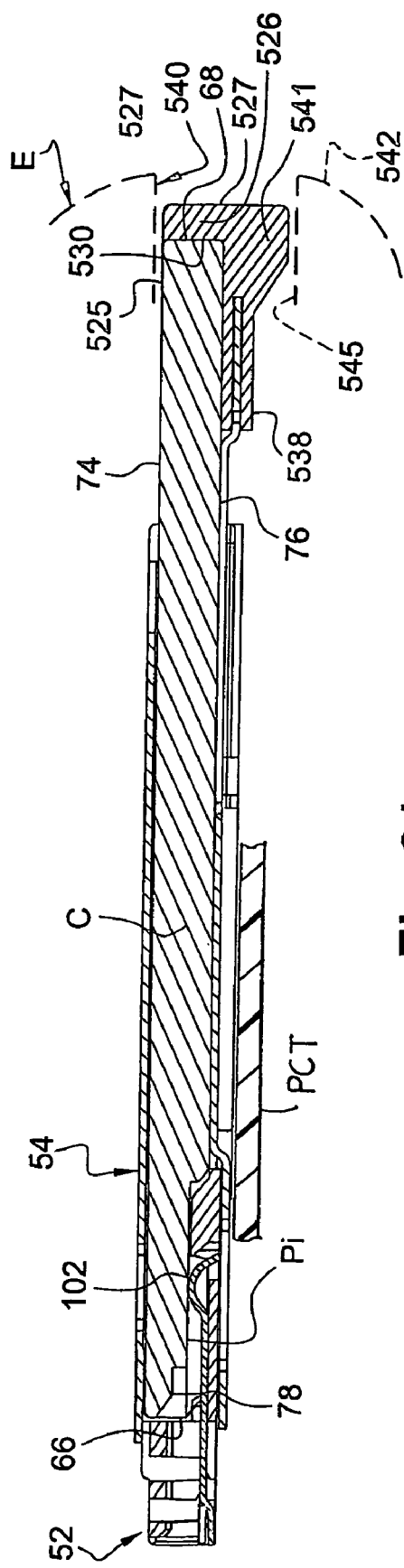
FIG. 21 is a longitudinal sectional view of FIG. 8.
Figure 22:
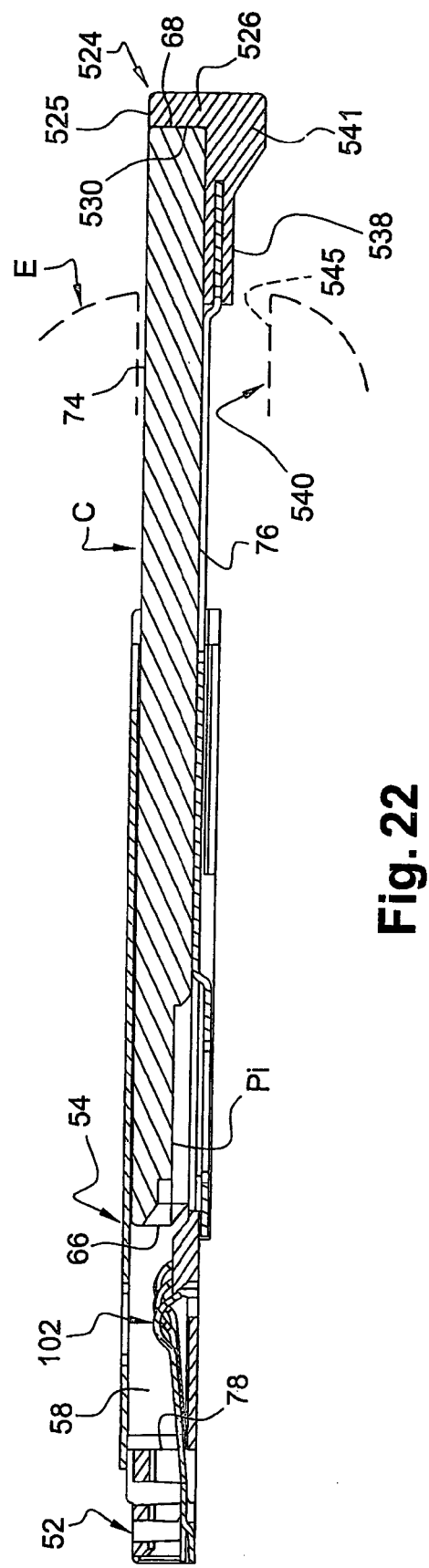
FIG. 22 is a longitudinal sectional view of FIG. 11.
Figure 23:
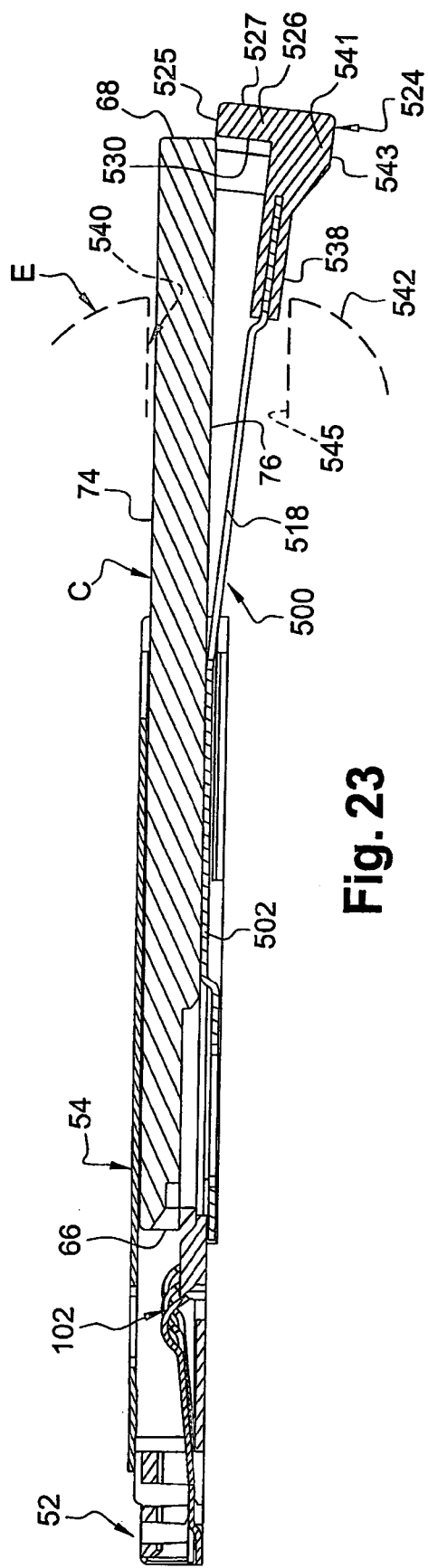
FIG. 23 is a longitudinal sectional view of FIG. 13.
Figure 24:
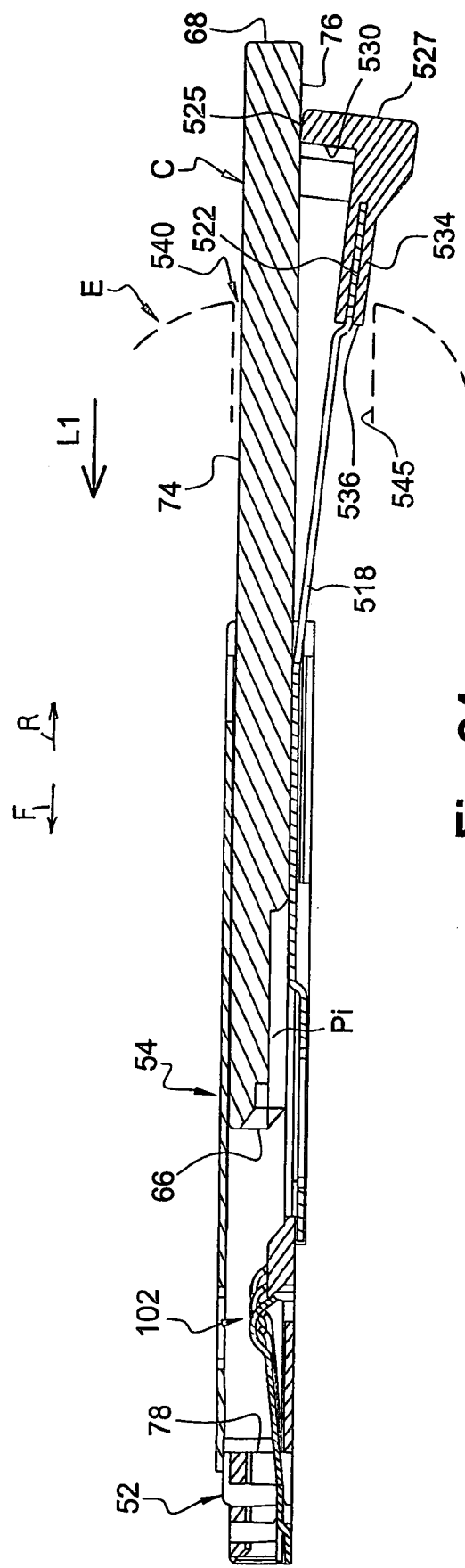
FIG. 24 is a longitudinal sectional view of FIG. 14.
Figure 25:
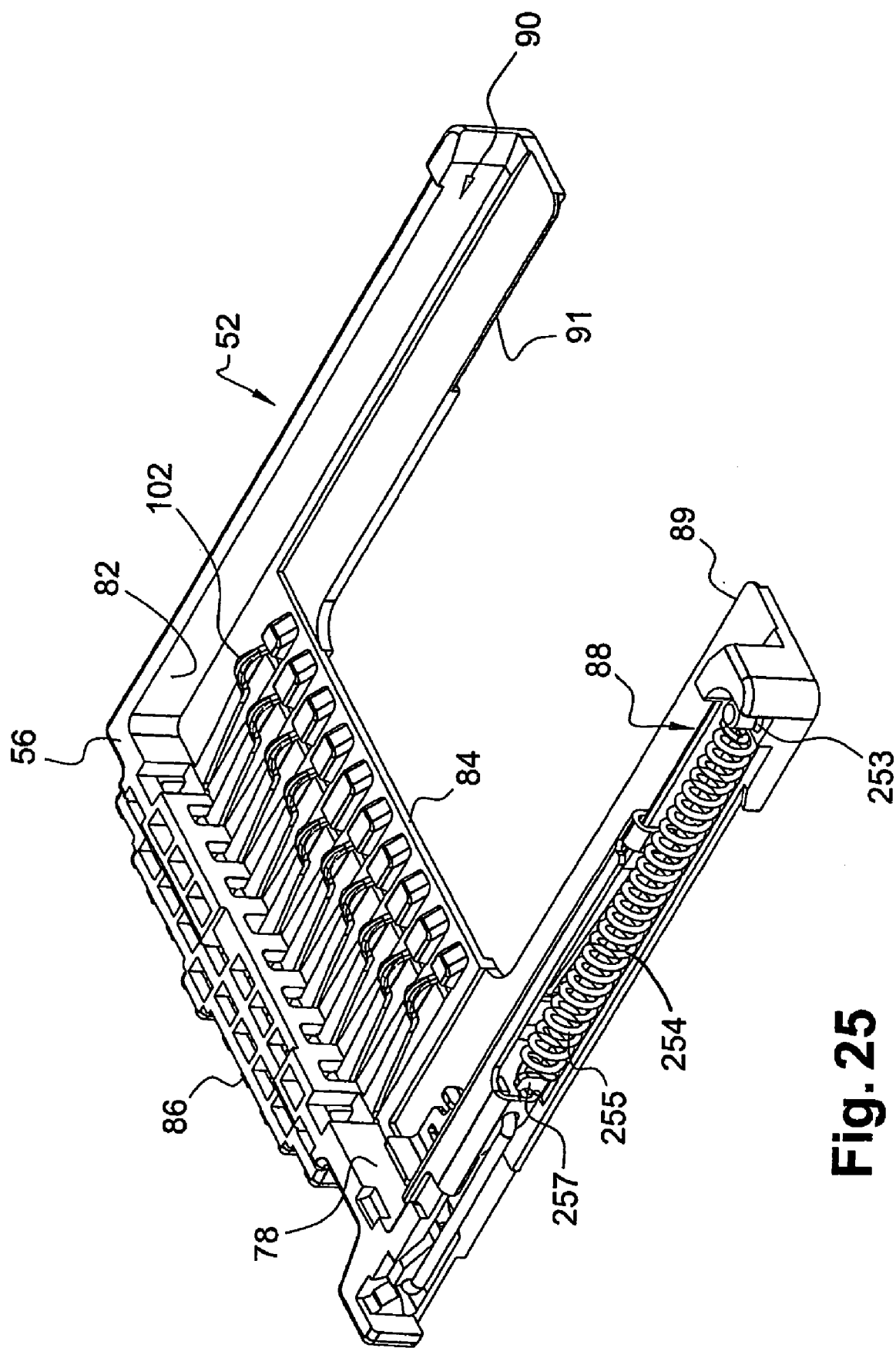
FIG. 25 is a view similar to that of FIG. 9, without the slider that bears the gate-forming bar at its rear end.

FIG. 19 shows the card in its fully inserted operating position wherein the pad-engaging ends 102 of the contact blades engage contact pads Pi of the card. The card is prevented from moving rearward by the fact that the front face 530 of the retention bar abuts the rear end of the card. FIG. 22 shows the connector after the slide assembly has been pushed forwardly a small distance (to FIG. 21) to operate the double click mechanism and release the carriage, so the carriage and slider have moved rearward to the rearward release or retracted position shown in FIG. 22 which is about a centimeter rearward of the operating position. FIG. 23 shows that in the rear release position of the slider 500, the retention bar 526 can be pushed down to the position shown, wherein the top of the retention bar is no higher than the bottom of the card. Such downward movement of the retention bar occurs by bending of the flat resilient arms 518 about a laterally-extending axis (e.g. Z in FIG. 12) that lies below the connector. The card C then can be held by a person to move the card out of the slot. Such rearward movement by a person can be done by pressing down on the protruding card rear end portion or by grasping the protruding portion with fingers. FIG. 24 shows the card after its has been manually moved rearward of the top of the bar front face 530.

FIG. 19 shows that when the card and slider assembly are in the front operating position, the retention bar cannot move down. This is because a surface 545 of equipment E lies directly under the retention bar. The retention bar has a heel 541 that extends below the level of the flat resilient arms 518, so the bar can move down substantially only when the heel has passed the equipment surface 545. The equipment can be a circuit board or part of equipment such as a cell phone in which the card connector lies. FIG. 19 shows the retention bar lying in a slot 540 formed in the equipment.

Figure 9:
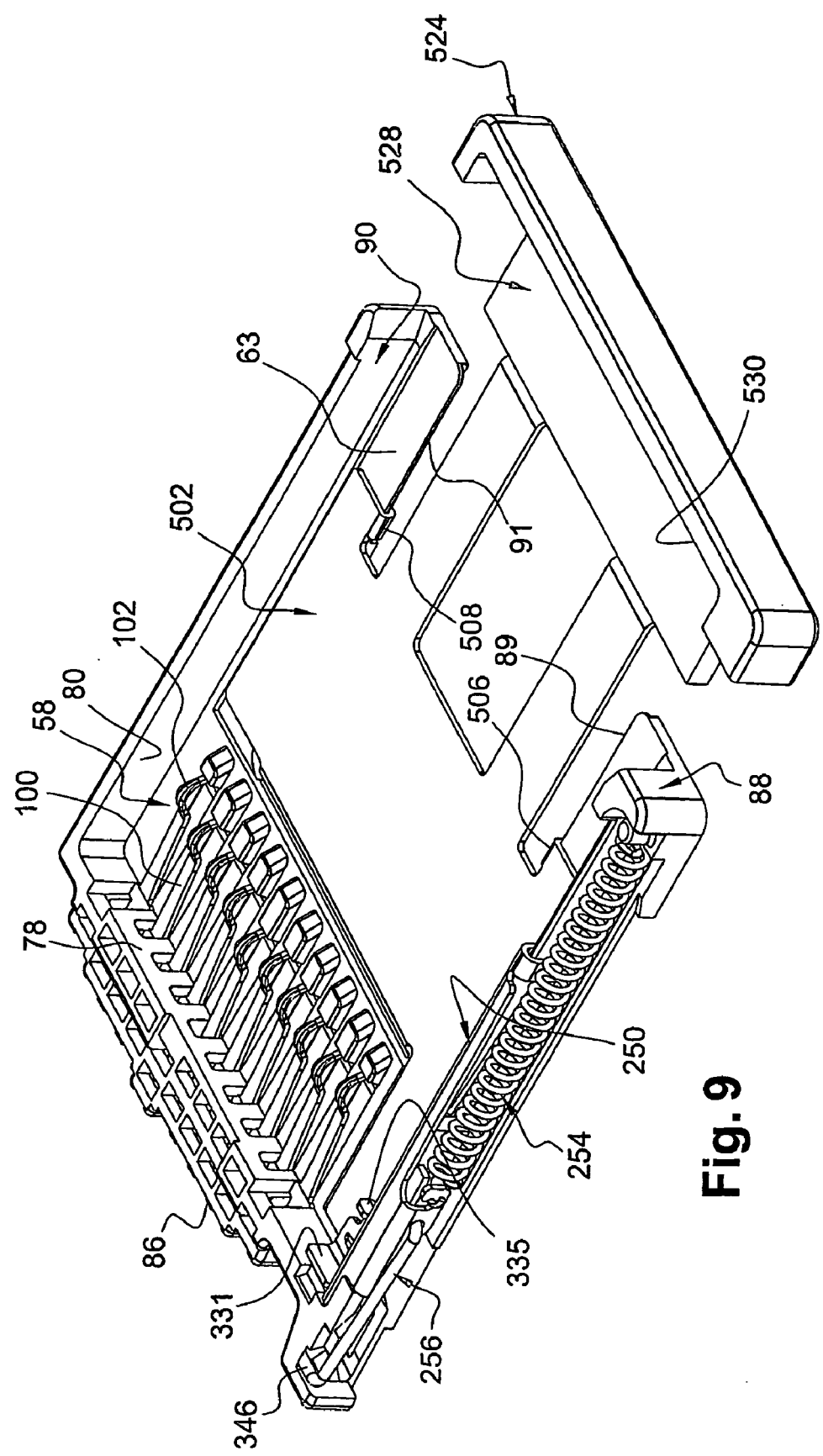
FIG. 9 is a view similar to that of the previous figure, with neither the card nor the cover.

FIG. 28 shows that the slider includes a pair of slideways 506, 508 that are formed by a pair of short arms that project rearward from laterally opposite sides of the center plate part 502. The short arms have inwardly extending (towards the lateral center of the card-receiving slot) tabs that have been bent 1800°. FIG. 9 shows that the slideways 506, 508 receive thin flat rails 89, 91 formed at laterally opposite sides of a pair of arms 88, 90 of the insulative support.

Figure 3:
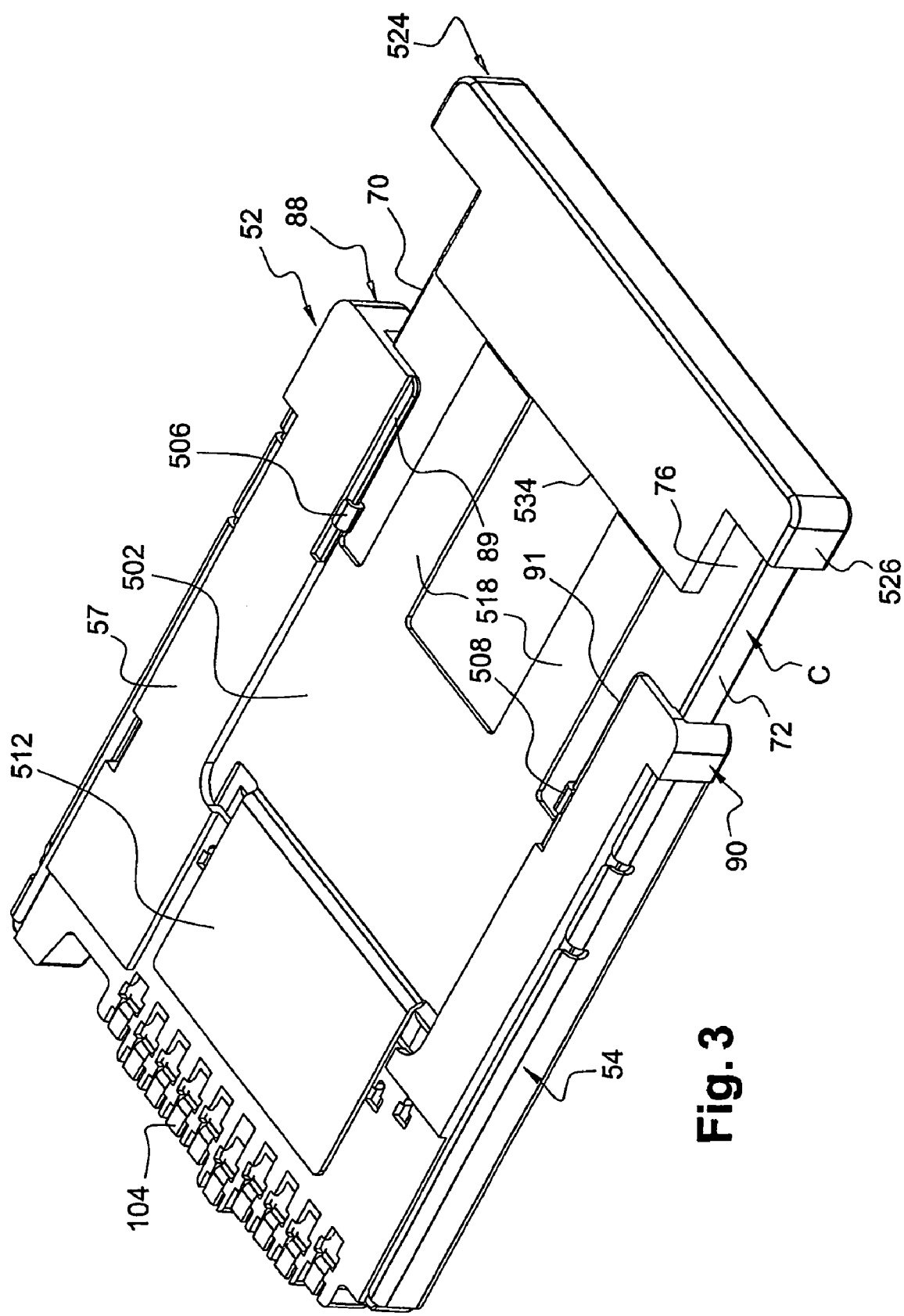
FIG. 3 is a bottom isometric view of the connector of FIG. 2.
Figure 4:
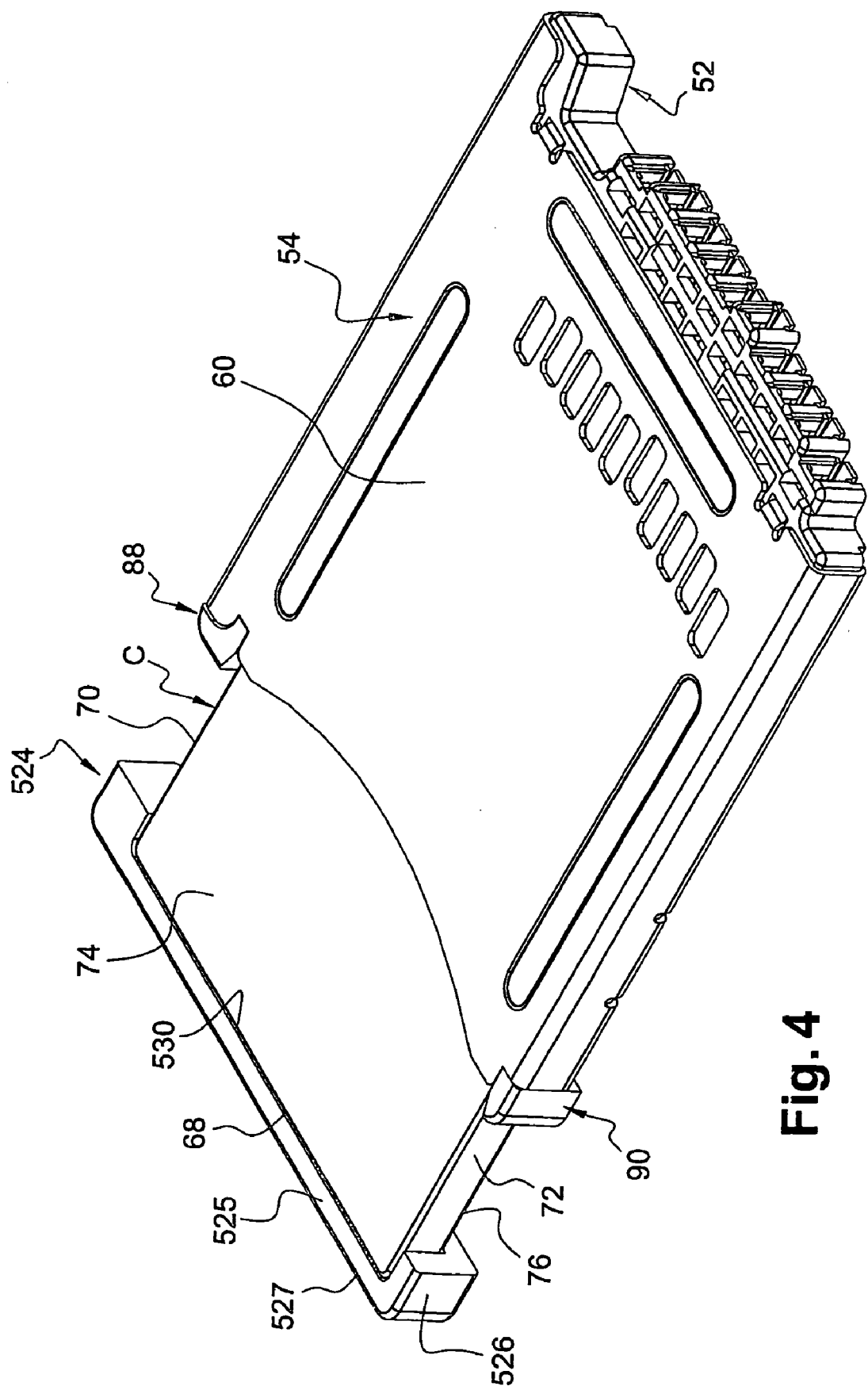
FIG. 4 and FIG. 5 are views similar to those of FIGS. 2 and 3 at another viewing angle.
Figure 5:
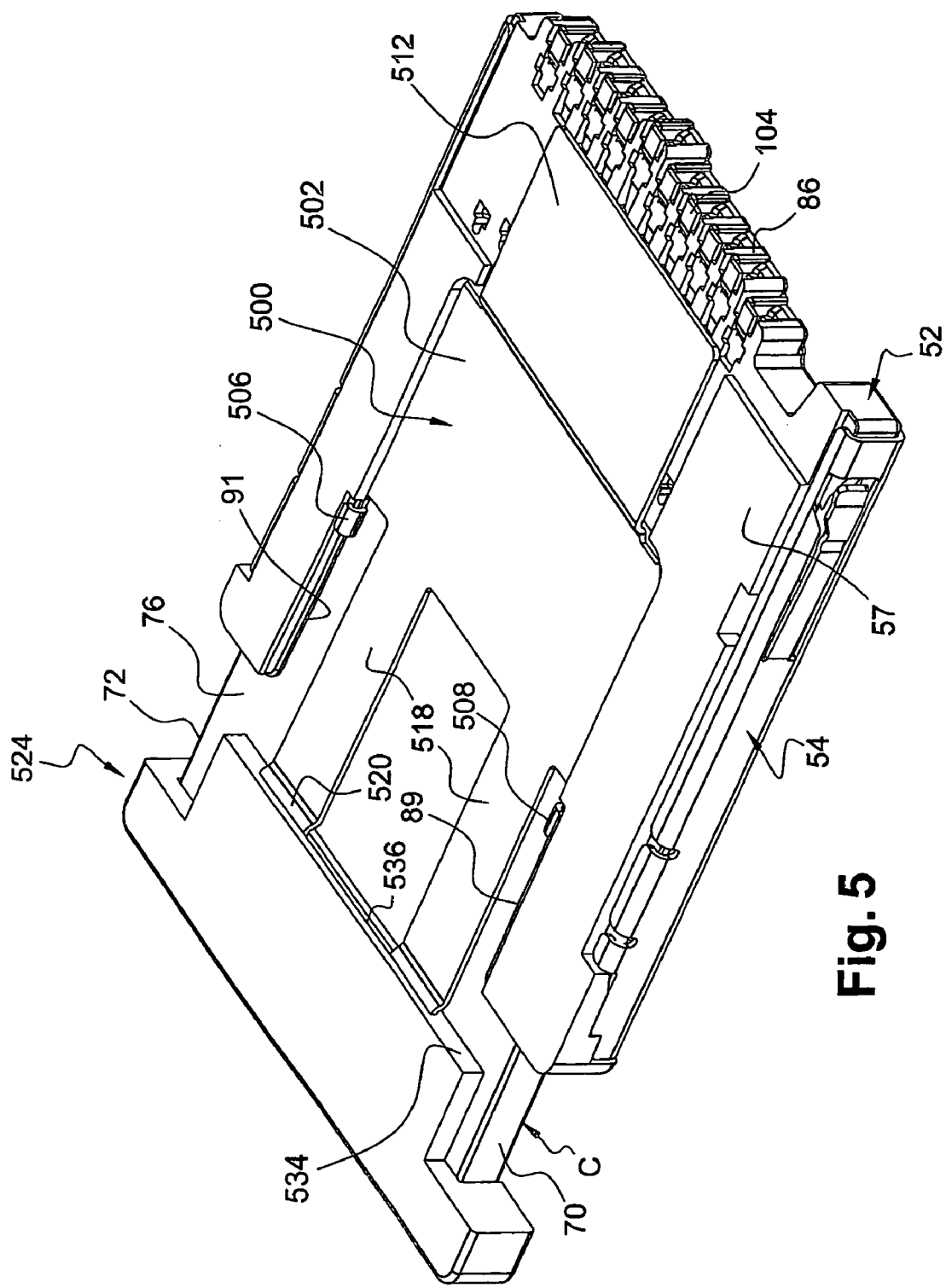

The slider also has a front guiding plate part 512 (FIG. 28) that is joined by a bend that lowers the guiding plate part below the center plate part 502. The front guiding plate part guides the front end of the slider. As shown in FIG. 12, the guiding plate part lies in a recess 59 under the region 56 where the blade contact ends that engage card contact pads lie. However, most of the slider plate lies rearward of the region 56 where the blade contacts are mounted. FIG. 3 shows that the bottom of the front guiding plate part 512 lies slightly above the bottom surface 57 of the insulative support 52. When the insulative support lies against or very close to a circuit board, the front guiding plate part is confined to slide horizontally and controls the orientation of the slider about a lateral axis while the slideways control the lateral position of the slider. As can be seen in FIG. 21, the connector has a very small height.

Figure 34:
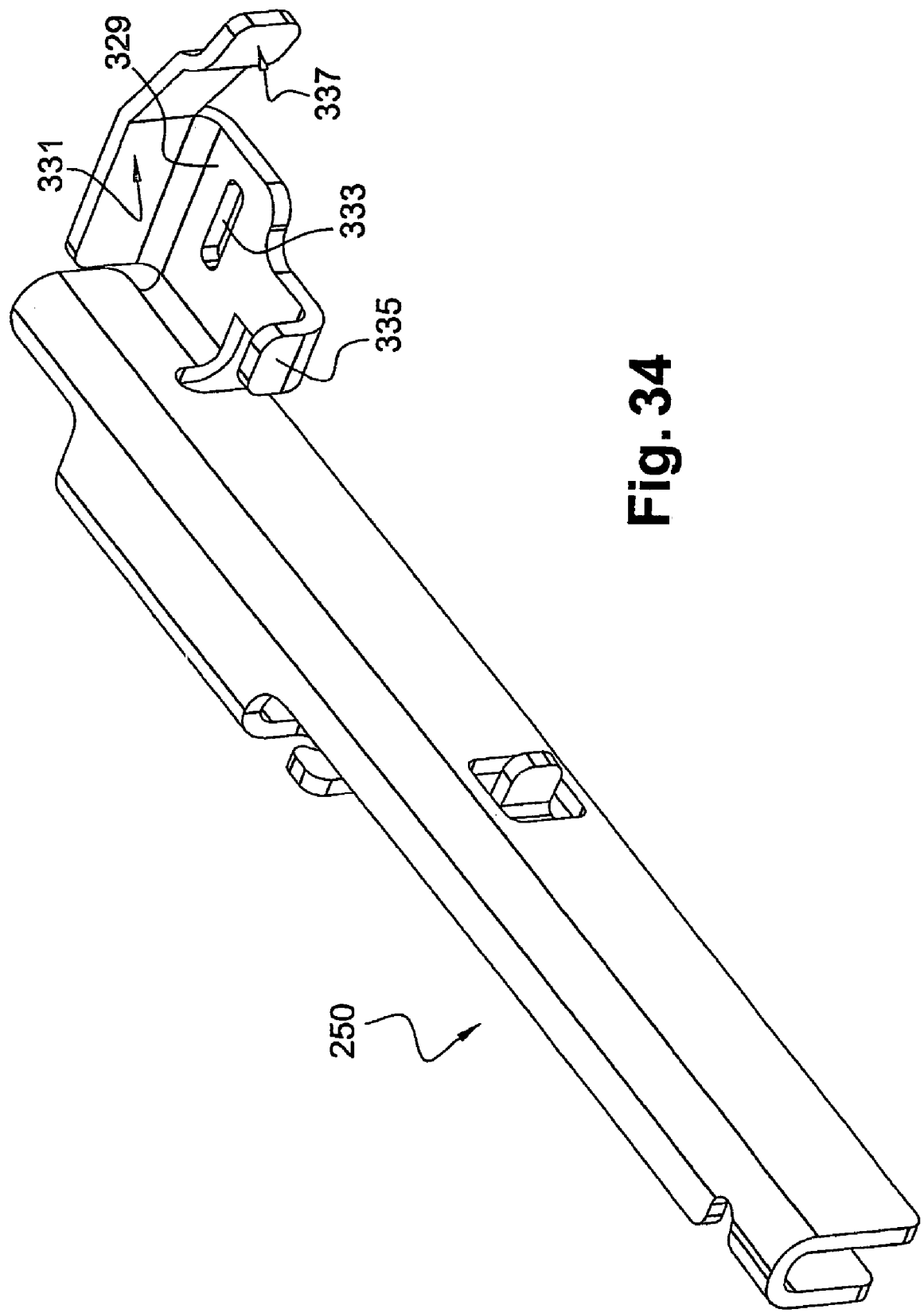
FIGS. 34, 35 and 36 are views similar to those of FIGS. 33, 7 and 18, which illustrate a first alternative embodiment of the carriage incorporating a card extraction spring.
Figure 37:
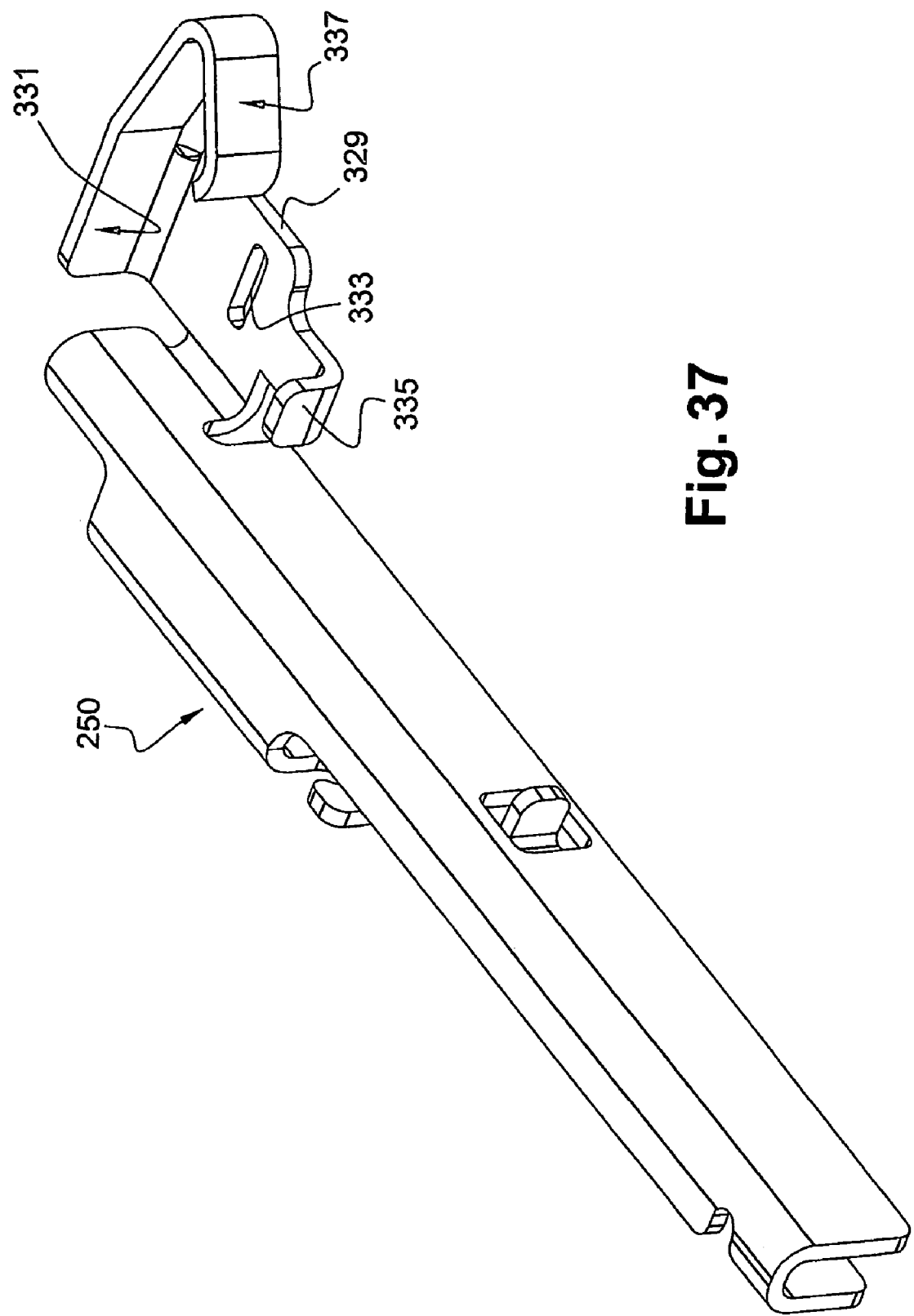
FIGS. 37, 38 and 39 are views similar to those of FIGS. 33, 7 and 18, which illustrate a second alternative embodiment of the carriage incorporating a card extraction spring.
Figure 38:
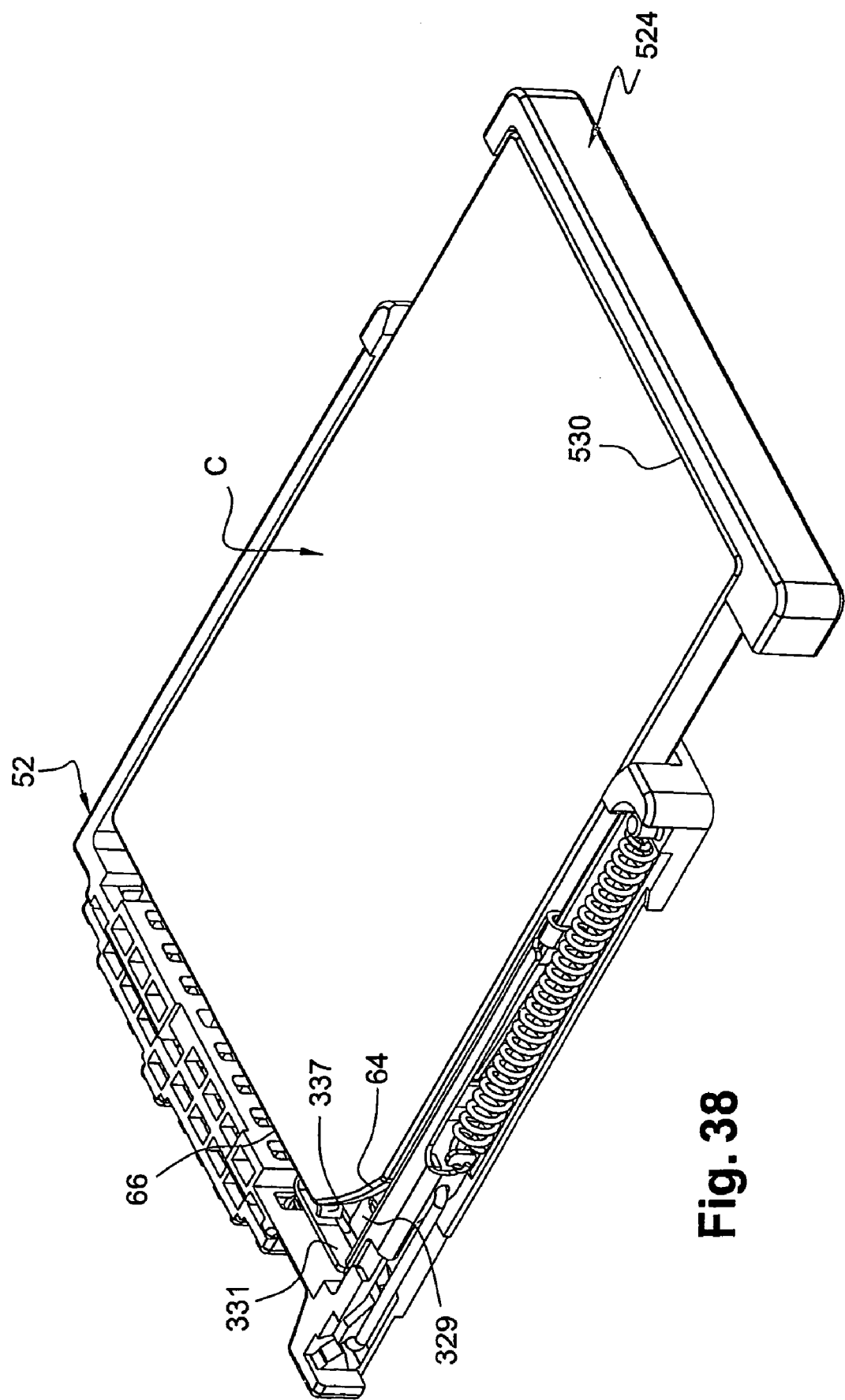
Figure 39:
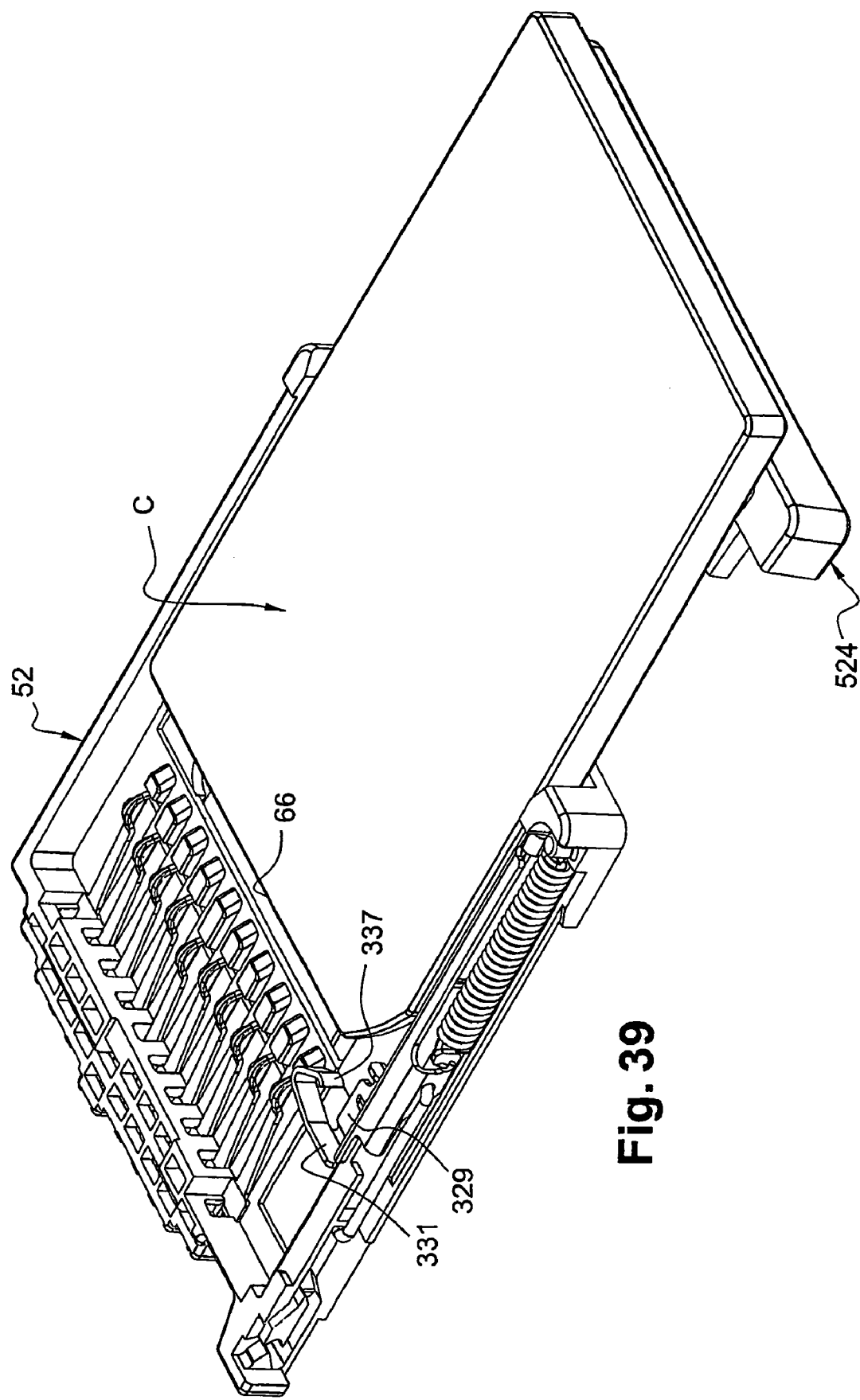

FIG. 34 shows a carriage 250 with a leaf spring 337. FIG. 37 shows a modified leaf spring 337. In each case the leaf spring engages a card part closer to the center of the card. The leaf spring presses the card rearwardly against the front surface of the retention bar, so the exact position of the card is controlled by the front surface 230 of the retention bar 524 (FIG. 38 ).

Figure 40:
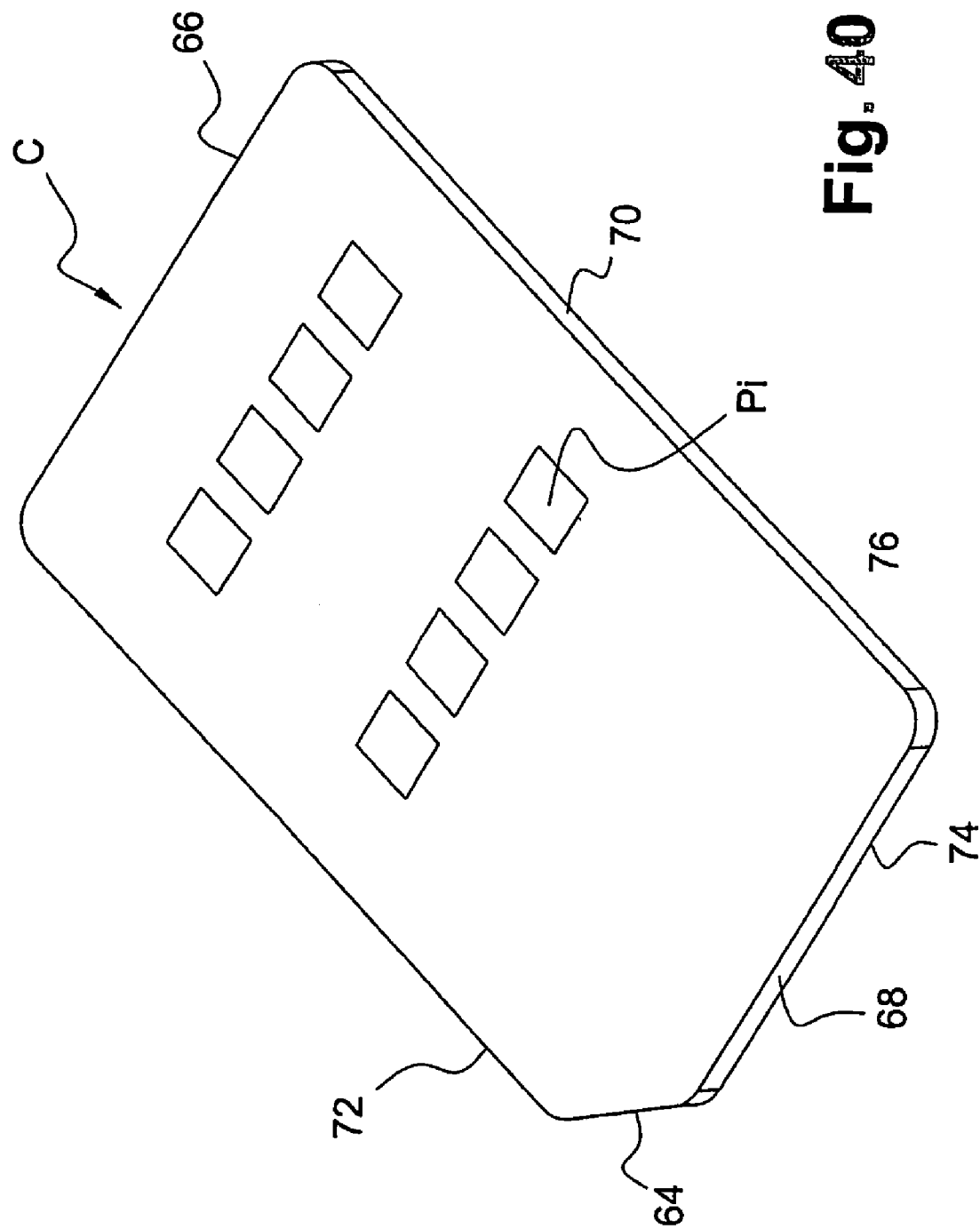
FIG. 40 is a bottom left rear isometric view of a MICROSIM card.
Figure 41:
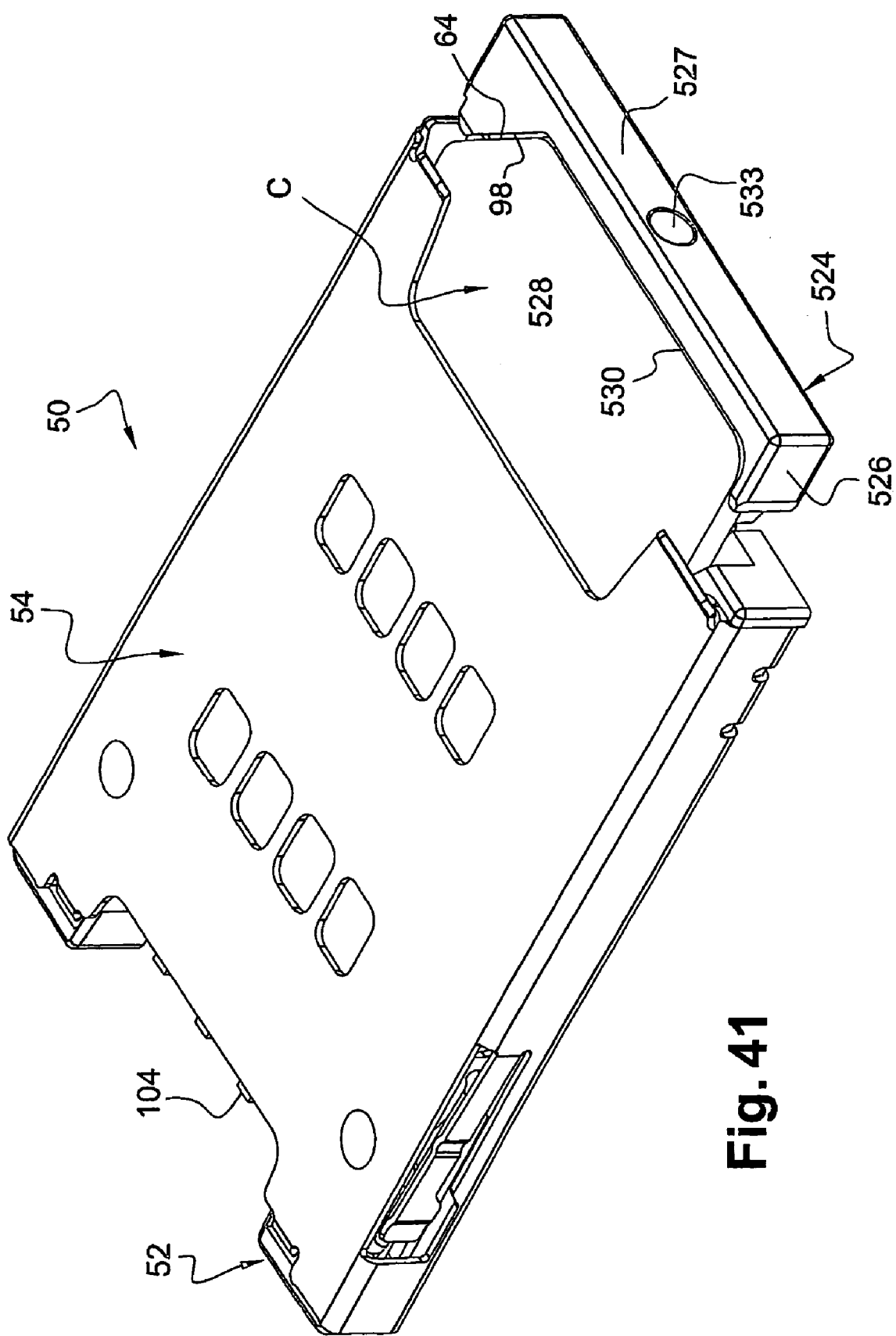
FIG. 41 is a view similar to that of FIG. 2 of a connector according to the invention for a MICROSIM card.
Figure 42:
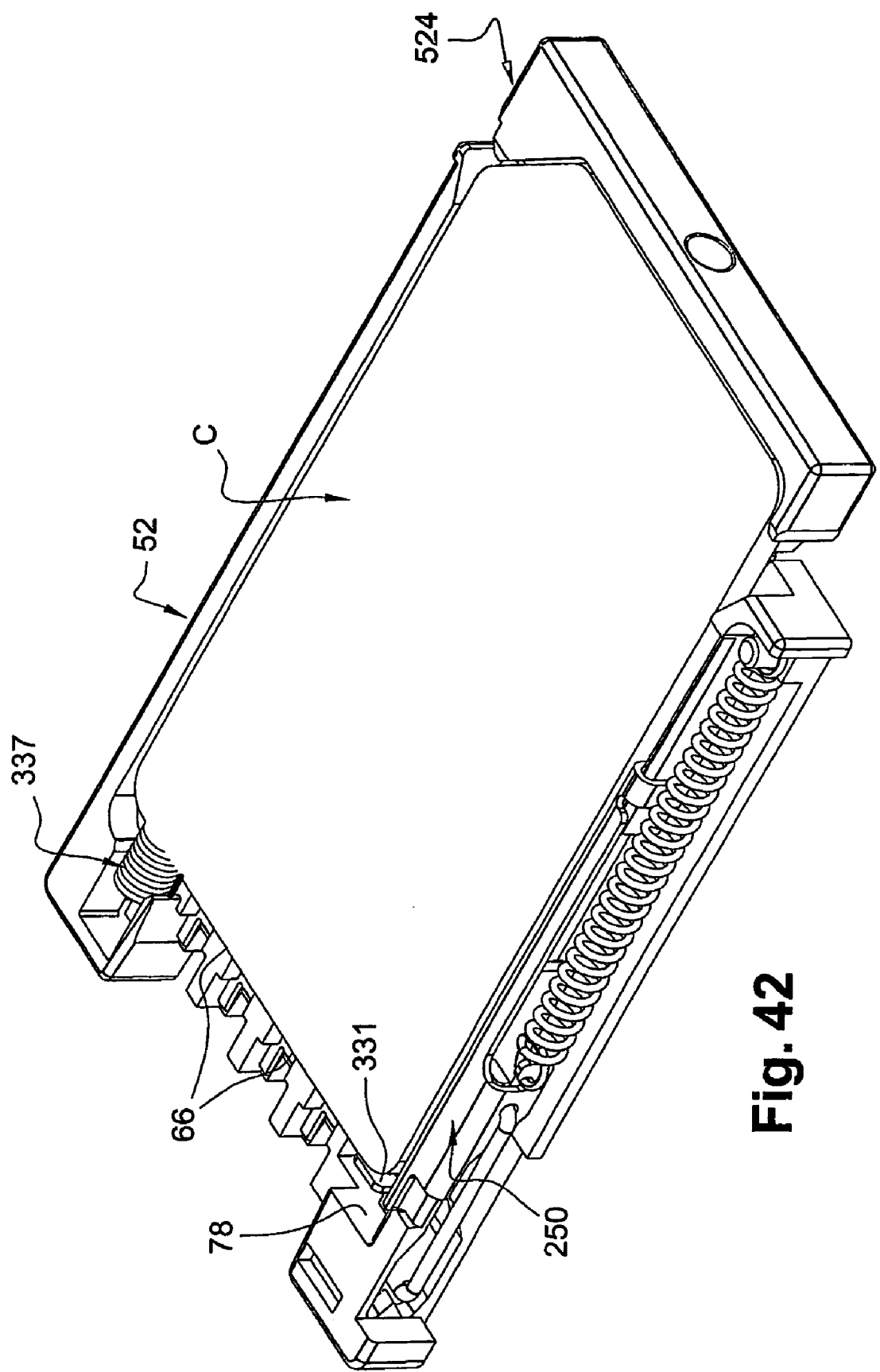
FIG. 42 is a view of the connector of FIG. 41 without the cover.
Figure 43:
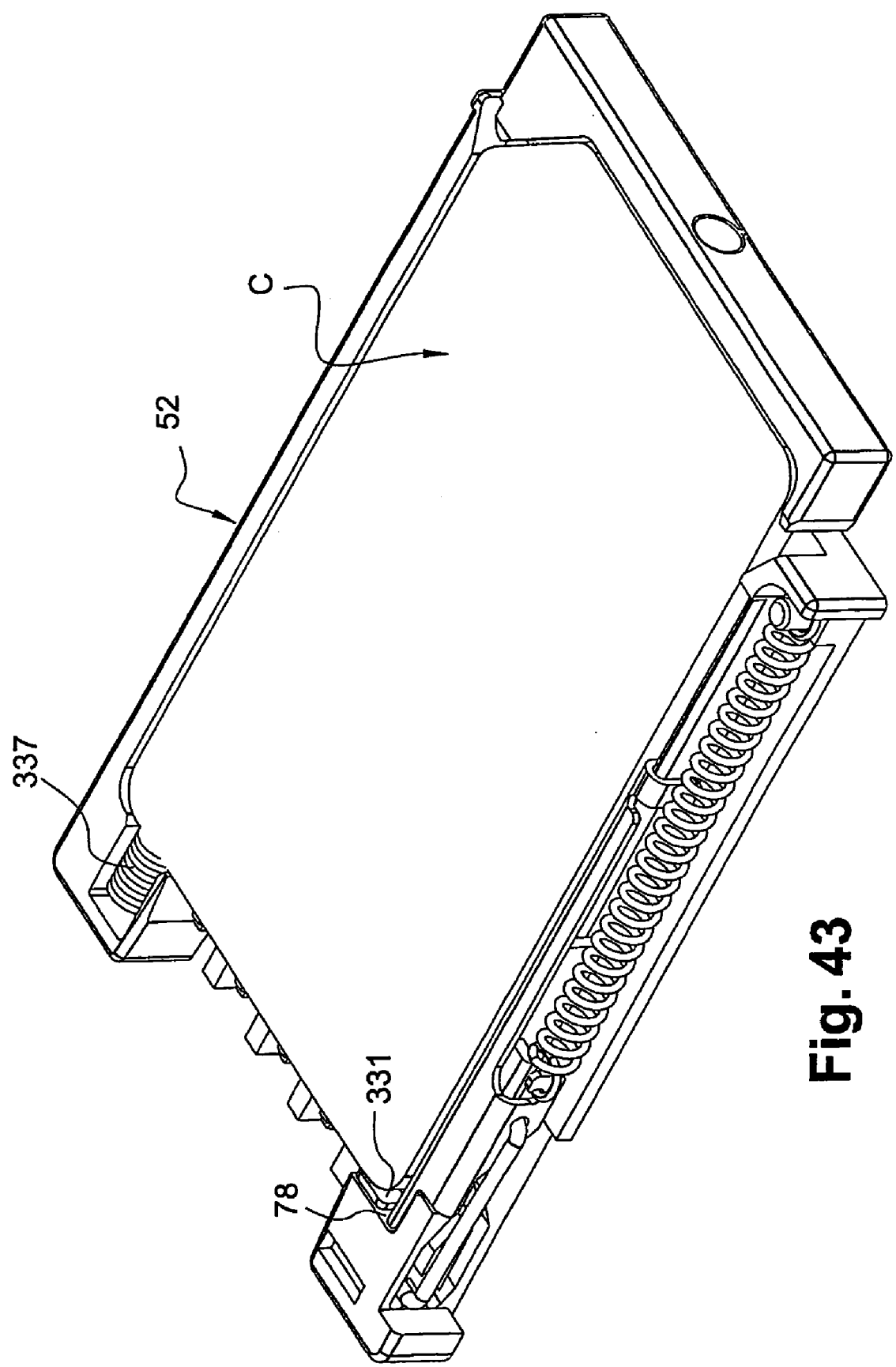
FIG. 43 is a view similar to that of FIG. 42 with the carriage in the pushed-in position.
Figure 44:
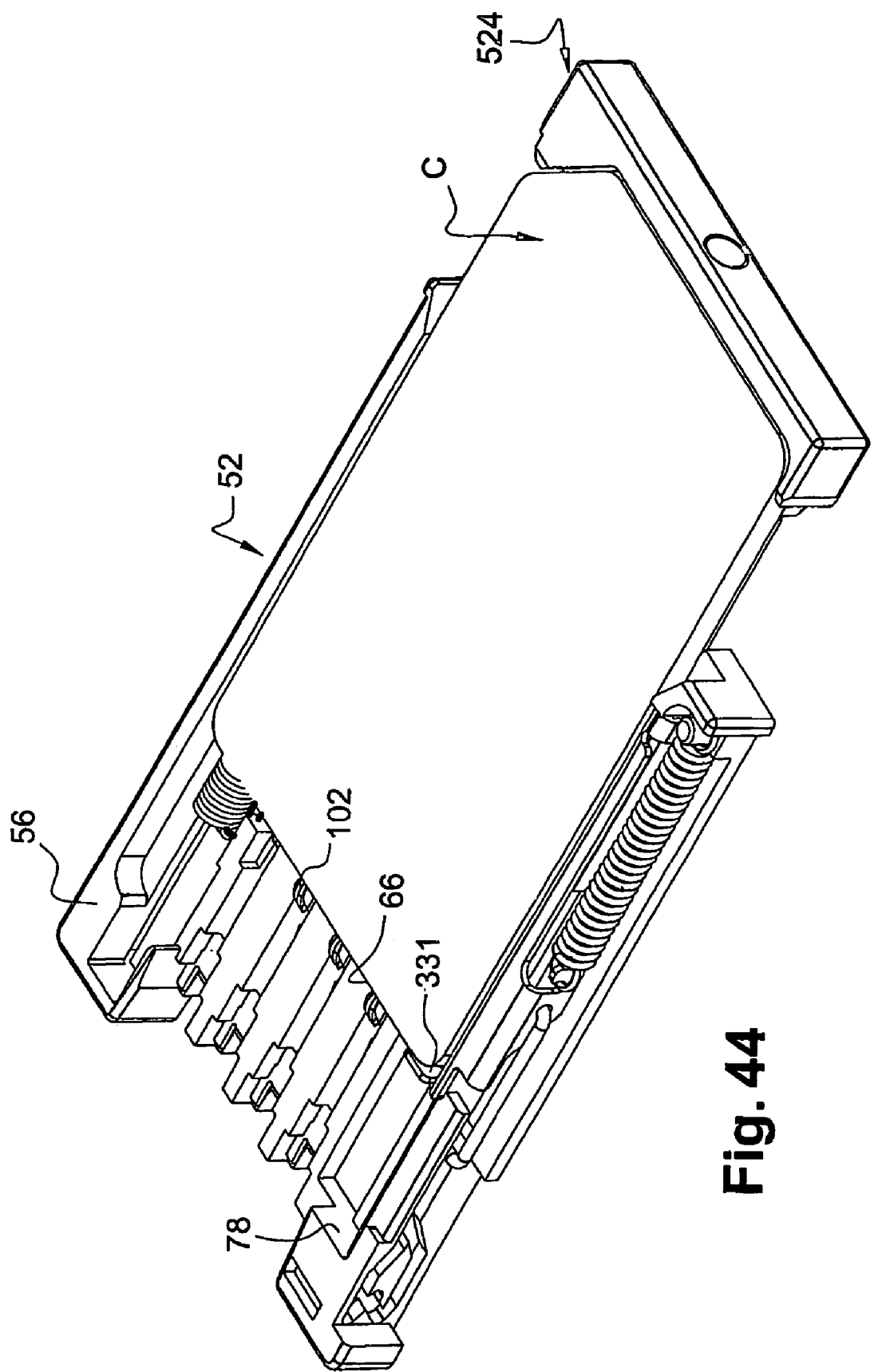
FIG. 44 shows the connector with its carriage in the ejected rear position.
Figure 45:
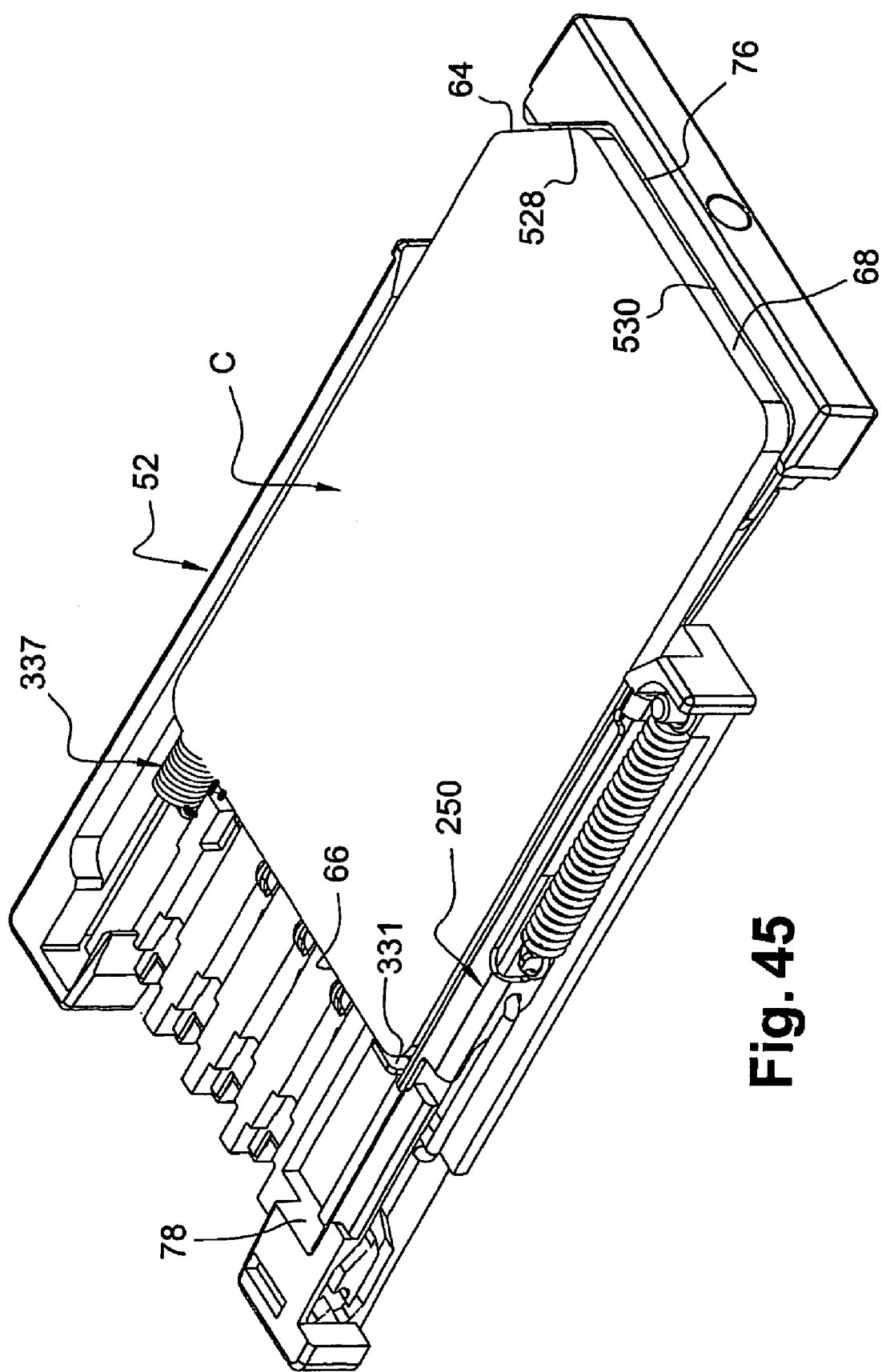
FIG. 45 shows the carriage in the ejected rear position and the gate in the retracted lowered position.
Figure 46:
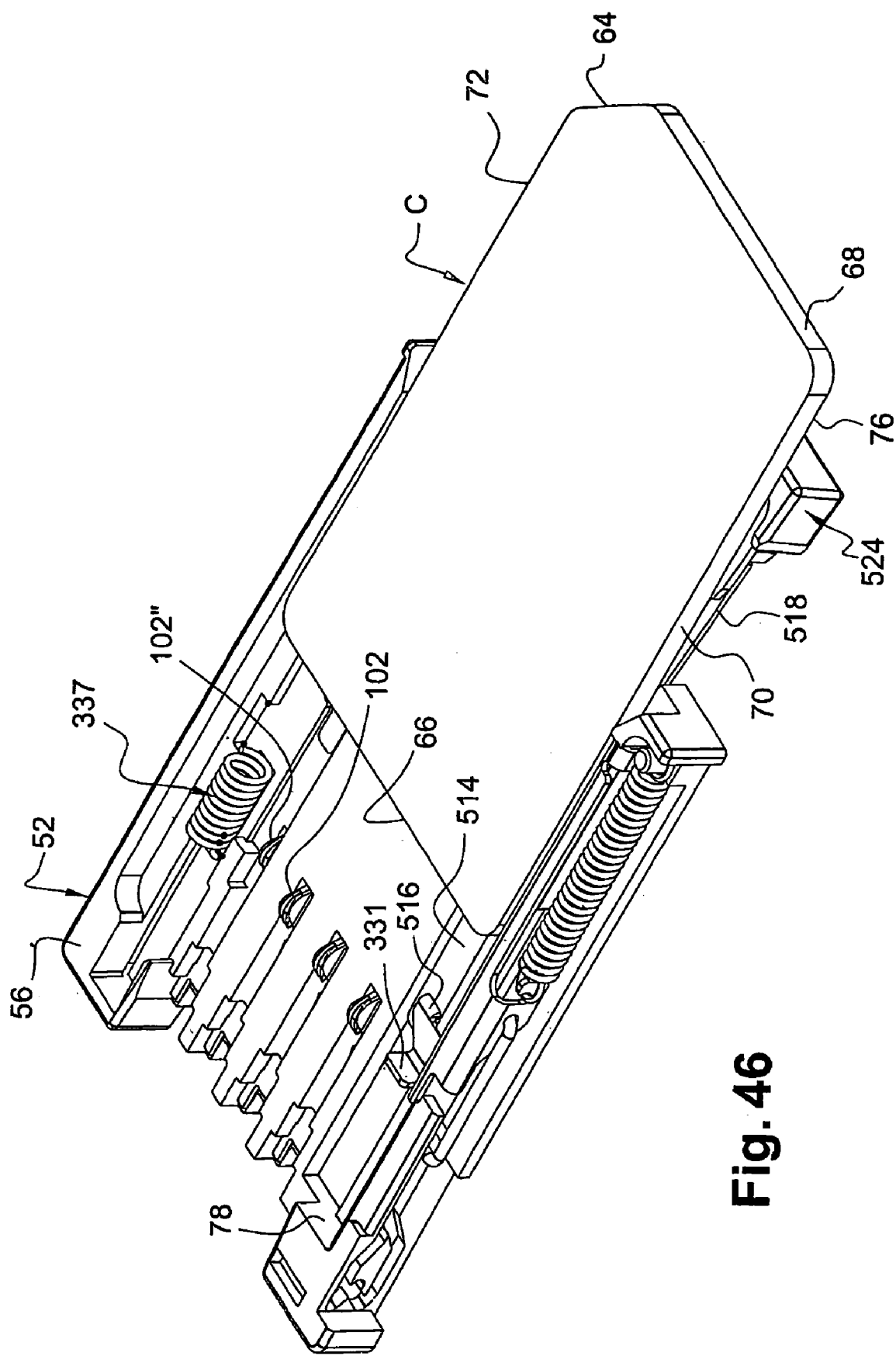
FIG. 46 shows the MICROSIM card during extraction from the slider.
Figure 47:
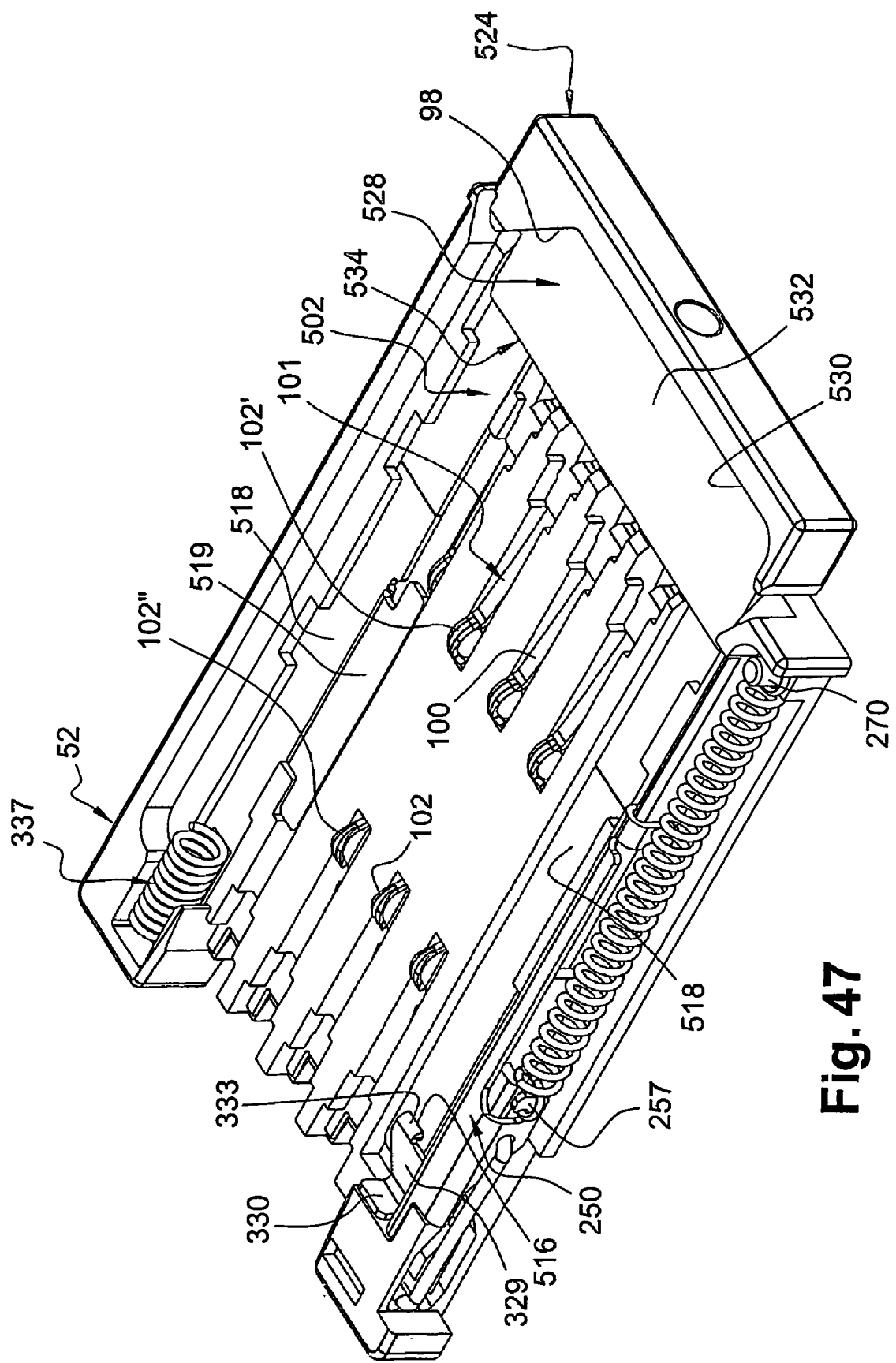
FIG. 47 is similar to the view of FIG. 42, without the MICROSIM card.
Figure 48:
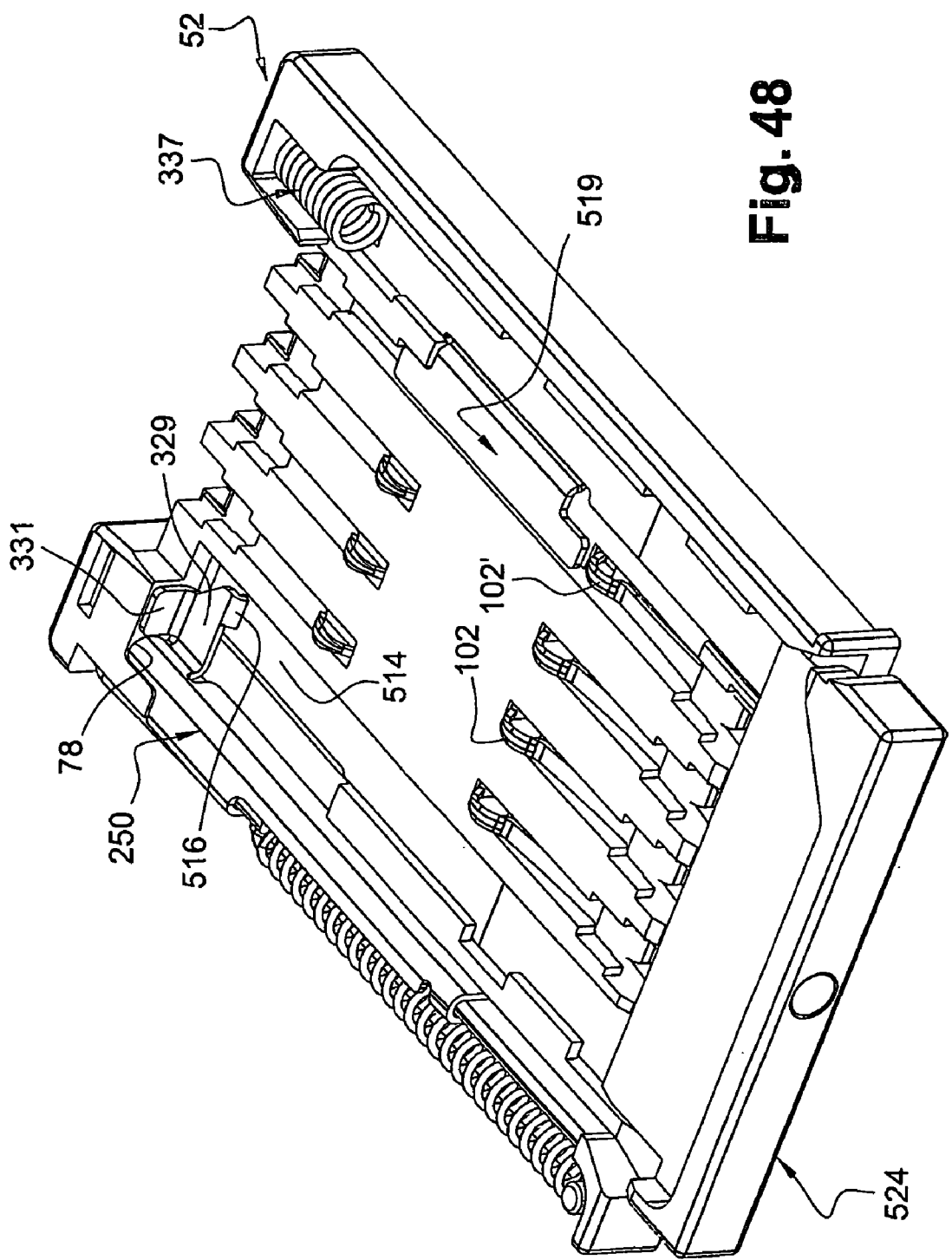
FIG. 48 is a view similar to that of FIG. 47 at another viewing angle.
Figure 51:
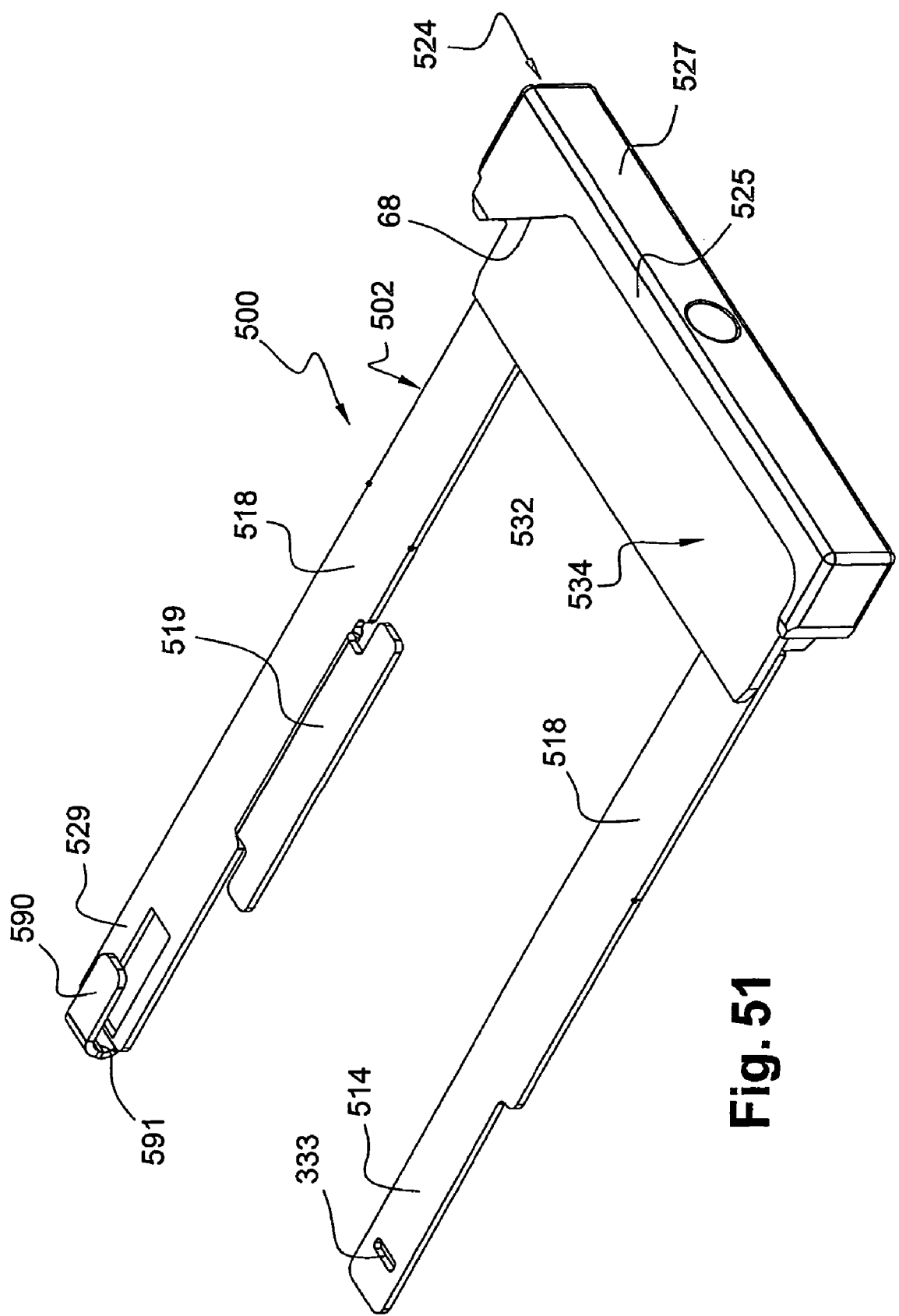
FIGS. 51 and 52 are views similar to FIGS. 28 and 29 of the slider.

FIG. 40 shows a MICROSIM smart card, which has two rows of contact pads Pi lying at the bottom surface of the card. FIG. 48 shows the arrangement of blade contacts and their pad-engaging ends 102. One pair of contact ends 102' and 102" (FIG. 46) indicate when the slide is between the operating and retracted positions. FIG. 51 shows that the slider 500 includes a pair of arms 518 on laterally opposite sides of the slider that connect to the retention bar 526. The slider has a switch blade 519. As shown in FIG. 48, the switch blade 519 breaks and makes contact with the contact ends of a pair of blades as the slider slides forward and rearward, to indicate when a card is about to reach the operating position.

Figure 60:
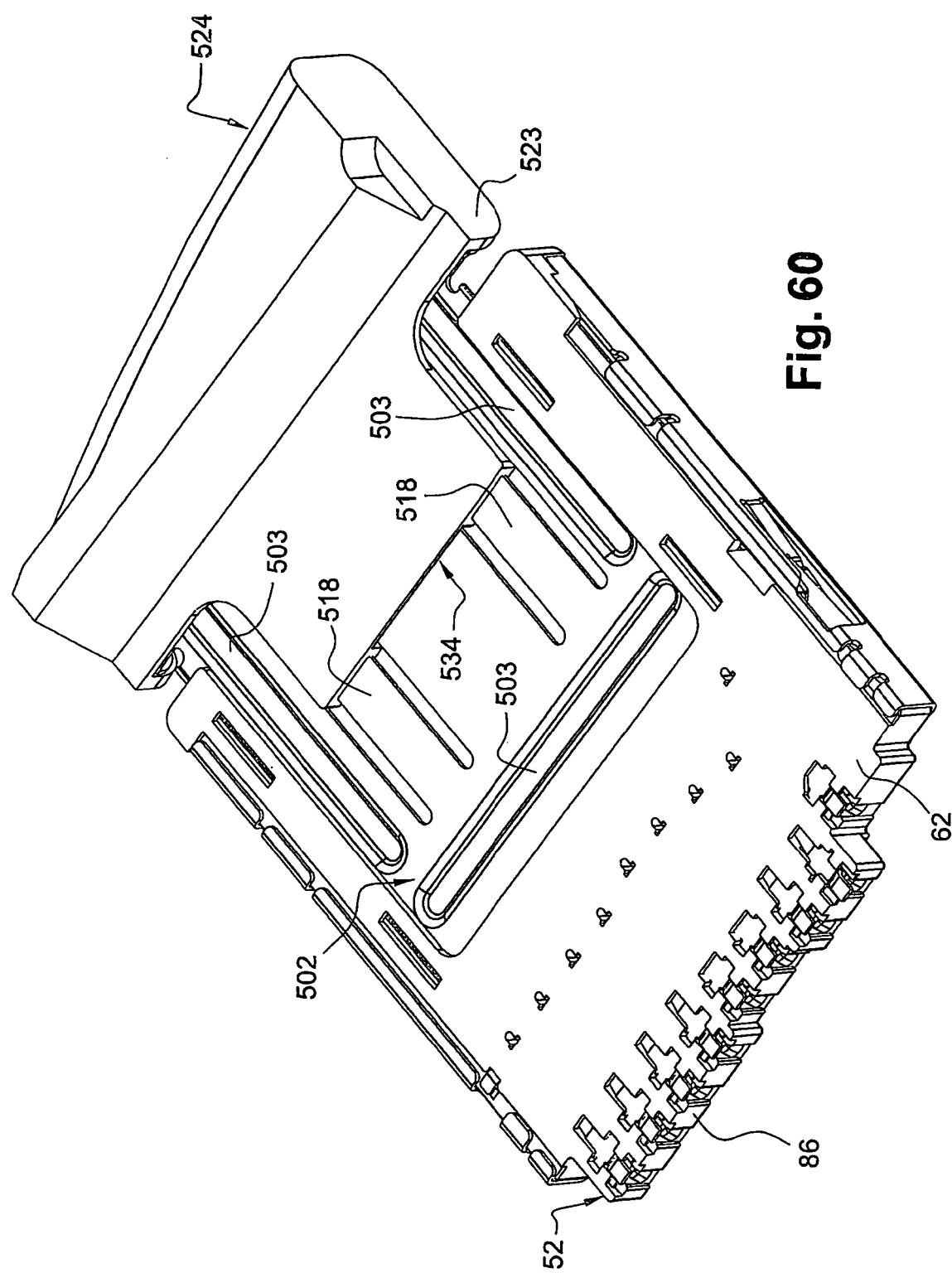
FIG. 60 is a bottom view of FIG. 58.
Figure 61:
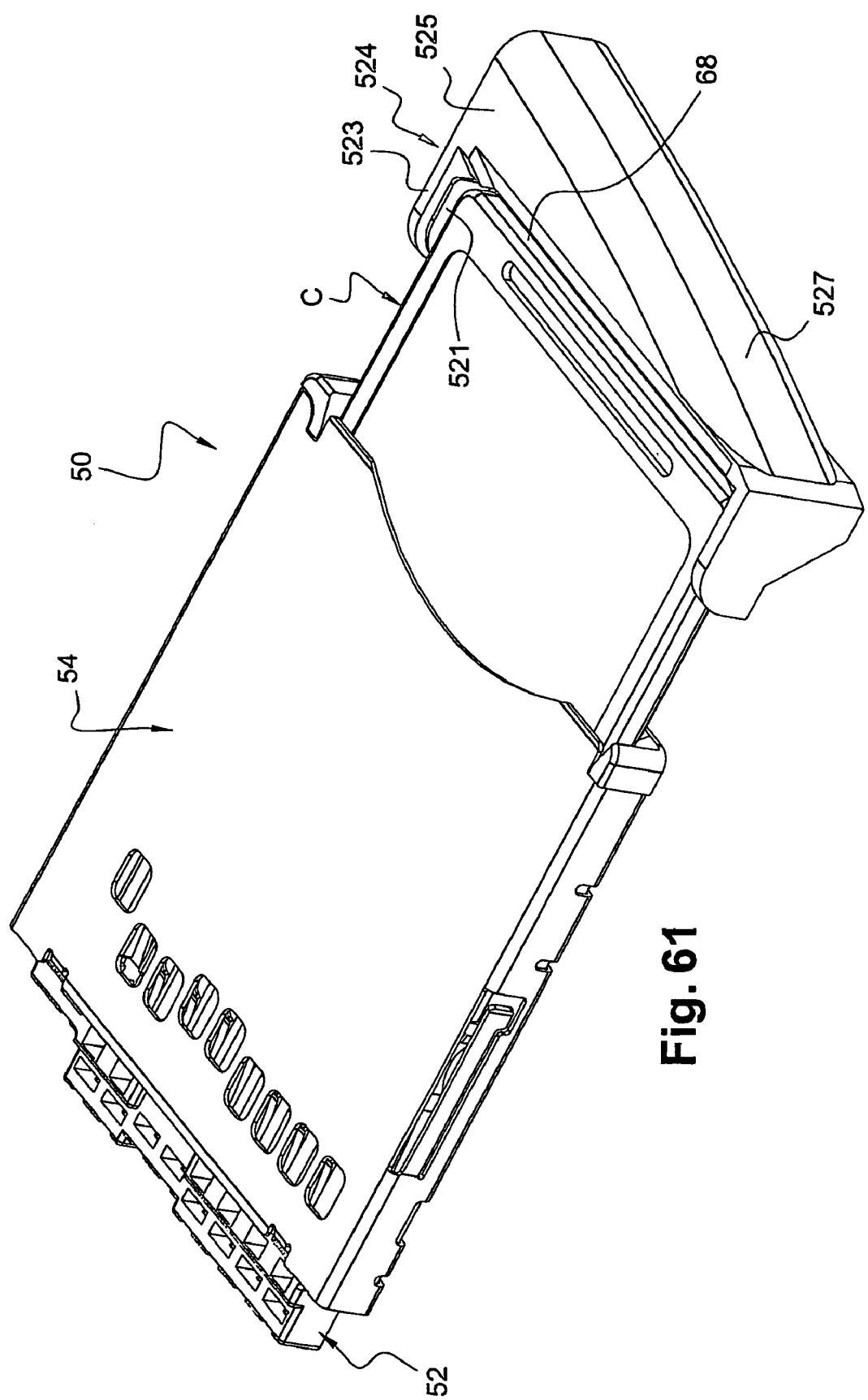
FIG. 61 is a view similar to that of FIG. 58 with the carriage and the slider in the ejected rear position.
Figure 62:
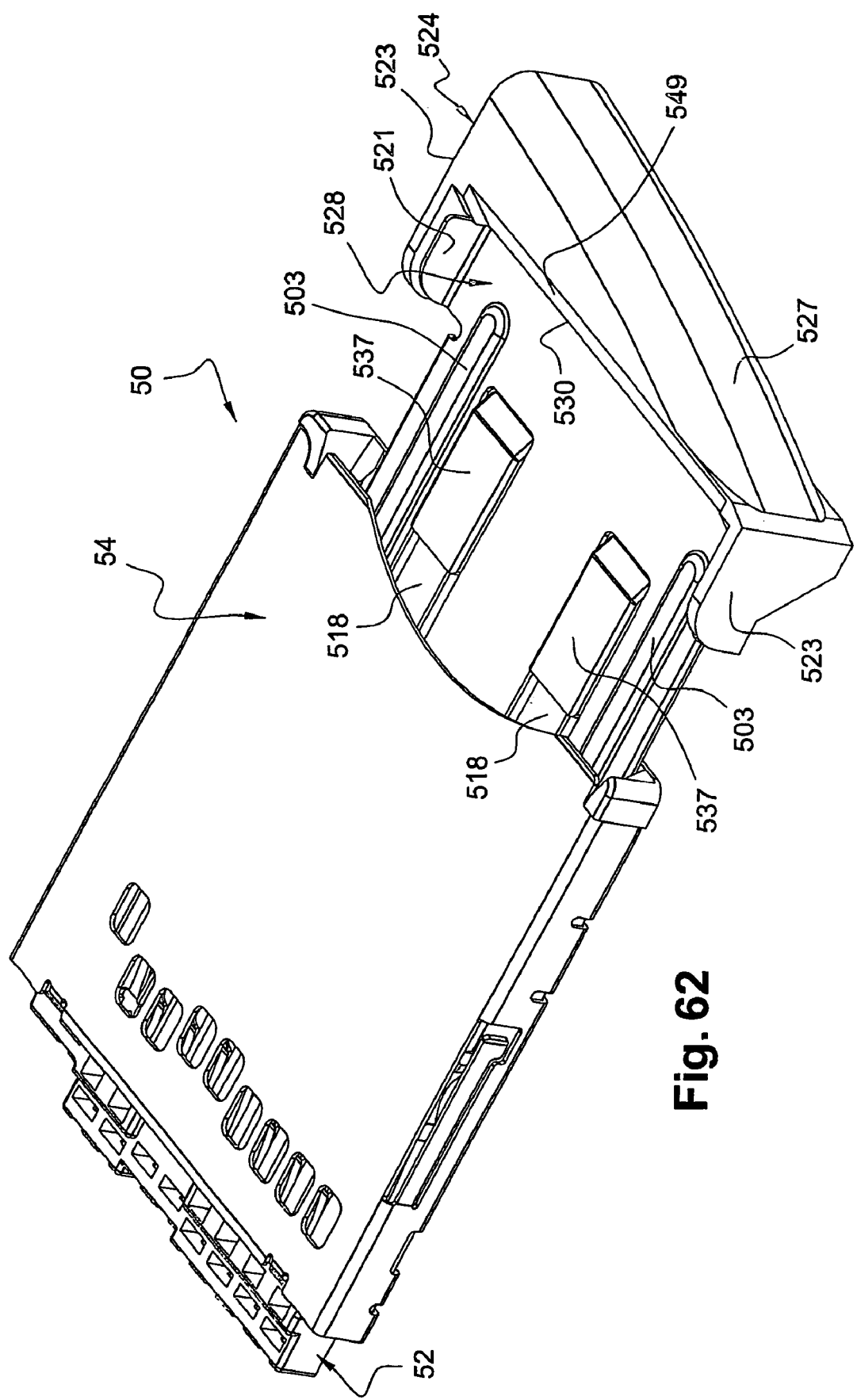
FIG. 62 is a view similar to that of FIG. 61 without the card.
Figure 63:
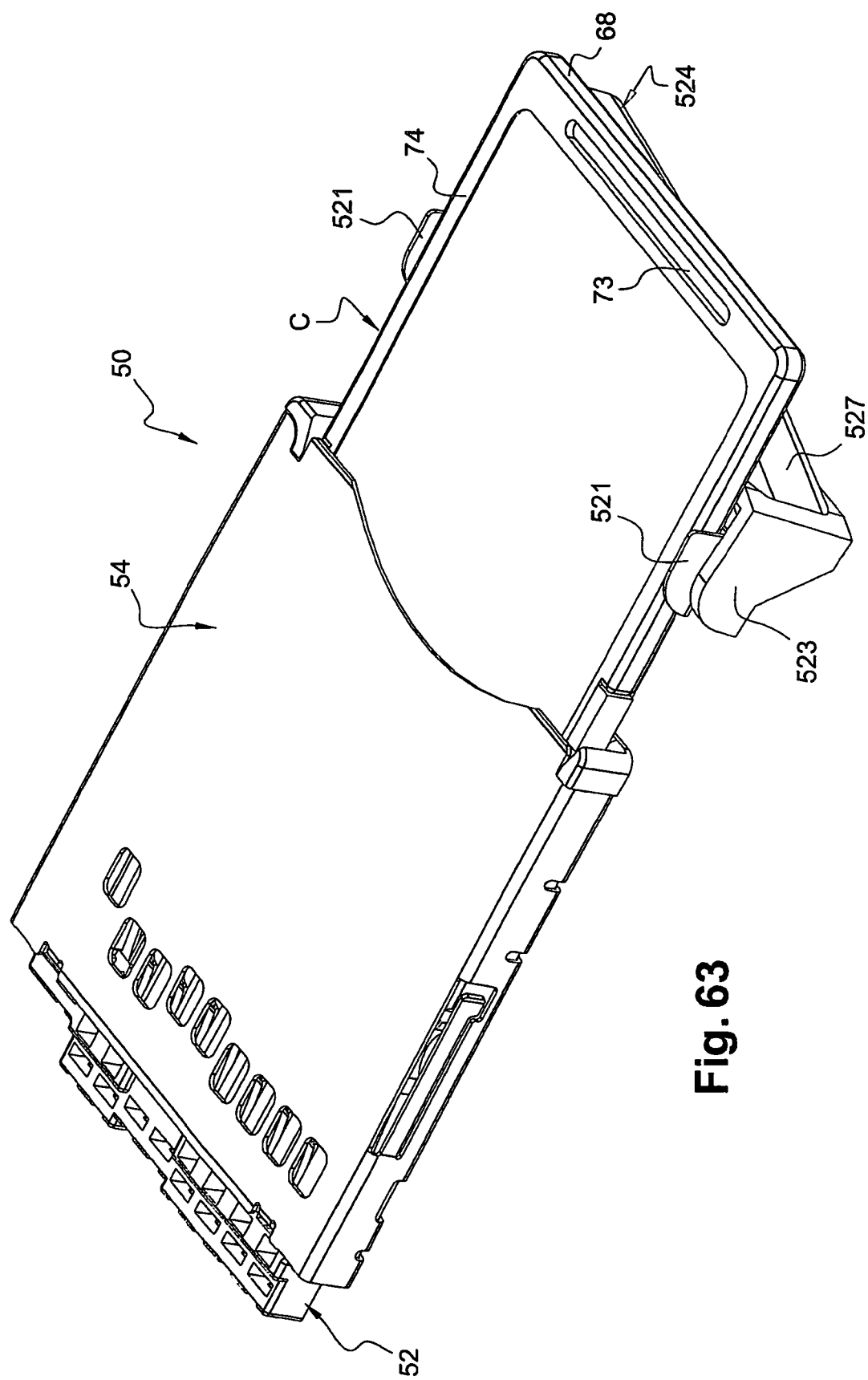
FIGS. 63 and 64 are views similar to those of FIGS. 61 and 62 in which the card is in the process of being extracted from the slider with the gate in the retracted lowered position.
Figure 64:
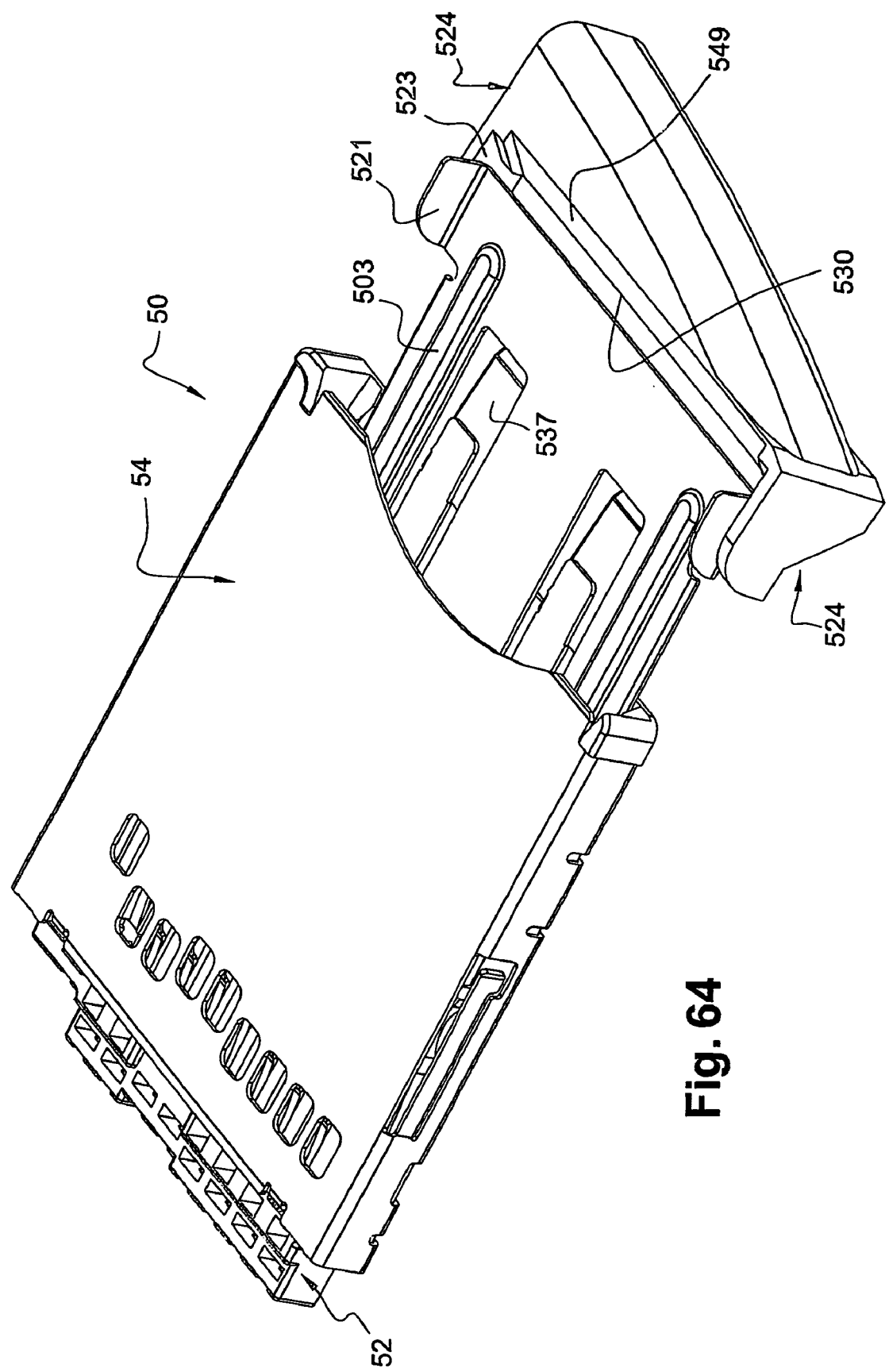
Figure 65:
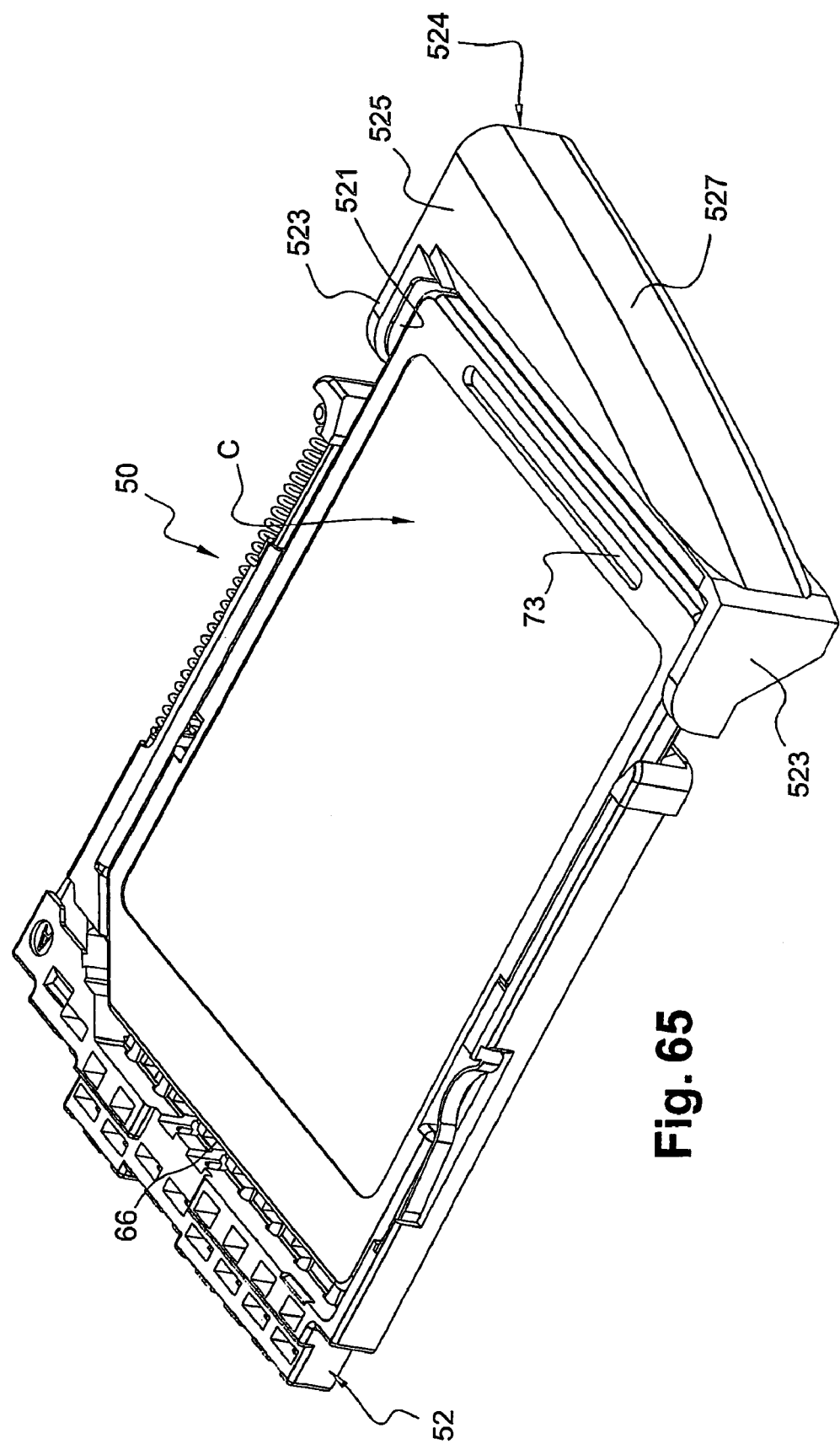
FIGS. 65 and 66 are views similar to that of FIG. 58, without the cover and with neither the cover nor the card, respectively.
Figure 66:
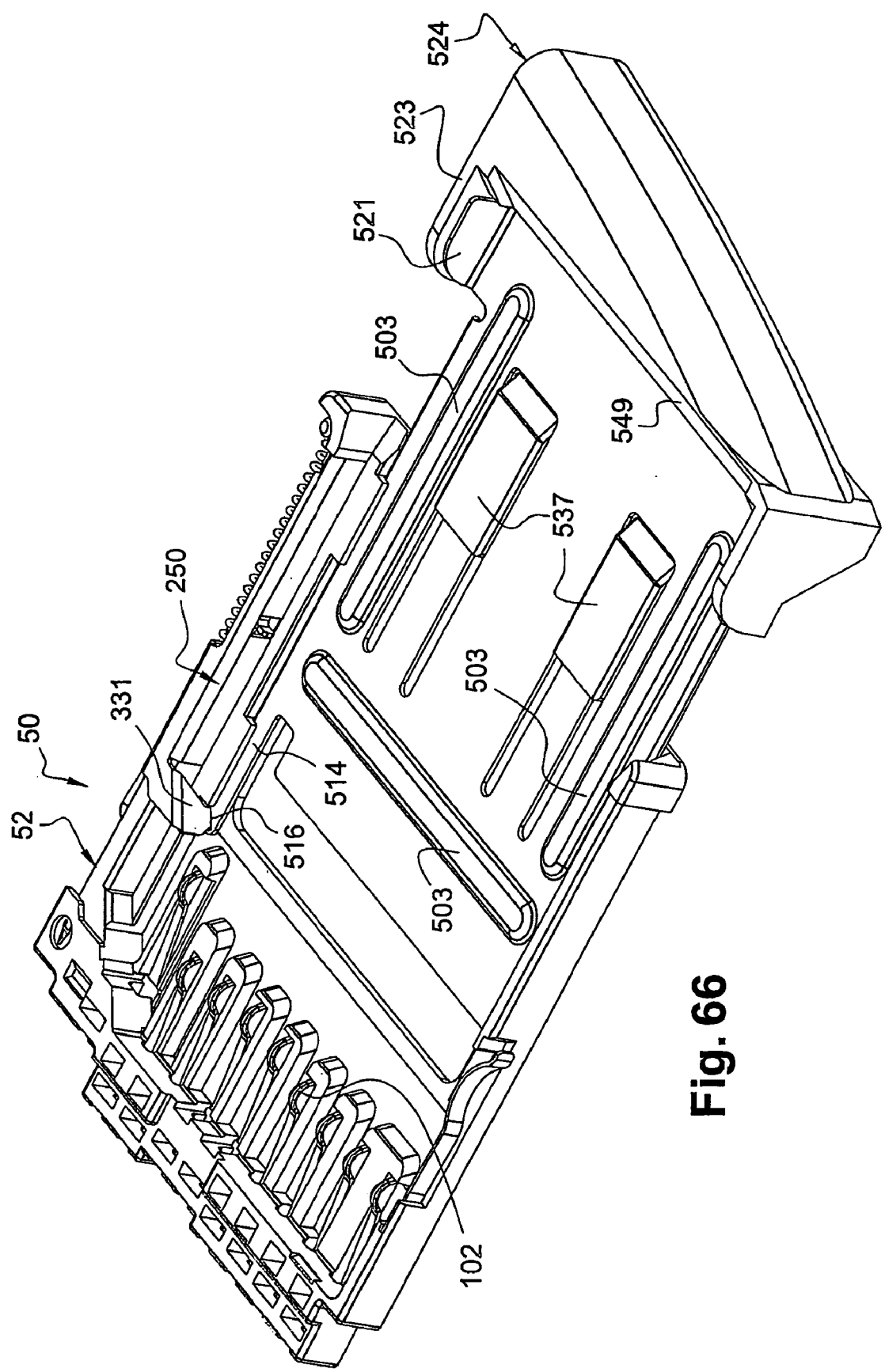
Figure 67:
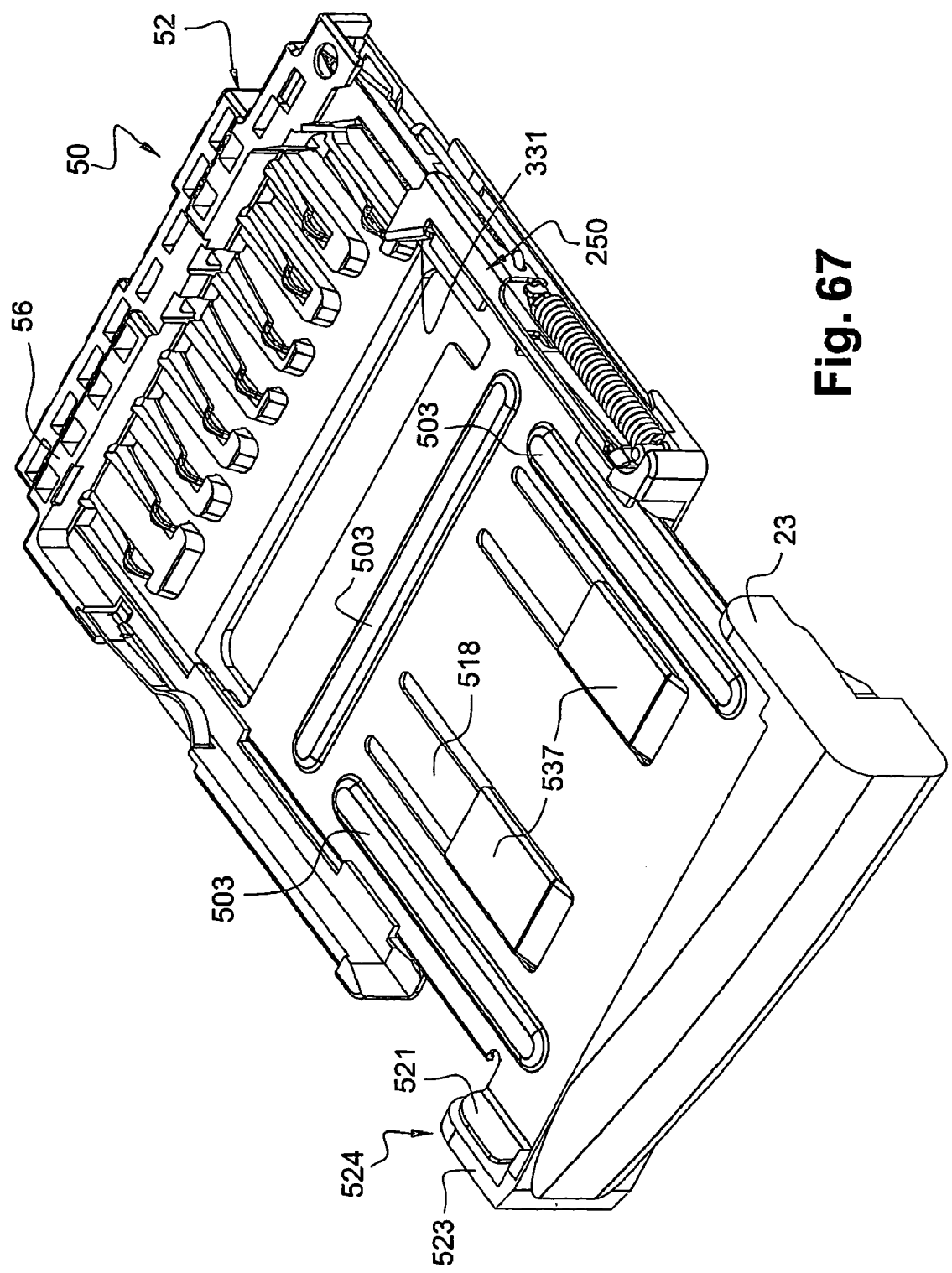
FIG. 67 is a view similar to that of FIG. 66 at another viewing angle.
Figure 68:
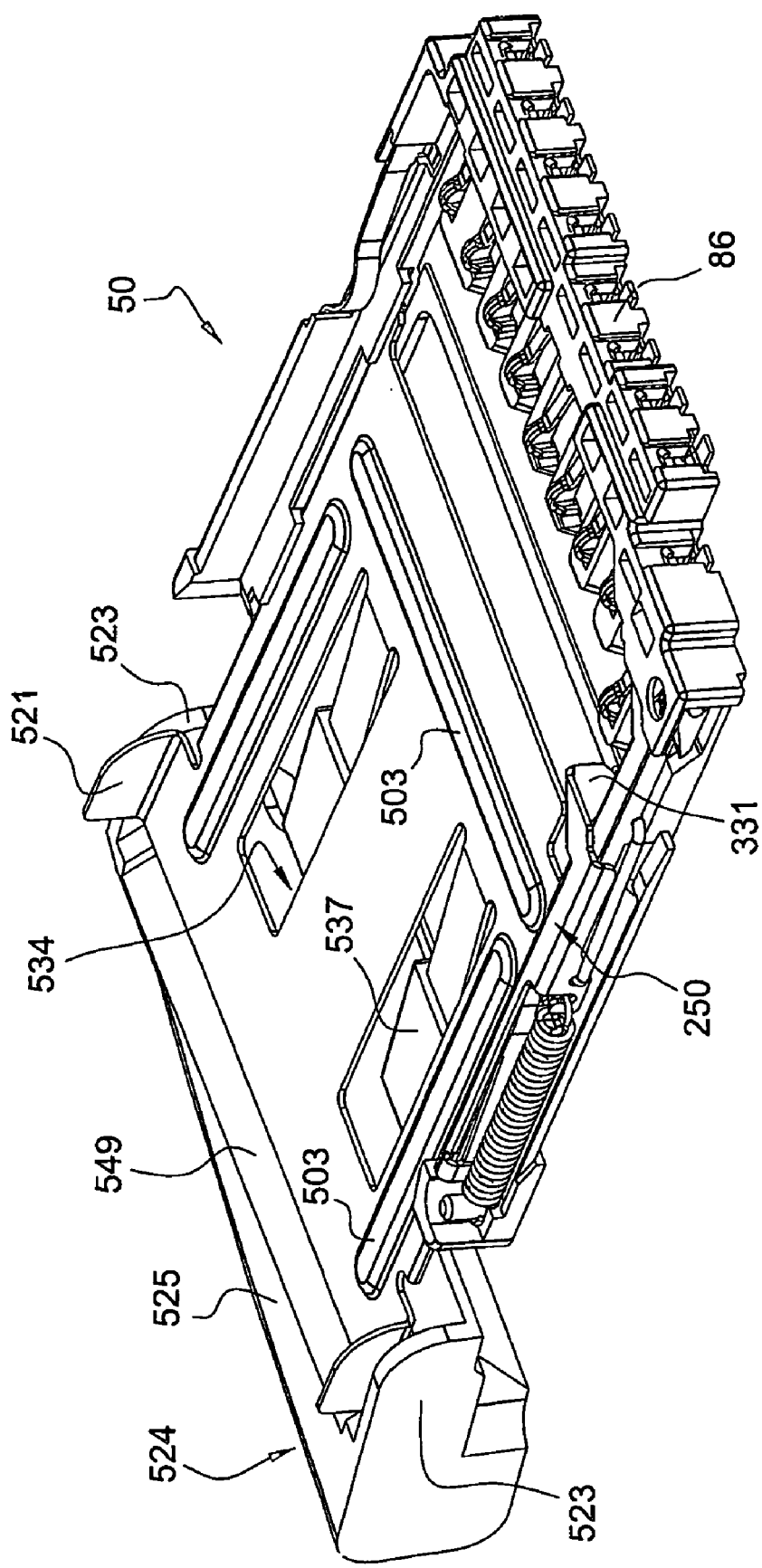
FIG. 68 is a view similar to that of FIG. 64 at another viewing angle and without the cover.

FIG. 60 shows the bottom of a slider with a pair of flat flexible arms 518, and with three elongated rib 503. As shown in FIG. 66, the ribs project upward and form an elevated surface on which the card rests.

Figure 69:
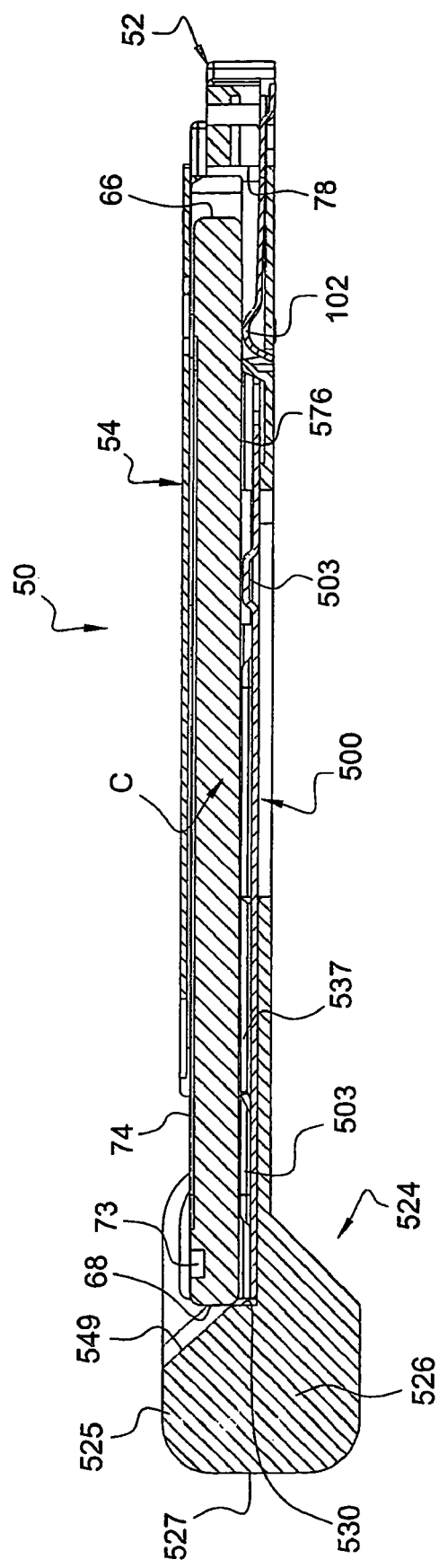
FIG. 69 is a longitudinal sectional view of the connector with the card, with the carriage in the locked position.
Figure 70:
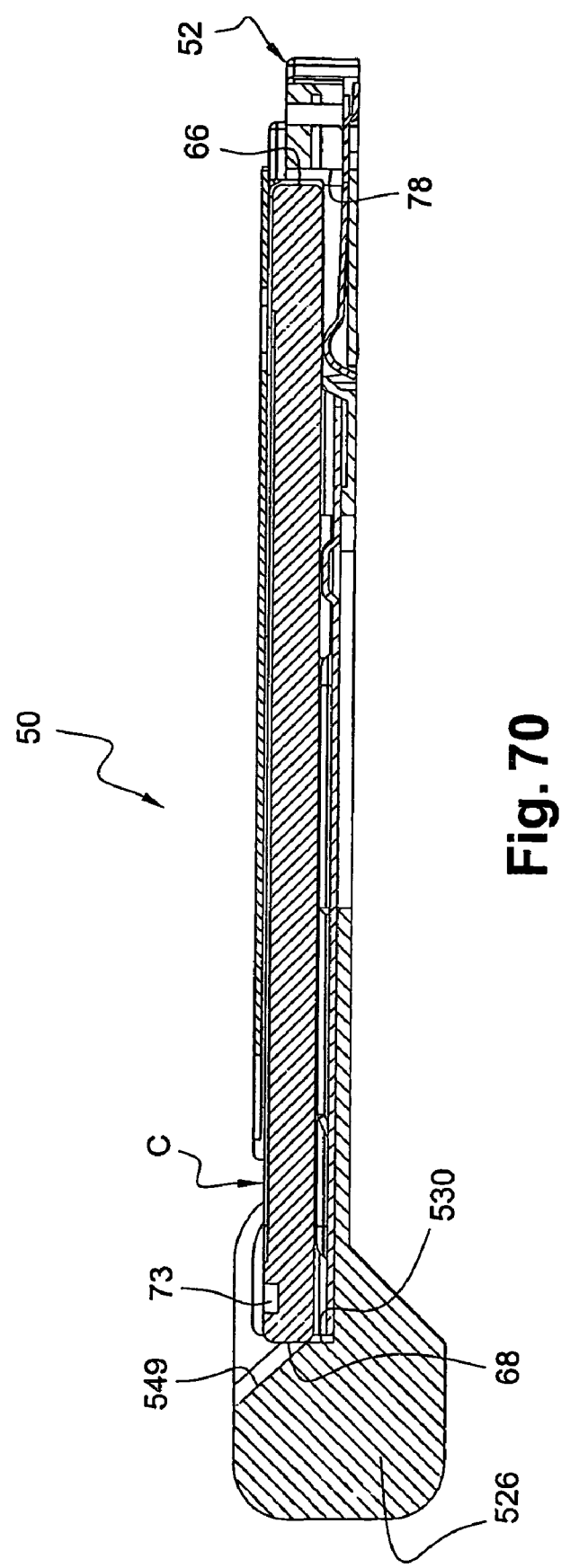
FIG. 70 is a view similar to the previous one, in the pushed-in forward position.
Figure 91:
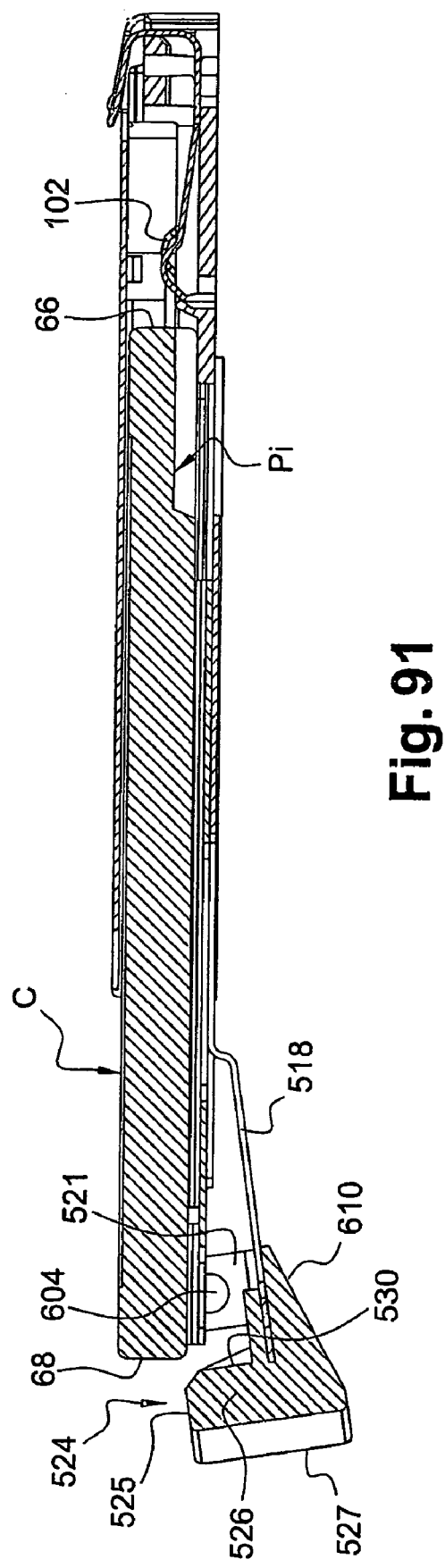
FIG. 91 is a longitudinal sectional view with the slider in the retracted rear position and the gate in the lowered position and temporarily blocked.

FIG. 69 shows a retention bar 526 that has a vertical rear surface 530 with a top no higher than the middle of the height of the card rear end 68. The retention bar also has a ramp 549 that extends at a rearward-upward incline. As the retention bar is depressed, the card can be moved rearward and up along the ramp. FIG. 91 shows a vertical rear surface 530 and with a short ramp behind and above the vertical surface. By "vertical surface" application means a surface with a bottom and top joined by an imaginary vertical line.

Figure 80:
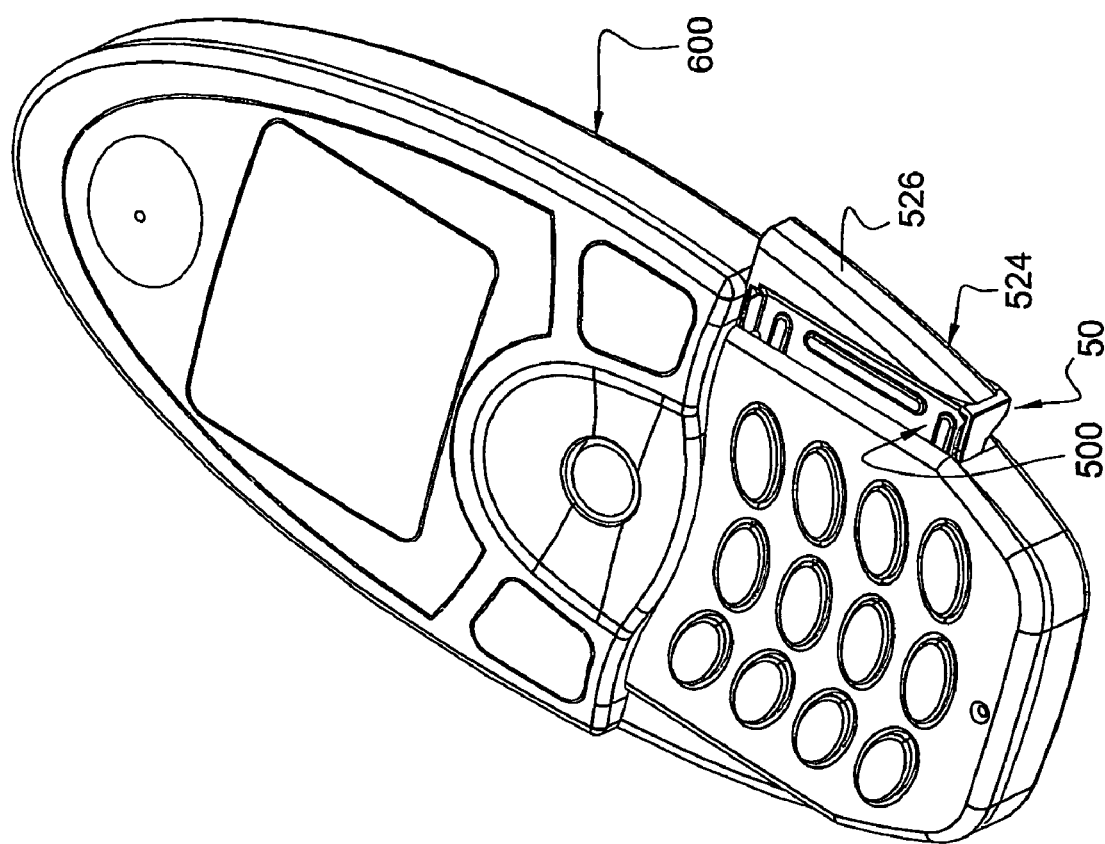
FIG. 80 is an isometric view of a radio telephone, or cell phone, incorporating a connector according to the third embodiment, the latter being shown in the ejected position of the slider and without the card.

FIG. 80 shows the slider in its rearward retracted or released position on a radio telephone, or cell phone. The retention bar 526 has a rear edge that is inclined from the card-engaging front surface of the bar to fit the profile of the cell phone.

Thus, the invention provides a smart card connector of a type that has a housing with a card receiving slot and a slide assembly that moves the card forward and holds it at a fully installed operating position and that later moves the card rearward to a release or retracted position at which the card can be removed. The slide assembly includes a slider having a plate or sheet of resilient material that lies under the card and that can support the card for smooth forward and rearward card movement. The sheet has a front end forming or joined to, a retention bar with a front surface that abuts the rear edge of the card. The resilient sheet can be bent to lower the retention bar in the rearward release position of the slider to enable removal of the card. Means such as equipment that the connector is mounted in or which is part of the connector housing, lies closely under the retention bar in the forward operating position of the slide assembly, to prevent downward deflection of the retention bar at that position. The slide assembly also includes a carriage of the type that is biased rearwardly by a spring and that is coupled to a double click mechanism, and that is connected to the slider to slide forward and rearward with it.

While terms such as "downward", "top", etc. have been used to describe the invention as it is illustrated, it should be realized that the connector can be used in any orientation.

2. Detailed Description of the Invention

In the description that follows, identical, similar or analogous components will be denoted by the same reference numbers.

By non-limiting convention, the terms "lower", "upper", "front" and "rear" will be adopted when referring to the figures.

A first embodiment of the invention shown in FIGS. 2 to 39 will now be described in the case of a connector designed to receive the "Memory Stick Duo" memory card sold by Sony.

This card, illustrated in FIG. 1, has in particular an immobilizing notch 75 in its left lateral edge 70.

The figures show an electrical connector whose general design is similar to that of the connector described and illustrated in document WO-A-02/089040, especially as regards the design of the "push on/push off" ejection slide with its means for retaining the card via its notch.

Thus, the electrical connector 50 (FIG. 12) essentially consists of an insulator support 52 made of plastic in the general form of a plate, which is bounded by a plane horizontal upper face 56 (FIG. 2) in and which forms a part of a card receiving cavity or slot 58.

The slot 58 is bounded vertically downwards by a horizontal lower bottom wall and is open longitudinally rearwards in order to define, downwardly and laterally, a slot for the longitudinal (front F and rear R directions) insertion of the front portion of an electronic memory card, which is for example a card C (FIG. 1) of the Memory Stick Duo type.

The card C of known design, shown in FIG. 1, is of rectangular general shape bounded longitudinally by a transverse front end edge 66, by a transverse rear end edge 68 and by two opposed parallel lateral edges namely the left lateral edge 70 and the right lateral edge 72.

The left front corner corresponding to the intersection of the edges 66 and 70 has a rounded corner face 64.

The card C also has a horizontal lower face 74 with the contact pads Pi therein, and a parallel opposed upper face 76. The blade contacts 100 (FIG. 9) of the connector have contact ends 102 and have connection ends that extend downwards to a printed-circuit board PCB (FIG. 21).

The card C (FIG. 1) has, near its transverse front end edge 66, a series of conducting contact pads Pi that are oriented downwards towards the printed-circuit board that carries the connector on its upper face.

The card C, having a blocking notch in its left edge, is thus capable of being inserted forwardly into the cavity as far as the point when its front transverse edge 66 (FIG. 21) butts, directly or indirectly, against a front transverse end wall edge 78 that defines the slot 58 at the front.

The opposed lateral edges 70 and 72 of the card C are guided slidingly in the slot by opposed parallel longitudinal edges 80 and 82 (FIG. 12) which define the slot 58 transversely.

As may be seen in the figures, the actual slot 58, in which the front portion of the card C is housed, is bounded transversely at the front by the end wall edge 78.

To improve the sliding lateral guiding of the card C during its insertion into the slot 58 or its extraction therefrom, the body of the insulator support 52 (FIG. 12) has two long opposed longitudinal extensions or arms 88 and 90 that extend longitudinally rearwards beyond the middle rear end 84 (FIG. 25) in order to increase the length of the longitudinal guiding edges 80 and 82.

According to a technique known in the field of connectors for connecting smart cards, the insulator support 52 (FIG. 10) carries a series of contact elements 100, here ten in number, which are produced in the form of elastically deformable blades, a free contact end 102 of which projects vertically above the plane of the bottom face 56 in order to cooperate with the conducting pads Pi (FIG. 1) that can be seen on the lower face 74 of the card C.

Each contact blade 100 (FIG. 10) has a tab-shaped rear free connection end 104 (FIG. 5), this being designed here in the form of a tab to be soldered onto the surface of the upper face of the printed-circuit board.

The connection ends 104 of the blades 102 extend here longitudinally forwards beyond the front transverse face 86 of the insulator support 52.

In the embodiment illustrated in the figures, the connector 50 comprises, in addition to the insulator support 52, a metal or metallized lid (or cover) 54 (FIG. 2) that in particular lies above the upper face 56 of the insulator support 52 with its upper plate-shaped main part 60 that closes the card-receiving slot 58 at the top.

The connector 50 illustrated in the figures includes an ejection device 248 (FIG. 12) for ejecting the card from the connector 50.

In a known design, the ejection device or slide assembly 248 essentially consists of a sliding carriage or slide 250, an ejection spring 254, a U-shaped locking hook 256 and a complementary insulative support part 258 (FIG. 26) of the insulator support 52.

The support part 258 is open laterally, that is to say towards the outside of the insulator support 52, and is bounded overall by a horizontal wall 262.

The part 258 thus forms a cavity that is bounded at its front longitudinal end by the left front corner of the insulator support 52 and by the right rear corner 166 bounded by the rear transverse face of the longitudinal arm with a card insertion chamfer.

The rear corner or block 266 has a vertical cylindrical pin 270 for fastening the hook-shaped rear longitudinal end 253 (FIG. 25) of the spring 254, which is a tension coil spring, the cylindrical body 255 of which is housed in the part 258 (FIG. 26), which has two vertical ribs 275 and 277 for guiding the slide 250 as it slides longitudinally.

Between the transverse front end face 276 of the rear rib 275 and the transverse rear end face 294 of the front rib 277, the part 258 is open transversely to the inside, towards the slot 58 and therefore towards the left lateral edge of the card when the latter is in the connector.

The slide or carriage 250 is produced here in the form of a piece made from cut and folded sheet metal.

Overall, it is in the form of a U-shaped member of longitudinal general orientation which, in the mounted position, straddles the rear rib 275 and front rib 277 that guide it so as to slide longitudinally in both directions relative to the insulator support 52.

The carriage 250 (FIG. 32) is bounded longitudinally rearwards by its transverse rear end edge 322.

It is elastically returned by the tension spring 254 (FIG. 25), the hook-shaped front longitudinal end 257 of which is received for this purpose in a notch 324 (FIG. 32) formed near the rear transverse edge 326 of the front outer lateral flange 316 of the slide 250.

The inner lateral flange 310 extends substantially over the entire length of the carriage 250 and is bounded longitudinally to the front by a front end edge 328.

Near its front longitudinal end, the slide 250 has a drive branch 331 which extends, in a transverse vertical plane, towards the inside relative to the plane of the flange 310 so as to be received inside the housing 58.

The sheet metal from which the carriage 250 is produced is thick. The carriage back or top 312, which straddles the upper edges of the ribs 275 and 277 (FIG. 26), is located vertically slightly set back, or below, the horizontal top face of the insulator support. The carriage 250 thus is able to slide longitudinally relative to the insulator support 52 beneath the upper horizontal plate 60 (FIG. 2) of the cover 54.

The card ejection carriage 250 here also has means allowing it, in a known design, to provide a longitudinal card blocking function.

This function is unnecessary within the context of implementing the principles of the present invention insofar as the carriage is attached to a rear gate which provides a card retention function and therefore prevents the card from moving longitudinally relative to the carriage.

However, the carriage may nevertheless be of the type with card blocking, especially so as to standardize as many components as possible within a range of connectors and also insofar as the card blocking means 186 (FIG. 33) incorporated into the slide are compatible with implementation of the invention.

For this purpose, the inner lateral flange 310 also has a rectangular window 332 (FIG. 33) placed at approximately half way along its length, which is designed to allow passage of a spur 186 for blocking a card C and which can in fact be received in the blocking notch 75 (FIG. 1) of the left longitudinal edge of the said card.

The spur 186 is formed at the front longitudinal end of a resilient blocking blade 184 (FIG. 32) that is made as one piece, by cutting and folding, with the slide 250.

Finally, the front outer lateral flange 316 has a hole 340 intended to receive the rear end strand 342 (FIG. 7) of the wire 256 of the double click mechanism.

The U-shaped wire 256 is a bent wire element having a main portion 344 of longitudinal orientation and two perpendicular strands, a rear strand 342 and a front strand 346, which, in the mounted position of the U-shaped member, extend transversely towards the inside so that the strand 342 is housed in the hole 340 in the slide 250 and so that the front strand, of greater length, is housed in the heart-shaped locking cam 265.

Figure 26:
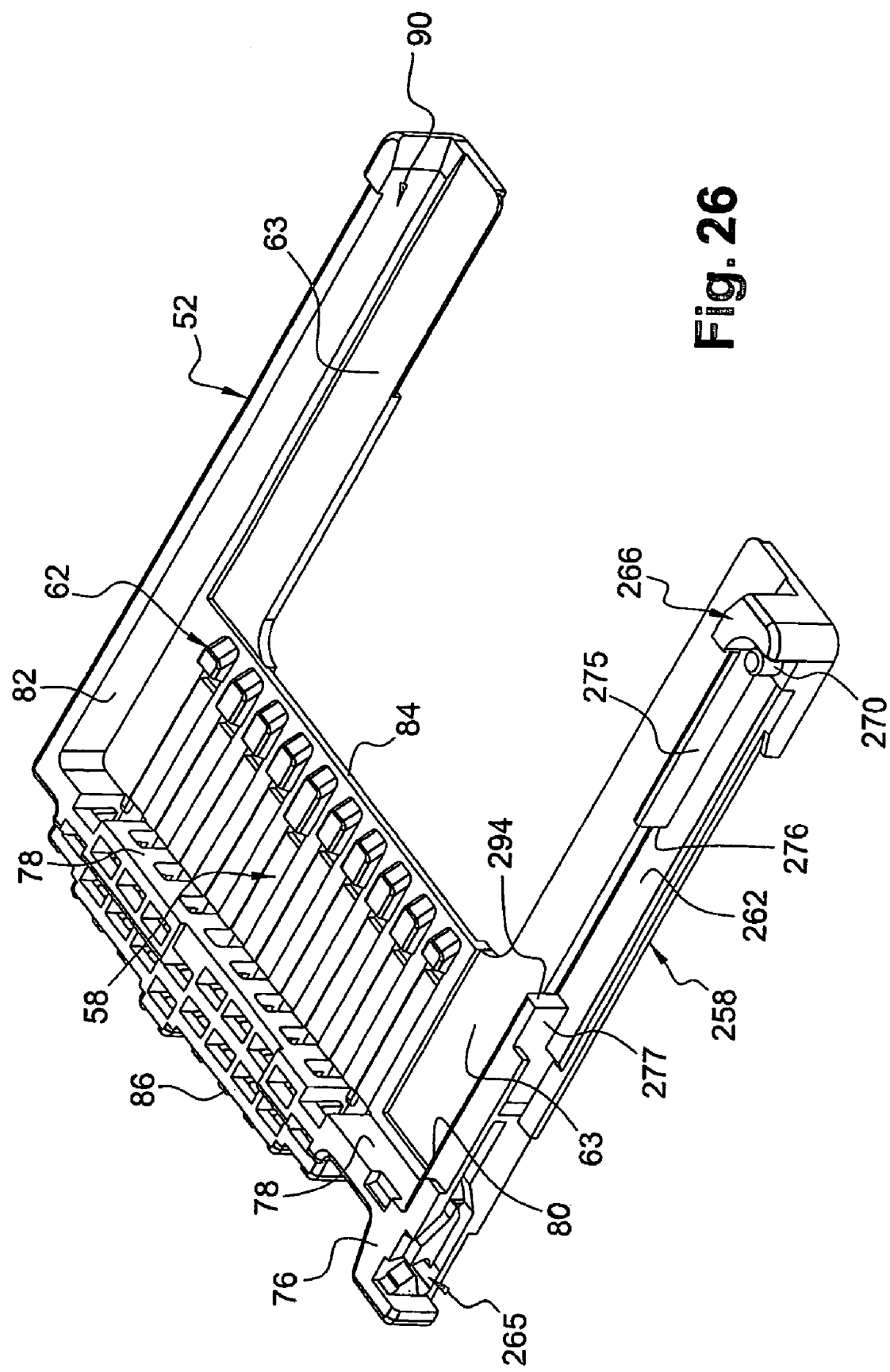
FIG. 26 is a view similar to that of FIG. 25 of just the insulator body, or insulative support.
Figure 27:
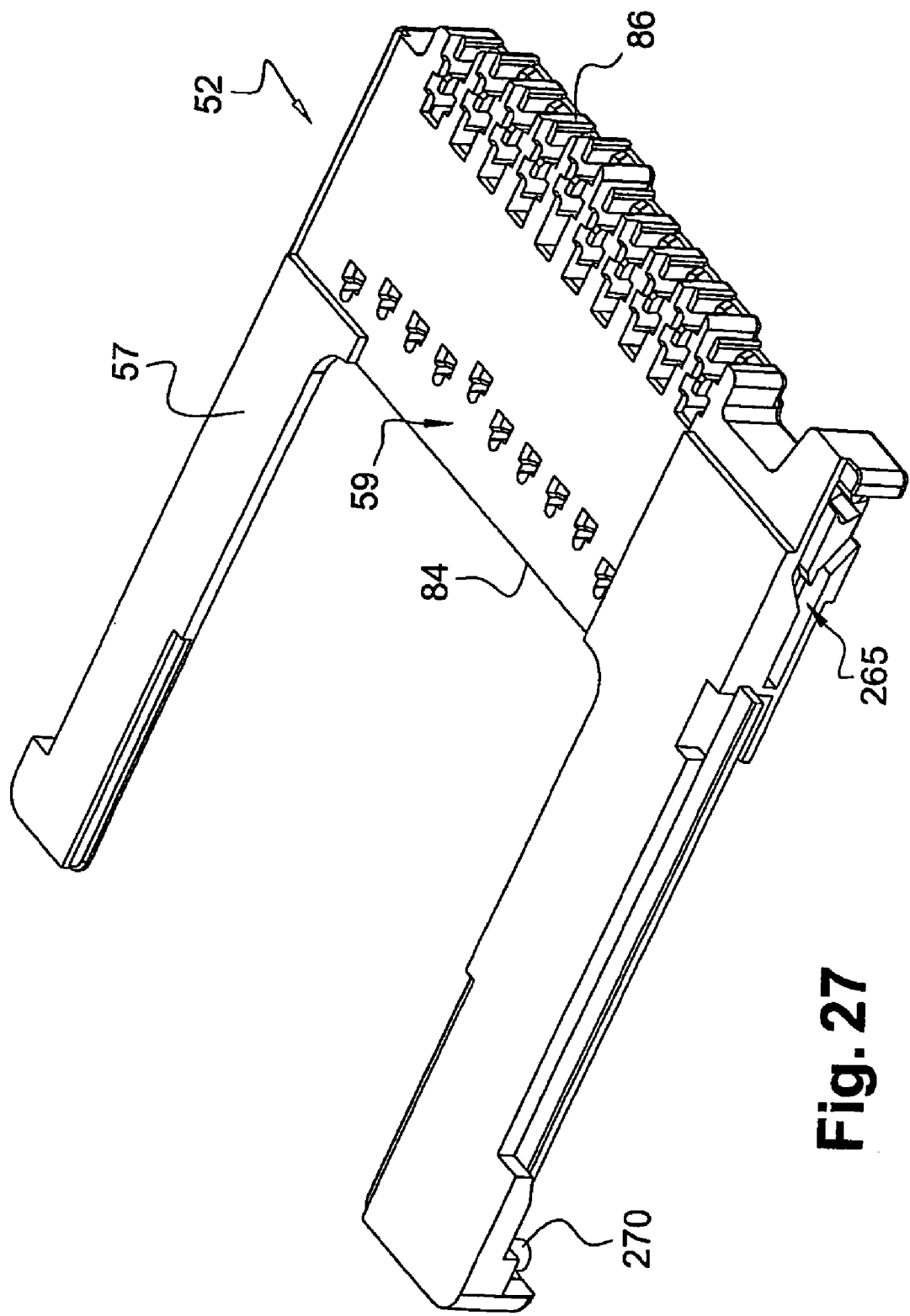
FIG. 27 is a bottom view of the insulative support of FIG. 26.

The drive branch 331 (FIG. 32) is connected to the inner flange 310 by a lower horizontal tab 329 in which tab a vertical through-hole 333 is formed for attaching the card slider 500 (FIG. 10) to the carriage 250. In the pushed-in position of the slide, it butts against the facing portion of the vertical end wall 78 (FIG. 26).

The card slider 500 illustrated in detail in FIG. 28 et seq. is a piece with the general shape of a thin horizontal plate interposed vertically between the bottom wall and the lower face 76 of the card, which here is a piece of cut and folded sheet metal.

It comprises a central body 502 (FIG. 28) in the form of a plate which bears, near its rear edge 504, two slideways 506 and 508 which mount on two complementary rails 89 and 91 (FIG. 10) so as to slide therein, the said rails being formed in the lower and transversely inner longitudinal edges of the arms 88 and 90 of the insulative support.

Beyond its front transverse edge 510 (FIG. 28), the central plate 502 is extended forwards by a front guiding and stabilizing plate 512 (FIG. 28) which always lies at least partly housed in a recess 59 (FIGS. 12 and 20) in the horizontal lower face 57 (FIG. 5) of the insulator support 52.

The card slider also has a front coupling arm 514 (FIG. 28), the front free end of which has a coupling finger 516 that extends vertically upwards and is permanently housed in the coupling hole 333 (FIG. 33) of the slide 250.

The arm 514 (FIG. 28) is in the same plane as the central plate 502 and extends horizontally above the facing portion of the end wall 62 (FIG. 26) that has a recess 63.

The recess 63 formed from the two sides also makes it possible to house the lateral edges of the central plate 502 which is thus "lodged" in the thickness of the insulator body with its upper face coplanar with the end wall 62.

The carriage 250 and the slider 500 thus constitute a movable slider assembly, which moves longitudinally forwards or rearwards.

Beyond its rear edge 504 (FIG. 28), the central plate 502 is extended rearwards by a pair of rear longitudinal arms 518 which are normally coplanar with the central plate 502.

The arms 518 constitute two flexing beams that can deform elastically relative to the initial rest plane so that their rear free ends 520 (FIG. 29), which are connected by a rear transverse arm or bar 522, can be displaced overall downwards.

The rear arm 522 constitutes a tab for mounting and fastening the rear gate 524 having the retention bar 526 (FIG. 28).

The gate 524 is a plastic molded part consisting essentially of a rear transverse bar 526 for retaining the card C.

The bar 526 (FIG. 30) has a recess 528 complementary to the shape of the rear end portion of the card C, which recess has especially a rear vertical transverse face 530 that forms stop, which faces the rear edge 68 of the card, and a horizontal bottom 532.

The gate 524 also has a front lower extension 534 that includes a horizontal slot 536 emerging towards the front, in which the rear transverse arm 522 (FIG. 29) is housed and fixed.

The entire gate 524 is bounded downwards by a lower horizontal face 538 (FIG. 22).

The horizontal upper face 532 (FIG. 19) common to the slot 528 and to the extension 534 is coplanar with the upper face of the arms 518 and of the central plate 502.

When the card lies in the slider 500 in the partially installed position shown in FIG. 23, its rear edge 68 lies opposite the front transverse face 530 of the retention bar 526.

The card front edge 66 (FIG. 7), with its corner 64, faces the drive branch 335 (FIG. 10). A complementary polarizing tab 331 faces a set-back portion 66' (FIG. 1) of the edge 66.

FIGS. 19 to 24, which illustrate the operation in association with an item of electronic equipment E fitted with the complete connector 50, show an alternative embodiment of the lower part of the door 524, which has a thickened lower heel 541 bounded by a lower face 543 offset downwards relative to the inner or forward face 538. The heel 541 is also shown in dotted lines in FIG. 31.

If the user pushes the bar 526 forwards, by acting on its external rear transverse face 527, it brings the slider 500 and the carriage 250 (FIG. 12) that is coupled to it into the maximum pushed-in position, he then stops pushing, and the carriage 250, and therefore the slider 500, automatically locks in the position shown in FIG. 19.

In this position, especially as shown in FIG. 19, the gate 524, 527 closes off, almost without any clearance, the opening or slot 540 formed in a front face 542 of the case of the equipment or appliance E that is equipped with the connector. The slot is bounded downwards by a horizontal face 545 and upwards by a horizontal face 547 so that its total height is approximately equal to the maximum height of the gate 524 corresponding to the distance that separates the faces 525 and 543.

To unlock the card, the slide 250 must again be unlocked.

For this purpose, the user again pushes the bar 526, 527 forwards as far as the maximum pushed-in position shown in FIG. 21, in which it may be seen that the rear transverse face 527 of the gate 524 is offset forwards inside the slot 240, and then he stops pushing.

Under the action of the spring 254 (FIG. 12), the slide moves rearward to its maximum eject rear position, or retracted position shown in FIG. 22. The gate 524 with the slider 500 has been moved rearward relative to the equipment E, sufficiently to allow the user to lower the gate by pressing vertically downwards on the horizontal upper face 525 (FIG. 23) and elastically deforming the beam-arms 518.

The retention bar 526 of the gate 524 is then moved away downwards, as illustrated in FIG. 24, and it is then possible to extract the card C longitudinally rearwards, out of the slider 500.

This extraction is illustrated in FIG. 24, which shows that the card slides via its lower face over the upper face 525 of the bar 526.

As may especially be seen in FIG. 23, a portion of the lower face 538 of the gate 524 is opposite a facing portion of the lower face 545 of the slot 540 so as to constitute a safety device, which prevents the user from bearing excessively on the gate and plastically deforming the arms 518.

Figure 6:
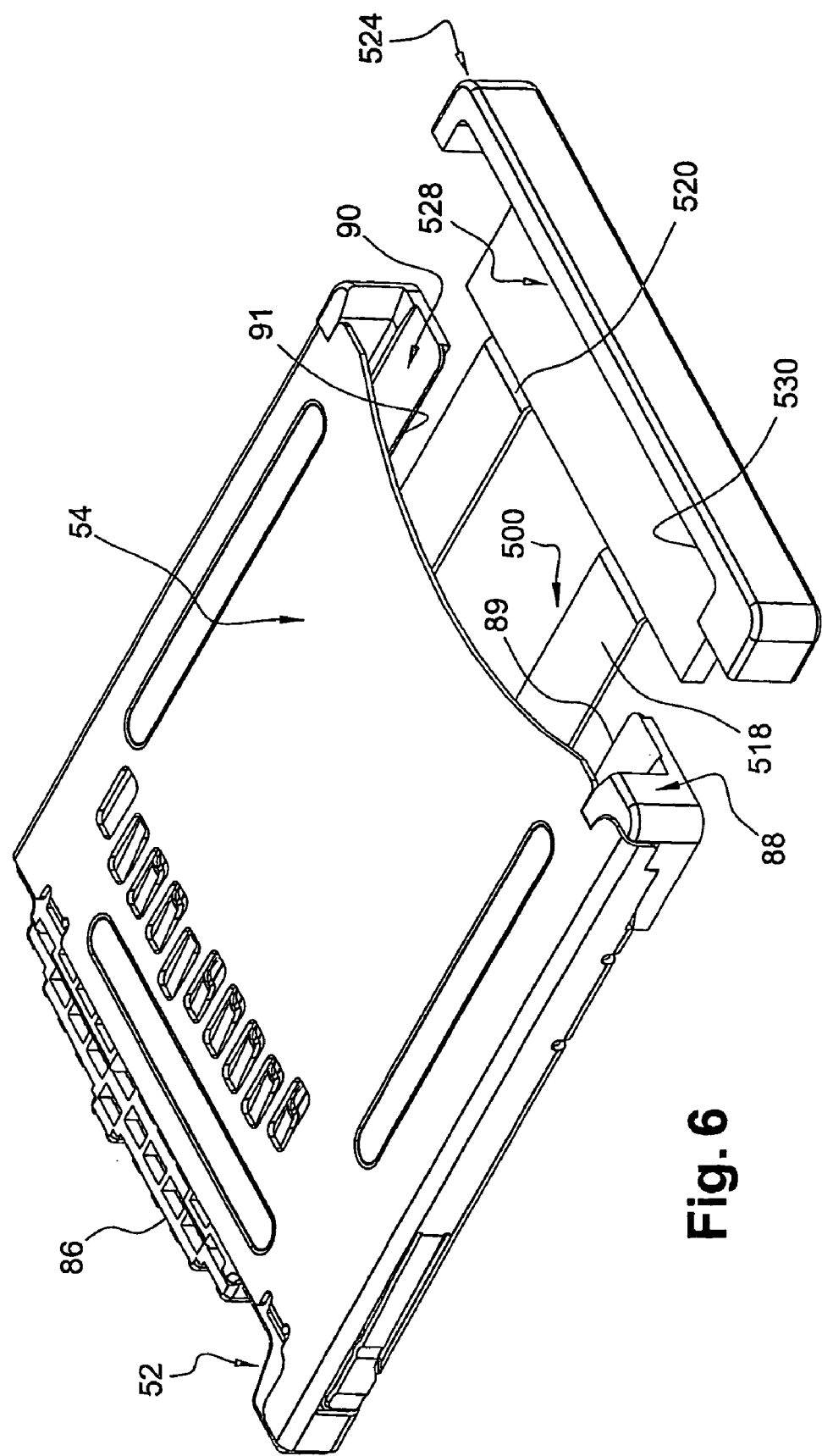
FIG. 6 is a view similar to that of FIG. 2, without the card.

Once the card has been removed, the bar 526 is elastically returned to its high rest position illustrated in FIGS. 2 and 6.

Without the card C, it is possible to "reclose" the slider 500 with its gate, locking it using what is called the "push on/push off" function.

This is because, by acting on the gate 524 and the slider 500, the carriage 250 is acted upon, even in the absence of a card.

To insert a card, with the carriage 250 (FIG. 10) and the slider 500 in the ejected rear position, the user introduces the card into the slider, in the generally horizontal forward direction, by deforming the arms in order to lower the gate and make the card slide into the carriage until it again reaches the position illustrated in FIG. 22.

To make it easier to extract the card C from the slider 500 starting from the position illustrated in FIG. 22, and especially because the upper face of the card C has no groove for making it easier to handle it, it is possible to provide an extraction spring incorporated into the movable assembly 250–500.

Such springs, in this case leaf springs, are illustrated in FIGS. 34 to 39.

For this purpose, the tab 331 of the slide 250 is extended transversely inwards and rearwards by a leaf spring 337, which cooperates with the facing portion of the front edge 66 of the card.

Figure 35:
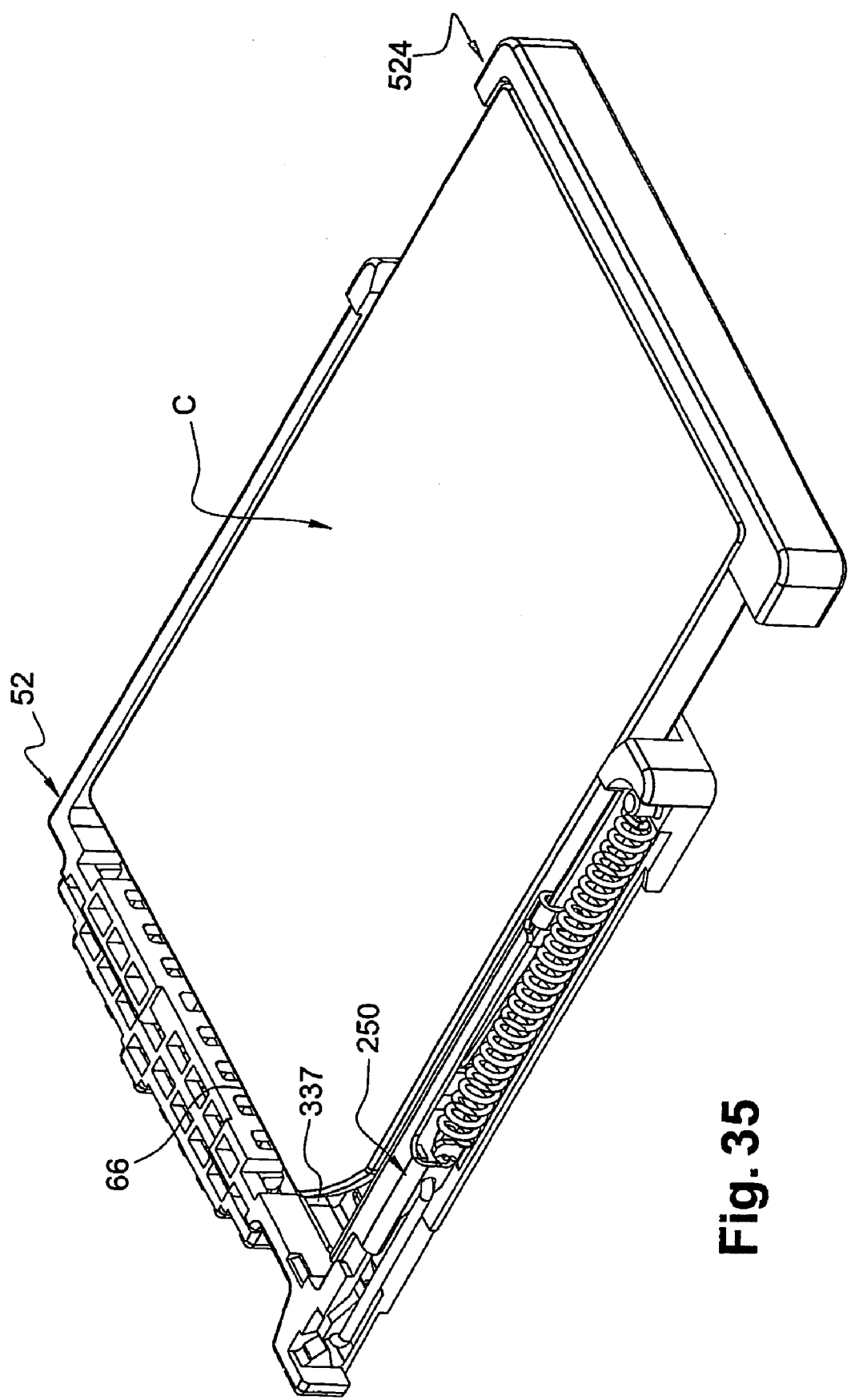

In FIG. 34, the leaf spring 337 is a single curved leaf spring, which is an elastic beam that bends and is tensioned when the card C is in position in the slider 500, as may be seen in FIG. 35.

Figure 36:
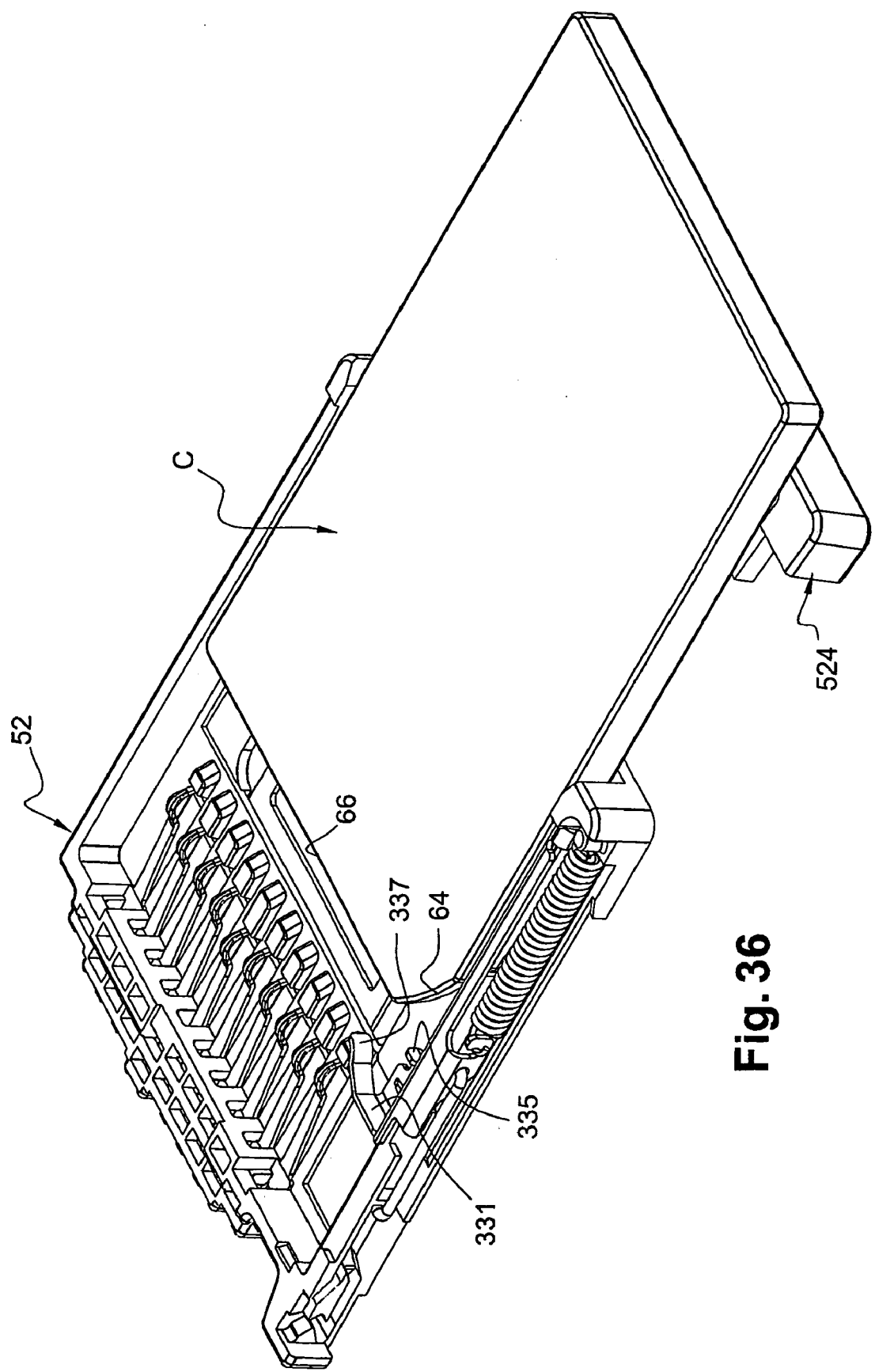

As soon as the gate 524 forming the retention bar has been lowered sufficiently by the user, the tensioned leaf spring 337 causes the card C to be automatically ejected rearwards out of the slider (FIG. 36).

In FIGS. 33 to 39, the leaf spring is bent into a hairpin shape.

The elastic preloading of the leaf spring 337 relative to the spring 254 of the slide is such that it is tensioned by the insertion of the card C, without causing an initial forward displacement of the slide.

For comparison, the second embodiment of the invention illustrated in FIGS. 50 to 57 will now be described, which relates to a MICROSIM card and the connector 50 according to the invention intended to receive such a card.

The card C (FIG. 57) has here a 45° corner face 64 formed by the intersection of its rear transverse edge 68 and its right lateral edge 72.

The polarizing corner face 64 is designed to cooperate with a complementary shape 98 (FIG. 53) formed for this purpose in the right-hand corner of the cavity 528 of the gate 524—this shape 98 ensures that the MICROSIM card C is fitted correctly and unequivocally in the slider 500, and therefore in the connector 50.

Figure 49:
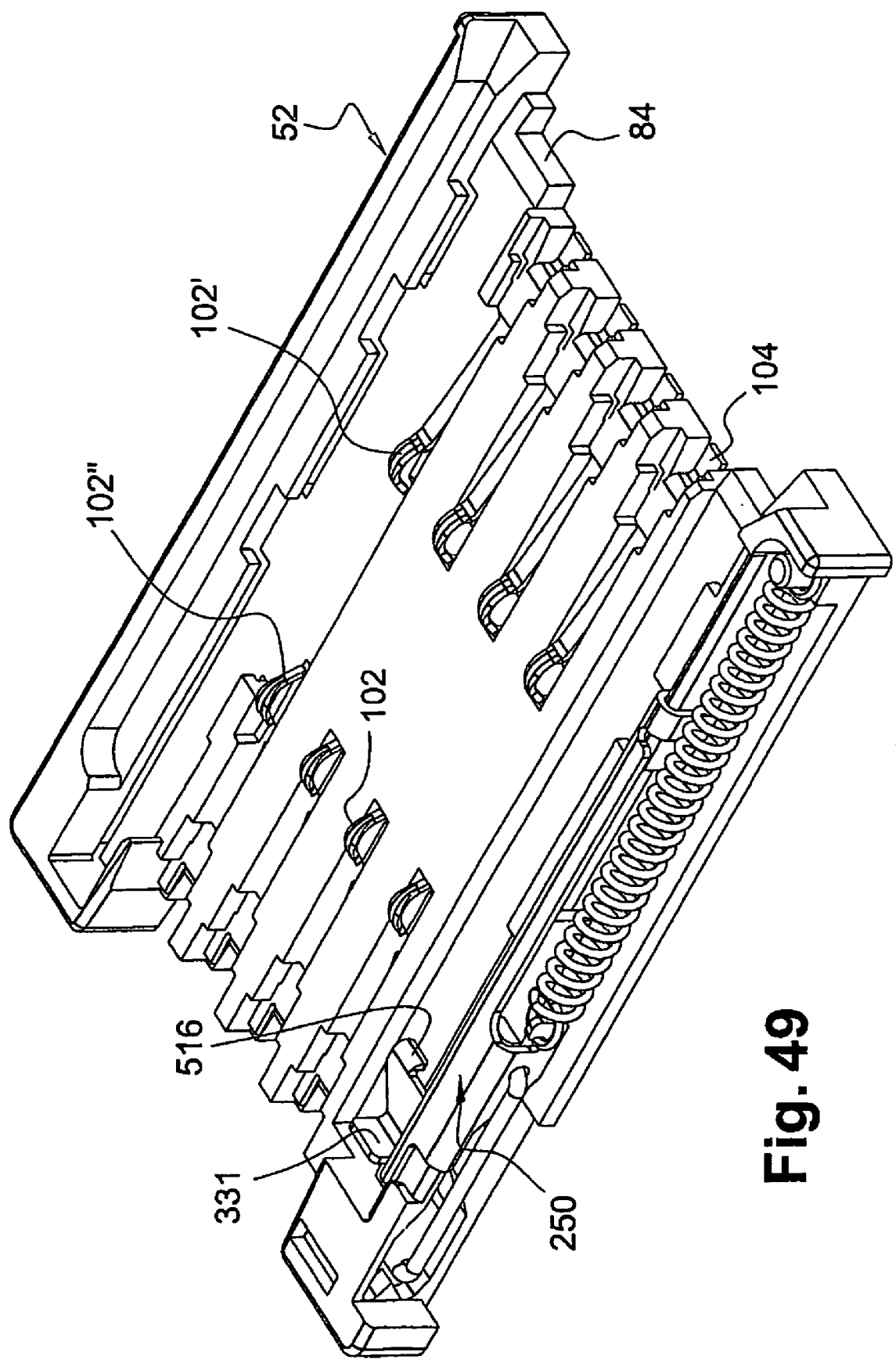
FIG. 49 is a view similar to that of FIG. 47 without the slider and its gate.
Figure 50:
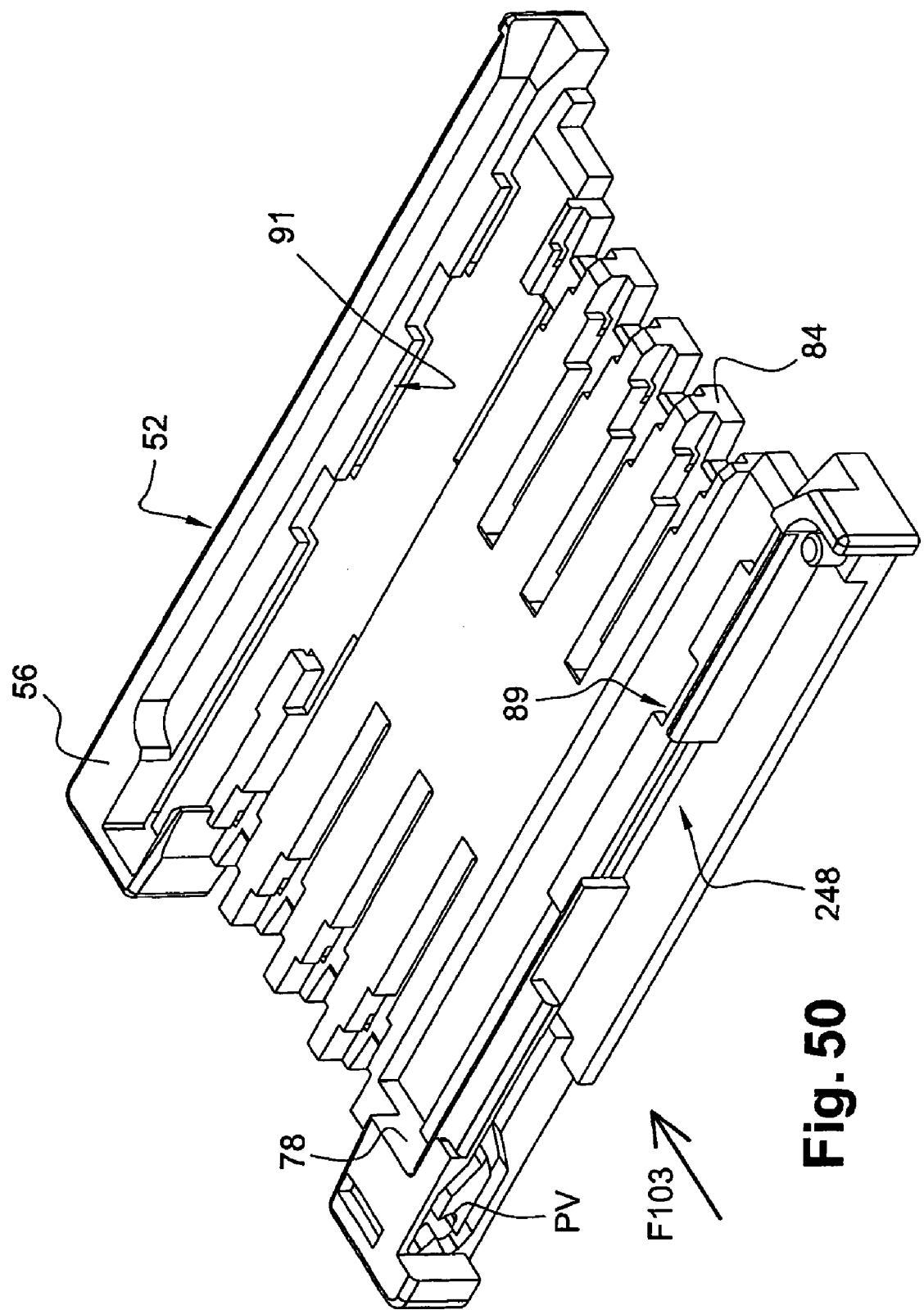
FIG. 50 is an isometric view of just the insulative support of the connector.

The insulator support 52 (FIG. 49) here has contact blades arranged in pairs aligned longitudinally with the free contact ends 102', 102" at the center of the connector in order to correspond to the pads Pi on the lower face 76' of the MICROSIM card.

The connection ends of the blades, not shown in FIGS. 51 to 58, may be of the type to be surface-soldered to the printed-circuit board, as previously, or else of the solderless type using the technique illustrated in FIGS. 100 to 102 in which they are bent back beneath the lower face of the connector and inclined downwards so that their free ends come into electrical contact by elastically bearing on a corresponding track of a printed-circuit board or of a flexible circuit. For this purpose, the cover 54 includes tabs 560 and 562 in three of its edges in order to allow it to catch and to be positioned, by fitting, onto the board.

Figure 52:
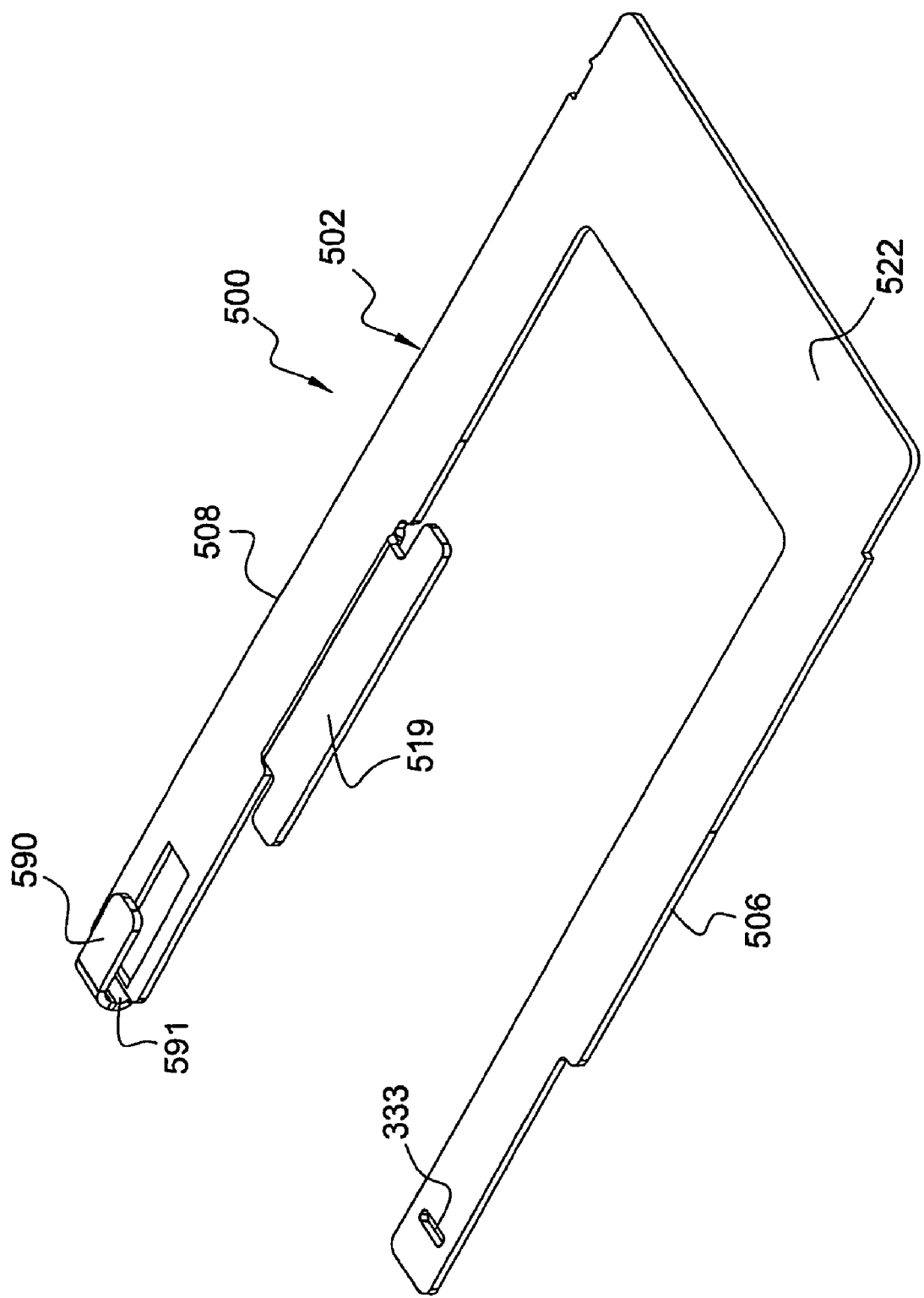
Figure 53:
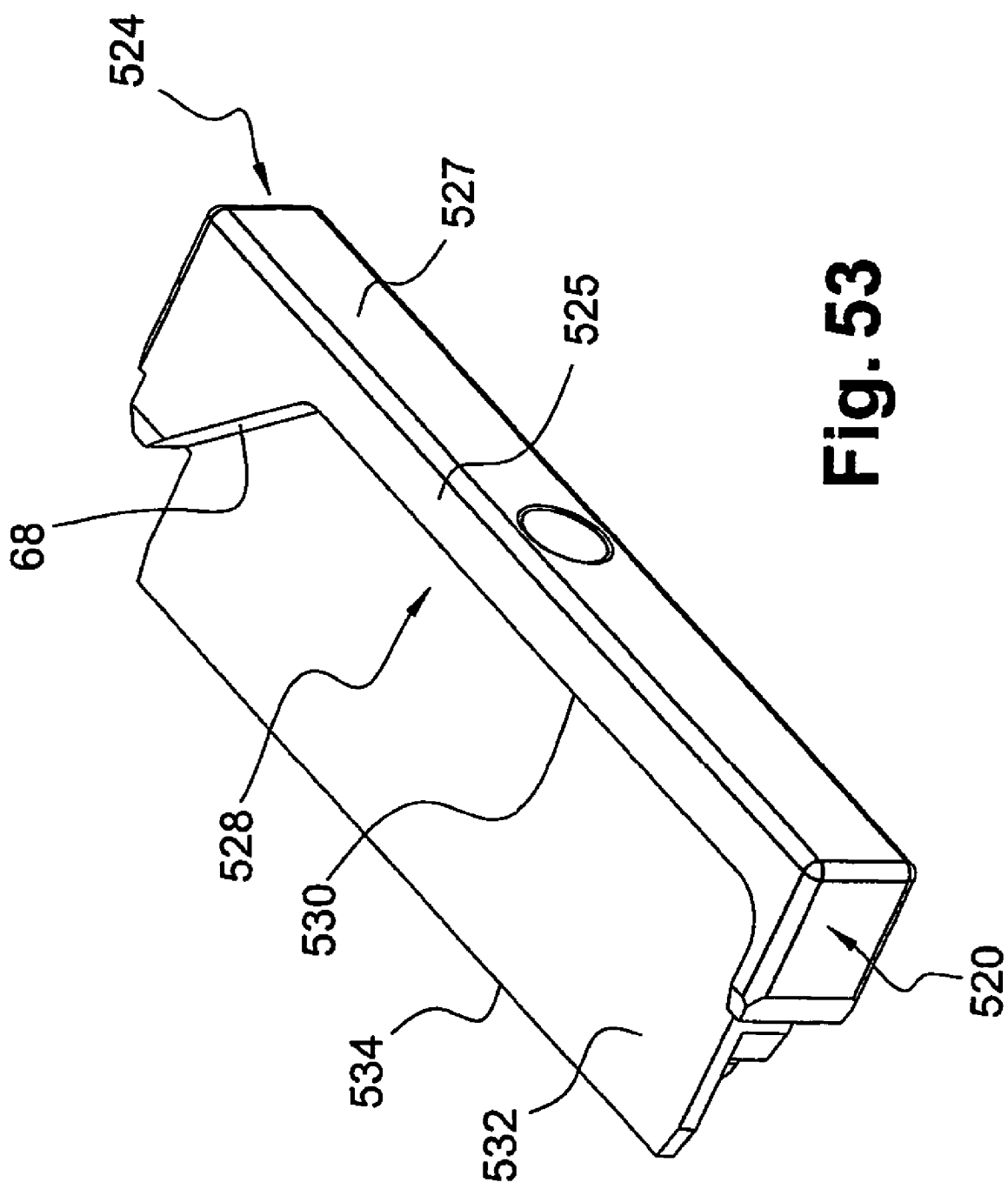
FIGS. 53 and 54 are top and bottom isometric views of just the gate-forming card retention bar.
Figure 54:
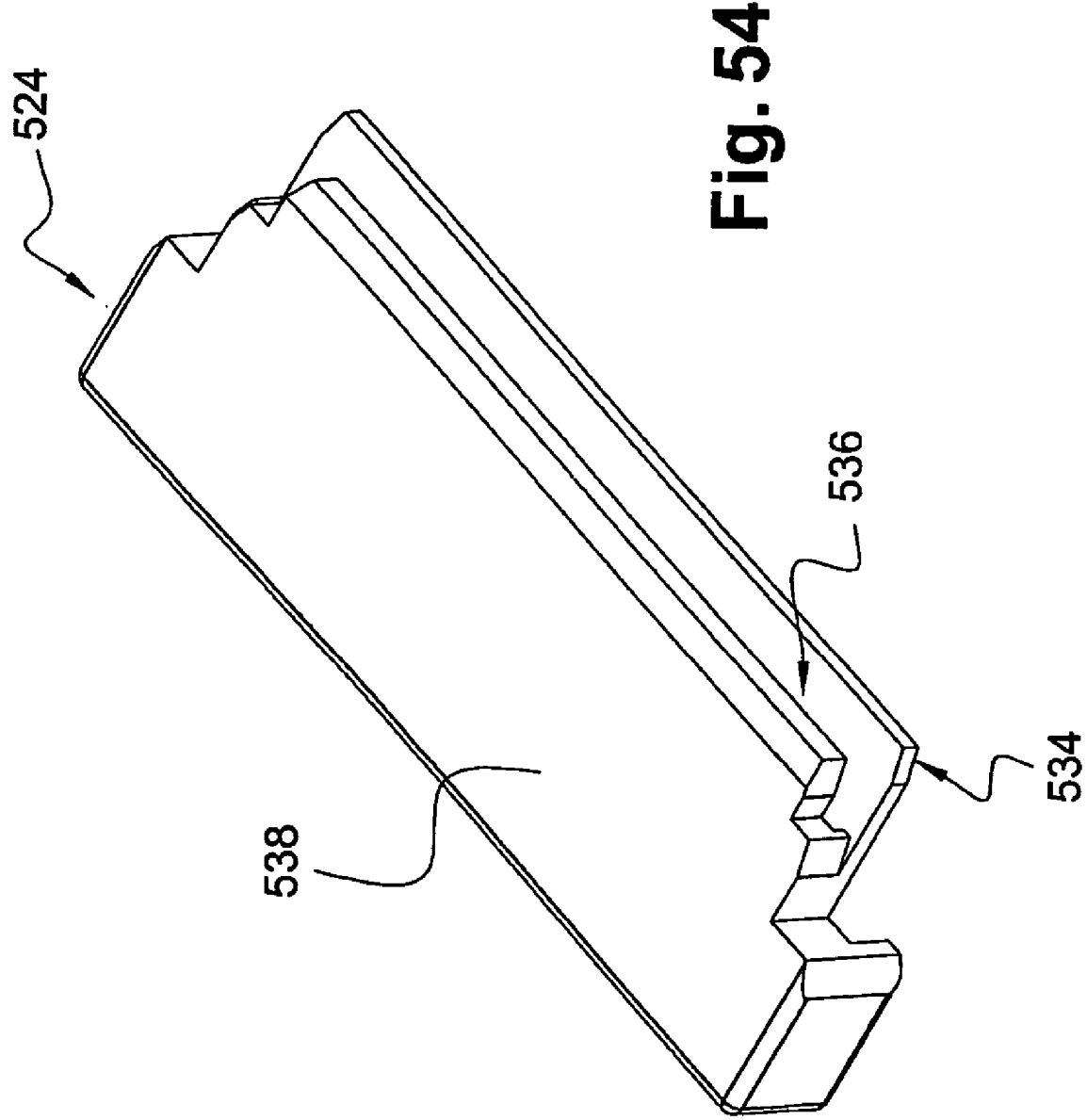
Figure 55:
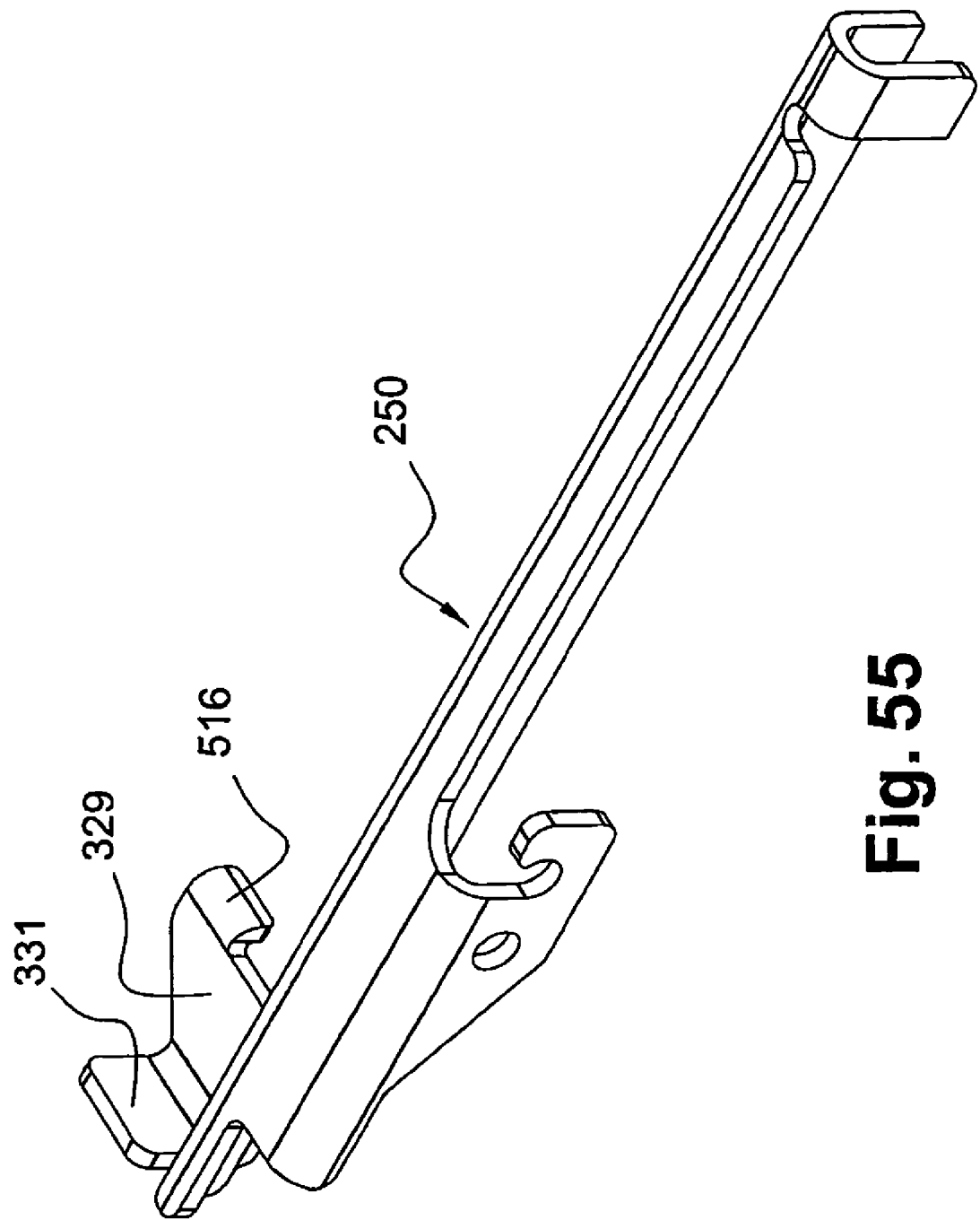
FIGS. 55 and 56 are isometric views of the slide or carriage for ejecting the MICROSIM card.
Figure 56:
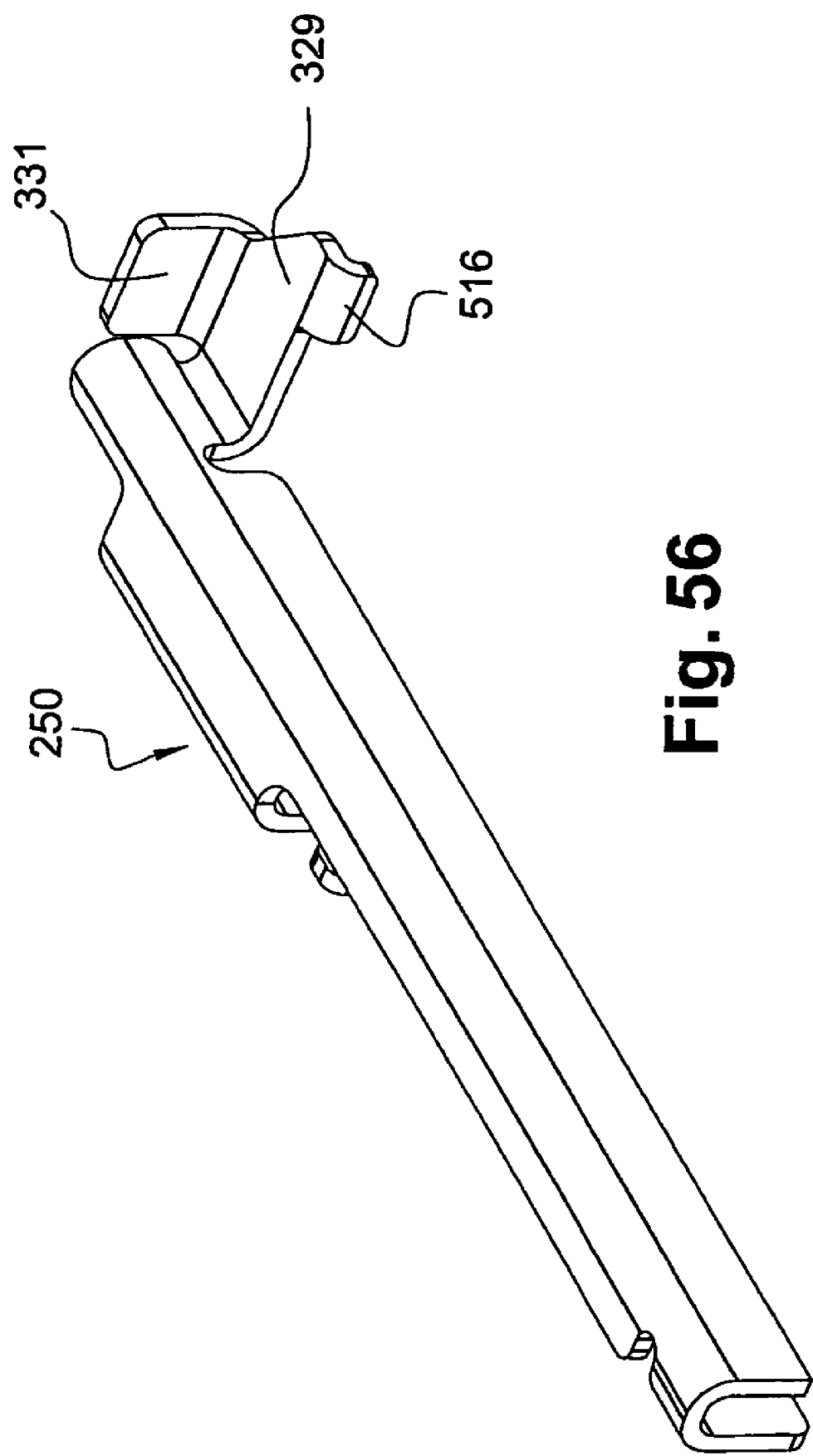

As may especially be seen in FIGS. 51 and 52, the slider 500 is formed essentially by the two parallel arms 518, the left-hand one of which is extended by the coupling arm 514, which in this case has the coupling hole 333, whereas the tab 329 (FIG. 48) of the slide 250 has the coupling finger 516 that is oriented vertically downwards to be received in the hole 333 (FIG. 51) of the slider 500.

The right-hand arm 518 includes a moving switch blade 519 and, at its front free end 529, a tab 590 folded over horizontally, which serves as a guide and positioning means for the card ejection spring 337 (FIG. 48), which here is a helical compression spring interposed between the end wall 591 of the tab 590 and the rear transverse edge 66 of the card.

The rear longitudinal end portion of the slider 500 with its gate 524 has an overall design similar to that described above.

In order for the body 502 of the slider 500 to be guided as it slides, the said body 502 having the general form of a plate cut out into a U, the opposed outer longitudinal edges 506 and 508 (FIG. 28) of the slider 500 are slidingly received in complementary rails formed inside the longitudinal arms 88 and 90 (FIG. 10).

The right-hand longitudinal arm 518 (FIG. 51) of the sheet metal slider 500 has a moving switch blade 519 that is offset vertically upwards. The switch blade cooperates with two fixed, aligned and longitudinally opposed blades, including a rear blade 102' and a front blade 102" (FIG. 49), that are carried by the insulator body 52 of the connector, these being aligned transversely with the moving switch blade 519.

The fixed blades of the switch are identical to the other contact blades 102, called signal contact blades, relative to which they are only offset vertically downwards, this offset resulting from the design of the insulator support 52 in the region where the blades 102' and 102" are fitted.

The slide 250 (FIG. 49) has a drive branch 331, which is a vertical rear transverse tab facing which the front transverse edge 66 of the card C lies.

The compression coil spring 337 (FIG. 48) keeps the card C inserted in the slider 500 by being pressed against the front transverse face 530 (FIG. 53) of the bar 526 of the gate 524.

According to a variant (not shown), the longitudinal end of the coil spring 337 could butt against a facing portion of the end wall 78 of the cavity 58 of the insulator support 52 of the connector 50.

However, in such a configuration, the total extension of the spring is considerably increased as it is necessary to add the slider ejection travel (about 5 mm) to the travel (about 2 mm) for ejecting or extracting the card from the slider.

Such a spring is necessarily bulkier and applies an unnecessary additional force to the slider when the card has been inserted into the slider, which detracts from the tactile sensation experienced by the user when the gate is being closed, thanks to the push on/push off device.

Moreover, again in this situation, during the travel of this slider, the variation in the force applied by the spring 337 on the card would be the opposite of that desired, this force being a maximum in the pushed-in position and a minimum in the ejected position of the slider, which is the position in which the force must then exert its function of assisting the extraction or ejection of the card C from the slider 500.

The moving blade 519 (FIG. 51) of the switch allows the integrated circuits to be activated after closure of the electrical circuits established between the pads Pi on the card and the contact blades 100, 102 of the connector, and allows the assembly to be deactivated before the same electrical circuits are opened during the insertion or extraction phases corresponding to the use of the push on/push off system.

The front longitudinal end of the blade 519 comes into contact with the front contact 102" (FIG. 49) just after closure of the electrical circuits between the pads Pi and the signal contact blades 102, and it escapes from the front contact 102" just before opening of the electrical circuits Pi—102 during ejection of the card.

The rear longitudinal end of the moving blade 519 (FIG. 51) is designed so that it escapes from the rear contact 102' just before opening of the electrical circuits during the overtravel of the push on/push off device between the position corresponding to the pushed-in position and that corresponding to the locked position, either at the end of the insertion phase or at the start of the ejection phase.

In this way, at any point in the card insertion/extraction cycle carried out by the push on/push off device, the switch always opens before electrical circuits open, and always closes after the electrical circuits have closed, thus protecting the integrated circuits of the card.

The presence of the switch is particularly important in the case of the MICROSIM card (FIG. 40) in which the conducting pads are of very short length, of around 2 mm.

In the figures, the slide 250 with its complementary means is placed on the left-hand side of the connector, as in the previous case.

However, insofar as the MICROSIM card does not have a notch in its lateral edges, and the slide does not have a locking spur, it is also possible to place the slide 250 symmetrically on the right-hand side, which then allows the dimensions of the connector to be reduced.

In the case of a MICROSIM card that contains the particulars of the telephone subscriber, it is particularly important for the user not to be able to cause the card-holder carriage to be accidentally ejected during a communication, for example by inadvertently pushing on the gate 524, 527.

For this purpose, provision is made, in the locked operating position, for the vertical rear face 527 to be flush with the face of the equipment in which the slot closed off by the gate 524 is formed, or else to be slightly longitudinally offset forwards, that is to say towards the inside of the equipment.

In addition, the heart-shaped locking cam 265 has an unsymmetrical profile such that the unlocking travel is offset forwards and means that there is an overtravel, of a few mm, forwards relative to the locking travel.

Thus, opening requires the user to push on the gate, for example with the tip of a pencil in the central housing 533.

Figure 103:
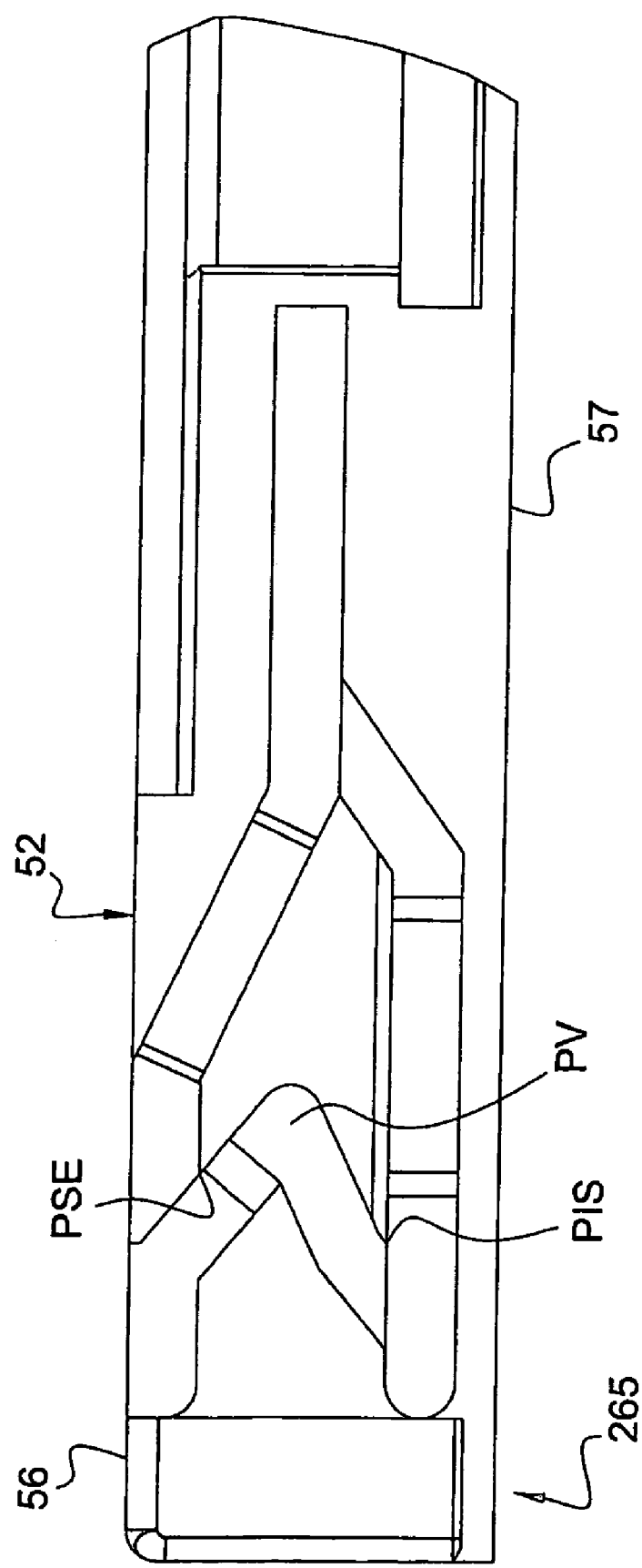
FIG. 103 is a detail looking along the direction of the arrow F103 of FIG. 49, which illustrates the design of the heart-shaped cam for obtaining dissymmetry and a safety overtravel at unlocking.

This safety means is obtained thanks to the heart-shaped cam profile 265 illustrated in FIG. 103, which shows that the upper point PSE for entry into the slot portion leading rearward to the locking point PV, for the purpose of locking, is offset rearwards relative to the lower point PIS for exiting the profile on leaving the point PV, for the purpose of unlocking.

Figure 57:
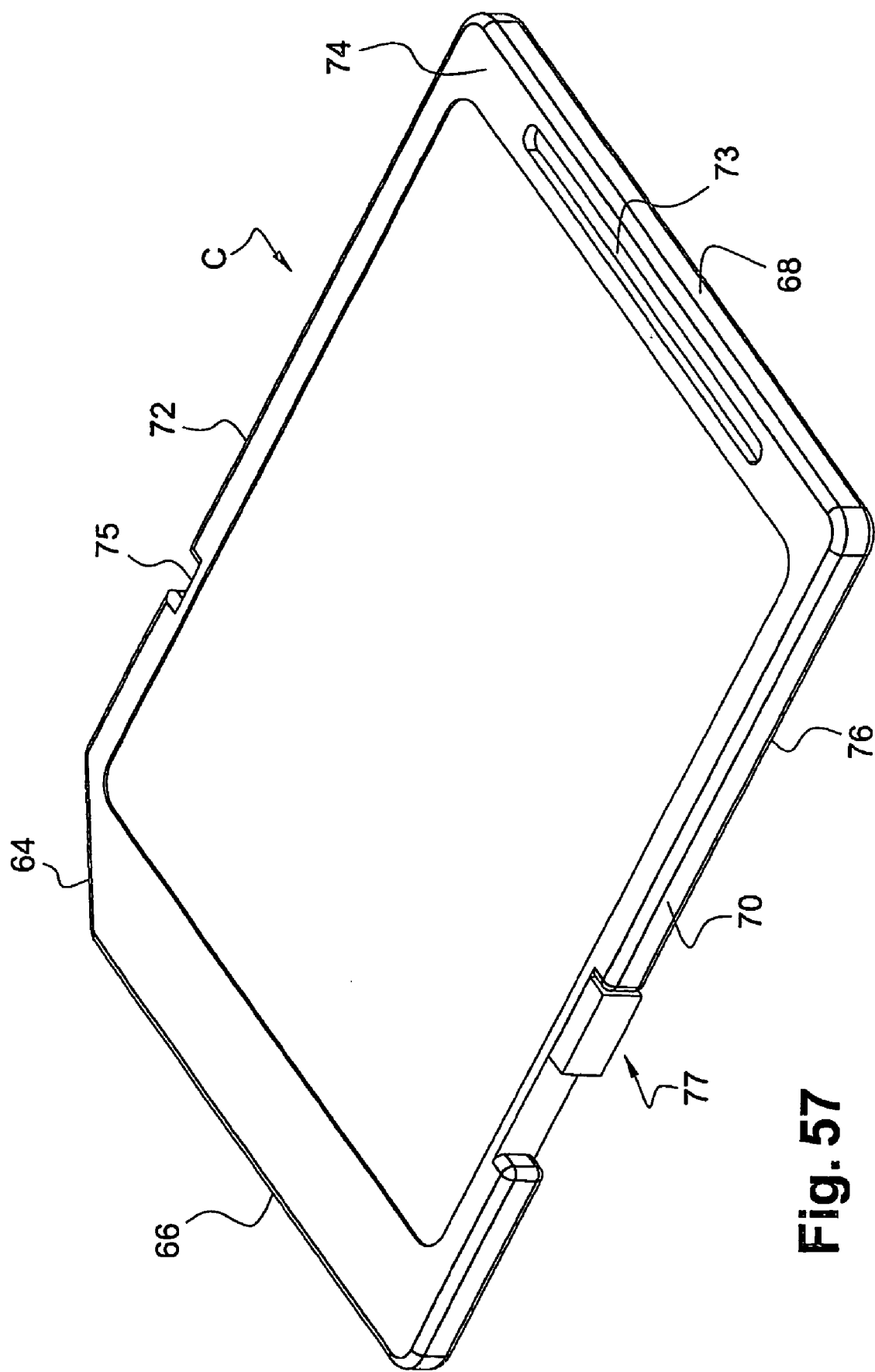
FIG. 57 is a top left rear isometric view of an SD card with a thickness of 1.4 mm.
Figure 58:
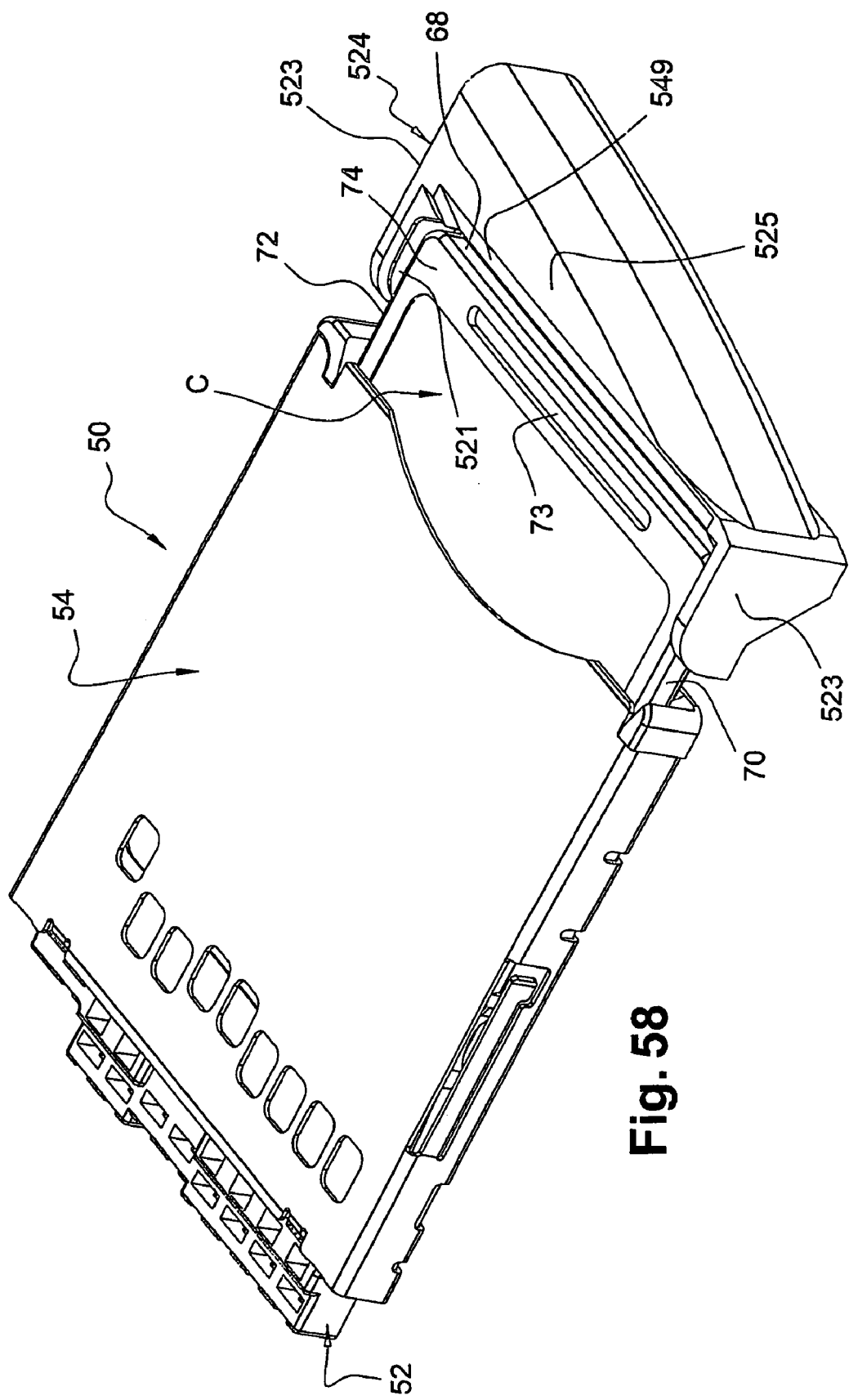
FIG. 58 is a view similar to that of FIG. 2, which shows a third embodiment of a connector according to the invention for the SD card shown in FIG. 57.
Figure 59:
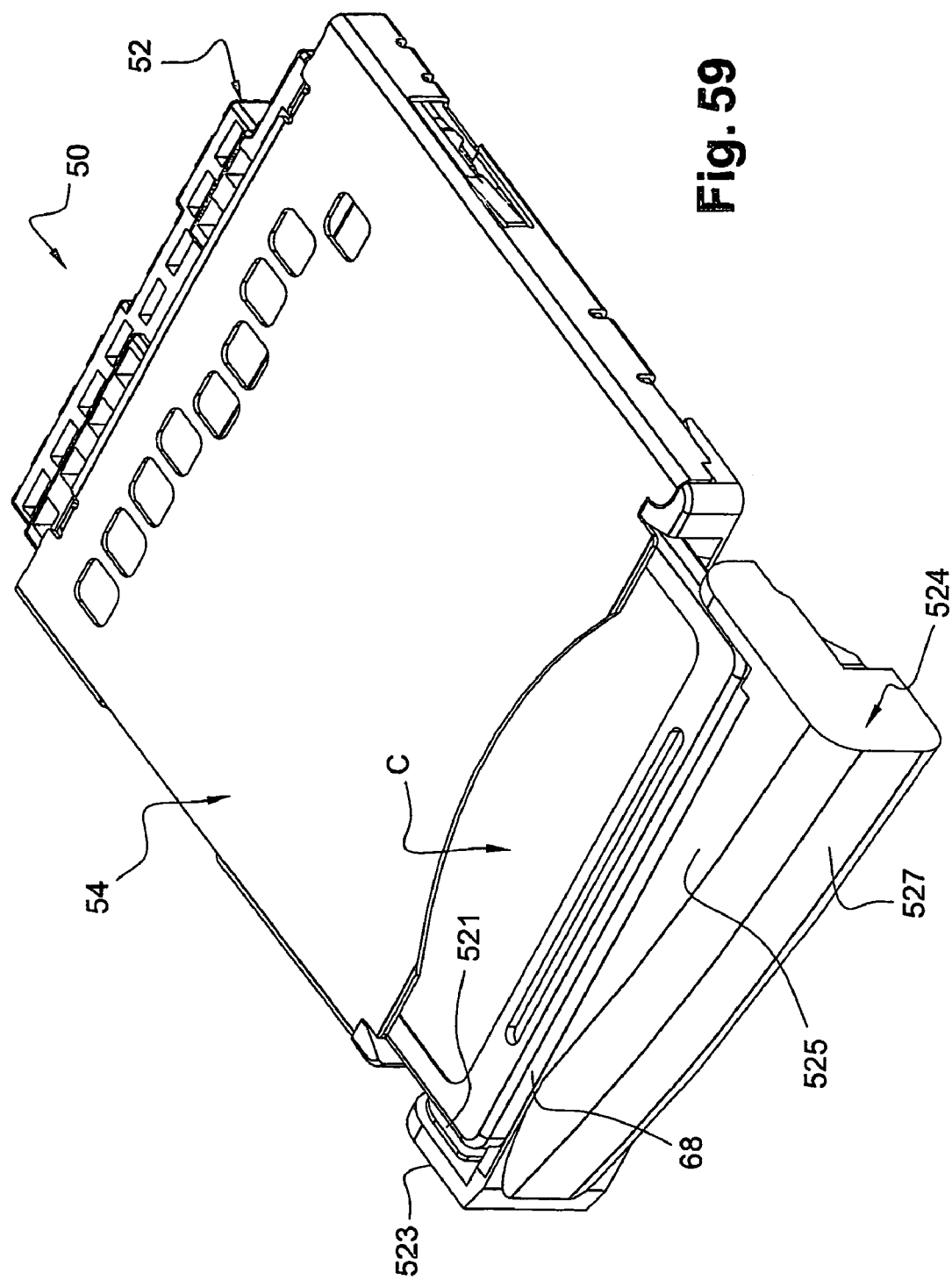
FIG. 59 is a view similar to that of FIG. 58 of the connector at another viewing angle.

The third embodiment of a connector illustrated in FIGS. 58 to 79 will now be described in the case of an SD-type card illustrated in FIGS. 57 and 58.

It will be noted that the entire design that follows is suitable at every point for an MMC card.

The SD card (FIG. 57) has a 45° corner face 64 for polarization at the intersection of its front transverse edge 66 and its edge 72 in which here the notch 75 is formed, whereas it has a read/write protect device 77 in its left lateral edge 70.

Near its rear transverse edge 68, the SD card has, in Its upper face 74, a notch or slot 73 for making it easier to extract it, and into which slot the user may for example insert a fingernail.

As in the case of the first embodiment, the conducting pads Pi are arranged on the lower face 76 near the transverse front end edge 66 of the card C.

All the ejection means, including in particular the carriage 250 (FIG. 66), are arranged here on the right-hand side.

The general design of the carriage 250 and of its card guiding and locking means is similar to that described in document WO-A-02/089040.

The drive branch 331 (FIG. 66) inclined at 450 is extended vertically downwards by a coupling finger 516.

Figure 76:
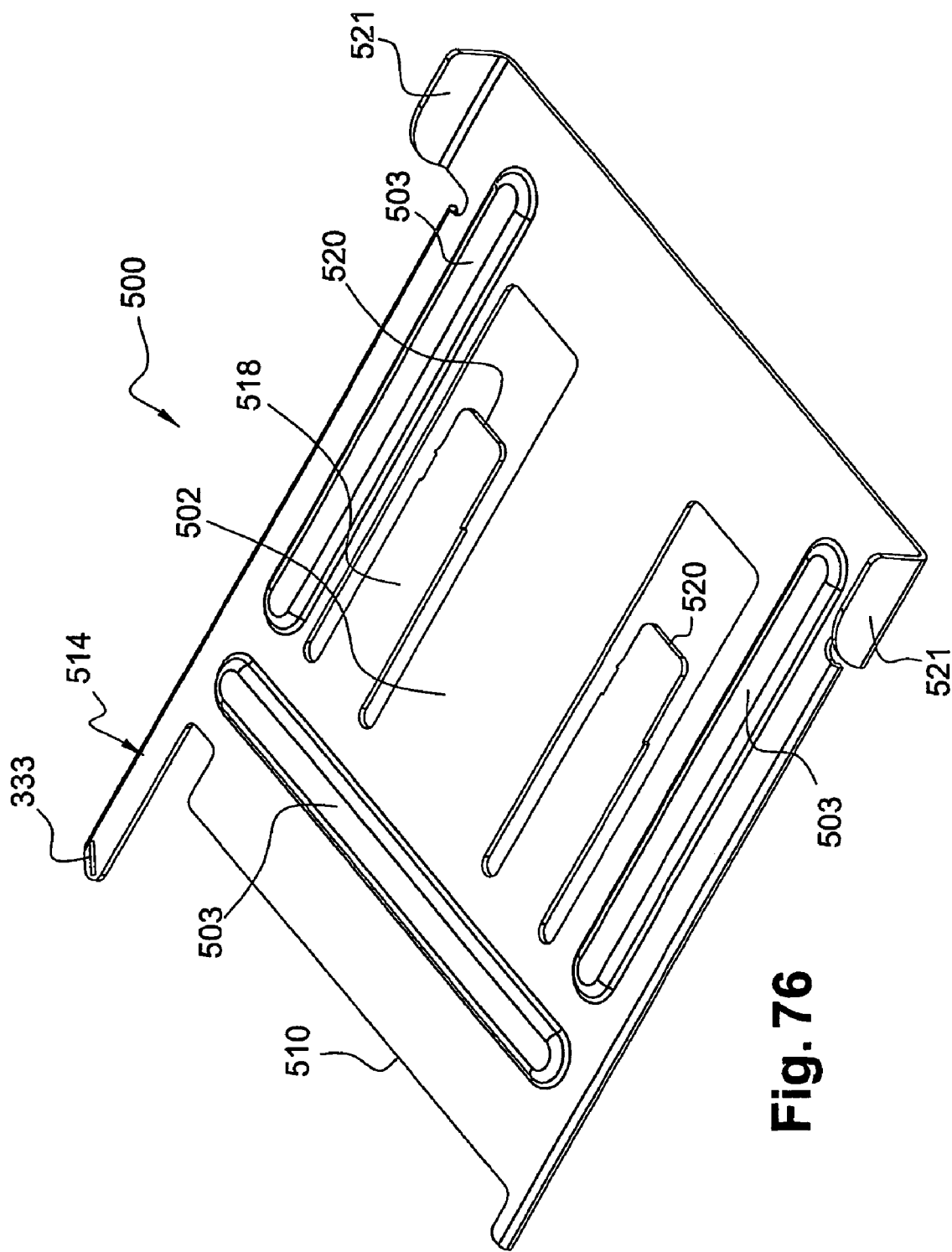
FIG. 76 is a top left rear isometric view of the card ejection slider, without the gate, or retention bar.
Figure 77:
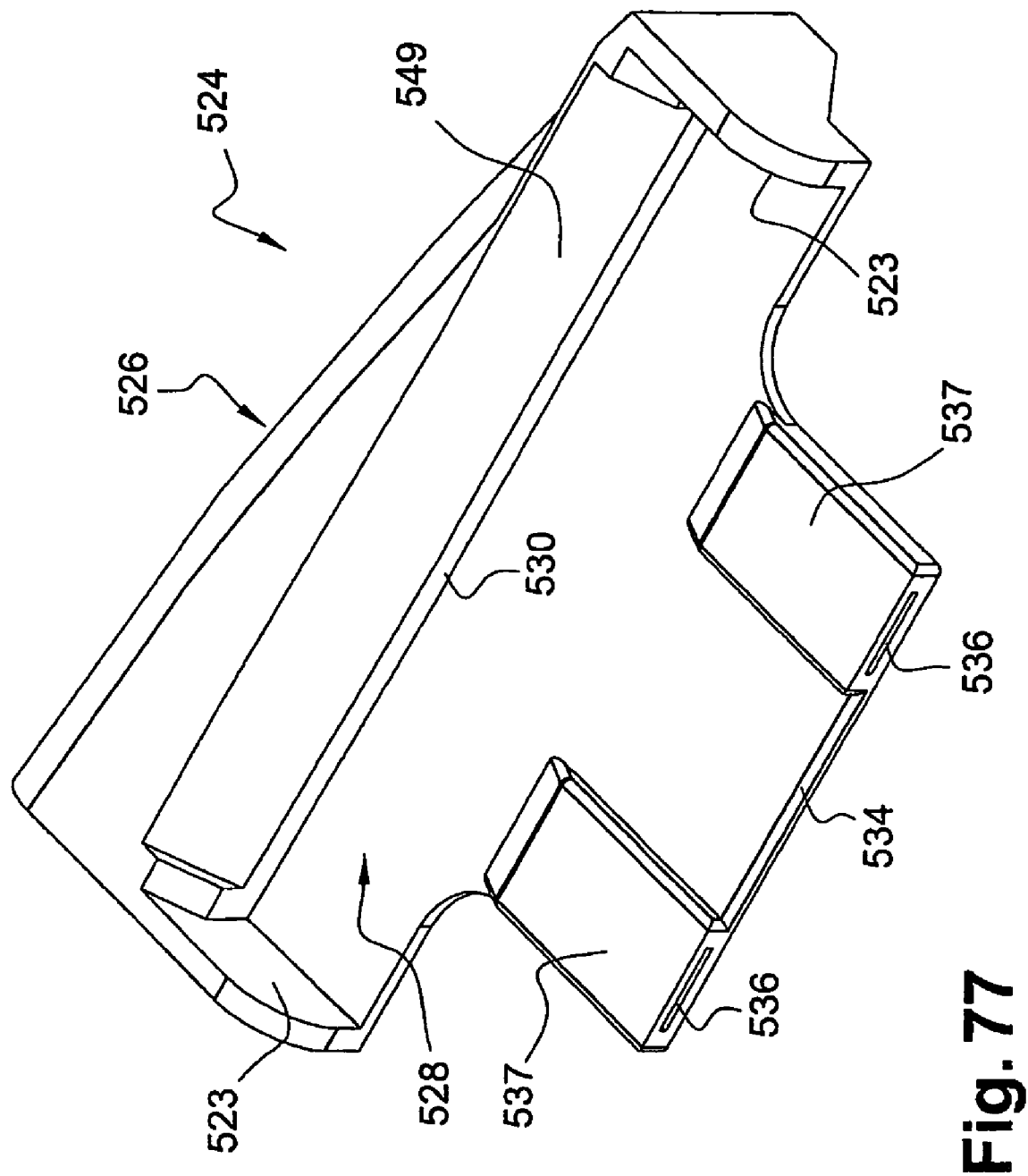
FIG. 77 is a top left front isometric view of the gate associated with the slider of FIG. 76.
Figure 78:
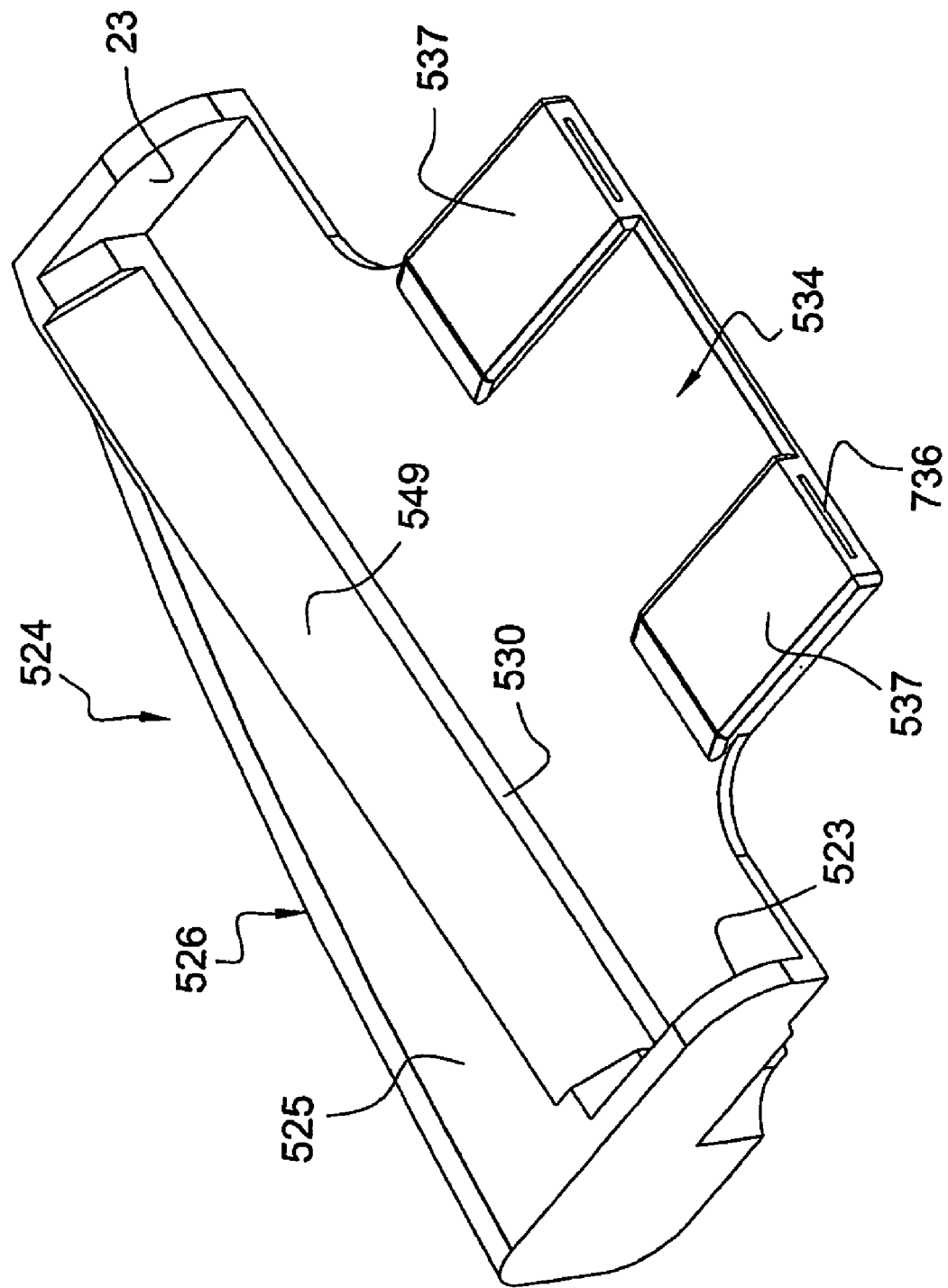
FIG. 78 is a view similar to that of FIG. 77 at another viewing angle.
Figure 79:
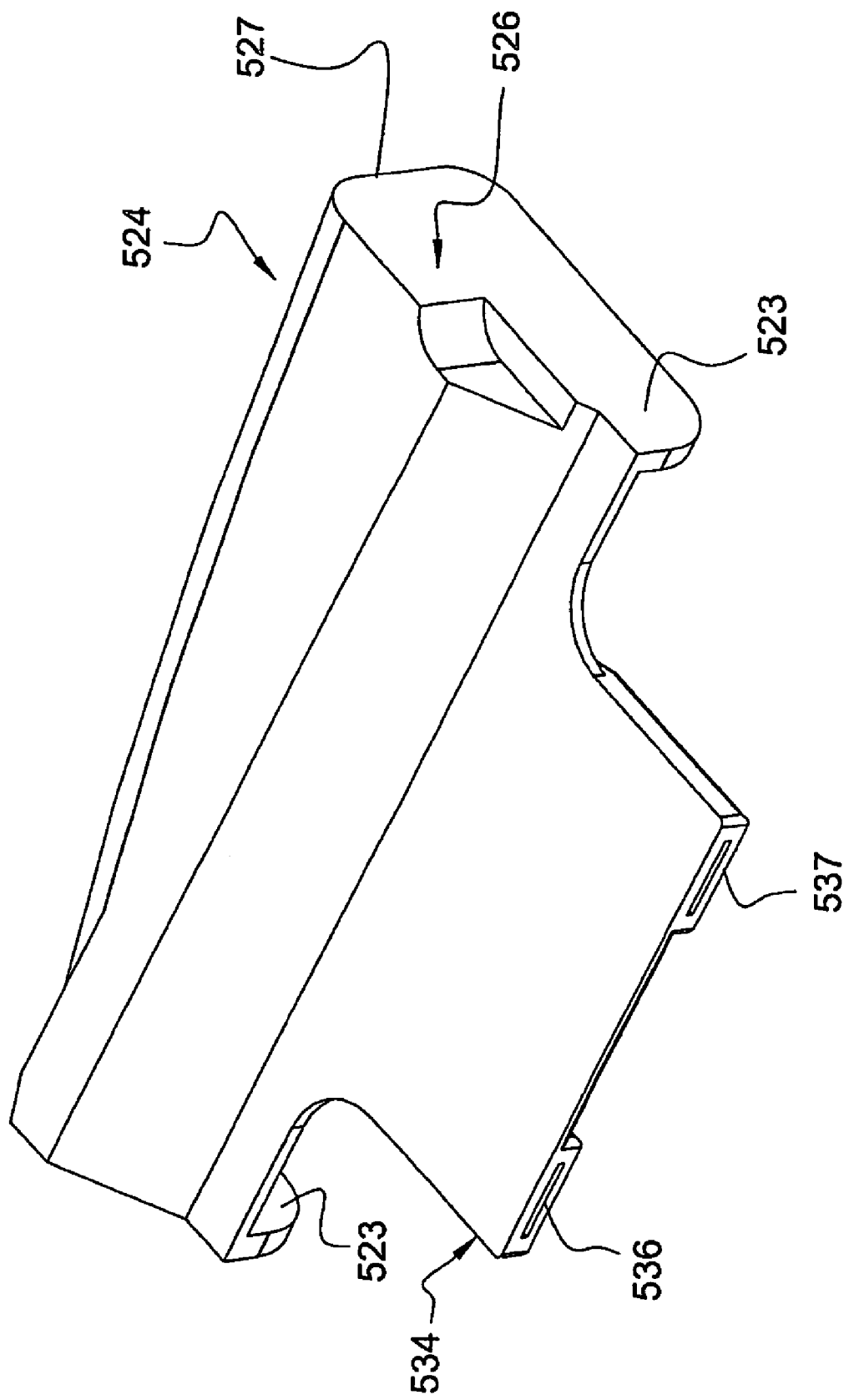
FIG. 79 is a bottom isometric view of the gate illustrated in FIG. 77.

As may be especially seen in FIG. 76, the elastically deformable arms 518 are cut out in the body of the central plate 502 that extends rearwards in order to have two vertical lateral flanges 521 of longitudinal orientation between the internal lateral faces against which the card is housed.

The gate is, for example, a plastic molded part, or a metal casting, which is fixed to the free ends 520 via its front part or extension 534 (FIG. 77) which has, for this purpose, two slots 536 into which the ends 520 (FIG. 76) are inserted and crimped.

For aesthetic reasons, the part 524 may be metallized.

It may also be produced by molding a metal, for example steel, using the MIM (Metal Injection Molding) technique, which improves the appearance and strength.

The main plate or body 502 of the slider 500 has ribs 503 (FIG. 66) formed so as to stand up on the upper face of which ribs the lower face of the card C rests.

The slots 536 (FIG. 77) in the gate 524 are formed in two protuberances 537 which, when the slider is at rest (that is to say when the arms 508 are not deformed), have their horizontal upper faces lying in the same plane as the upper faces of the ribs 503.

The retention bar 526 is bounded towards the front by its front transverse face 530 beyond which, towards the front, the housing 528 is bounded laterally by two vertical longitudinal cheeks 523 between which the flanges 521 of the slider 500 are housed.

The vertically oriented transverse face 530 is of lower height and is extended by a chamfer 549 inclined upwards and rearwards at 45°.

When the card has a groove 73 (FIG. 38) for making it easier to extract, it is unnecessary to provide a mounted spring for extracting the card from the slider.

To make this operation easier, the vertical face 530 is of very low height so that the user merely has to bear lightly on the bar and then benefits from the ramp effect of the chamber 549 when he is extracting the card longitudinally.

This very low height with the large chamfer also provides an automatic re-engagement effect, perceptible by the user, when fitting the card.

The guiding of the slider 500 as it slides relative to the insulator body 52 of the connector 50 is provided by its lateral edges in the same way as in the second embodiment.

The operation of the slider 500 and of the gate 524, 526 will now be described more particularly with reference to FIGS. 69 to 73.

In the pushed-in position (FIG. 69), locked position (FIG. 70) and ejected rear position (FIG. 71) of the carriage 250, and therefore of the slider 500, the card is retained in the slider 500 by the front transverse face 530.

Figure 71:
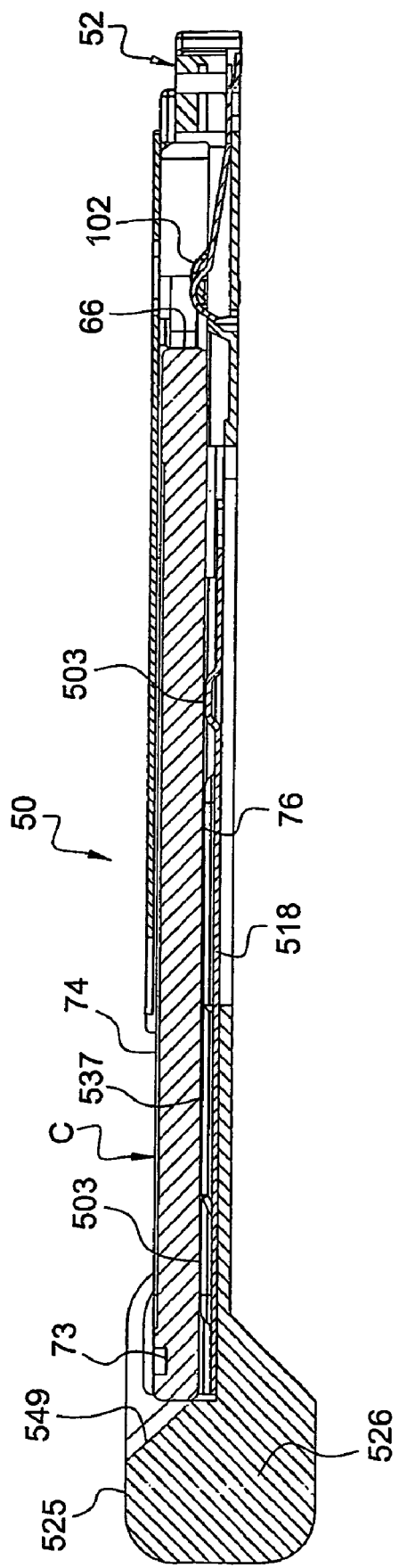
FIG. 71 is a similar view with the slider and the card in the ejected or retracted rear position.
Figure 72:
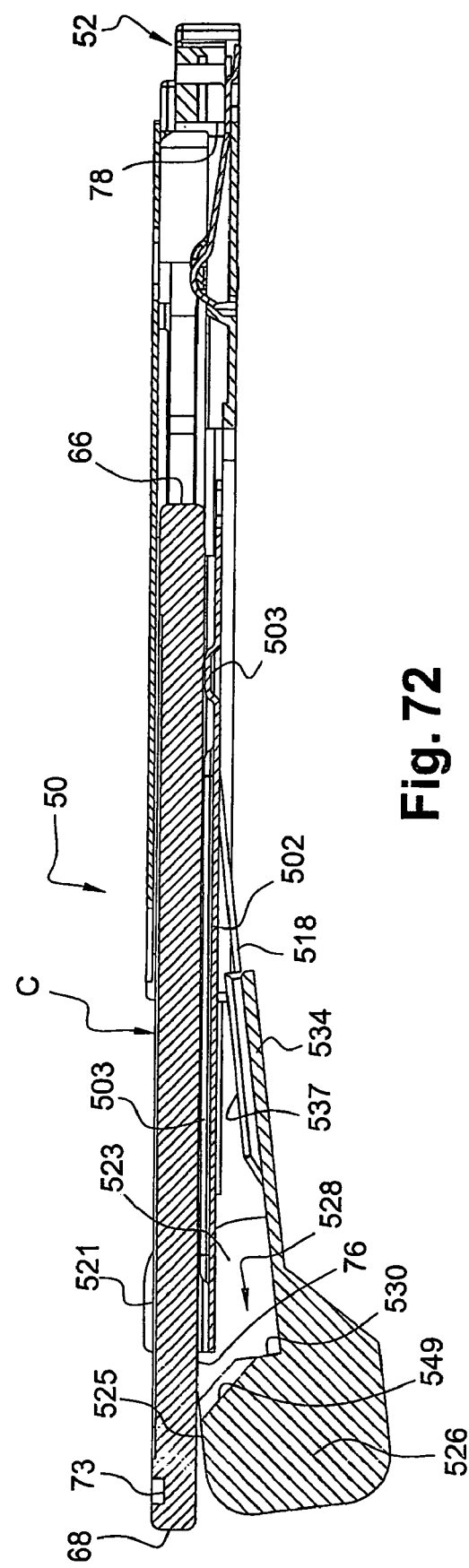
FIG. 72 is a similar longitudinal sectional view with the gate lowered, and with the card in the process of being extracted from the slider.
Figure 73:
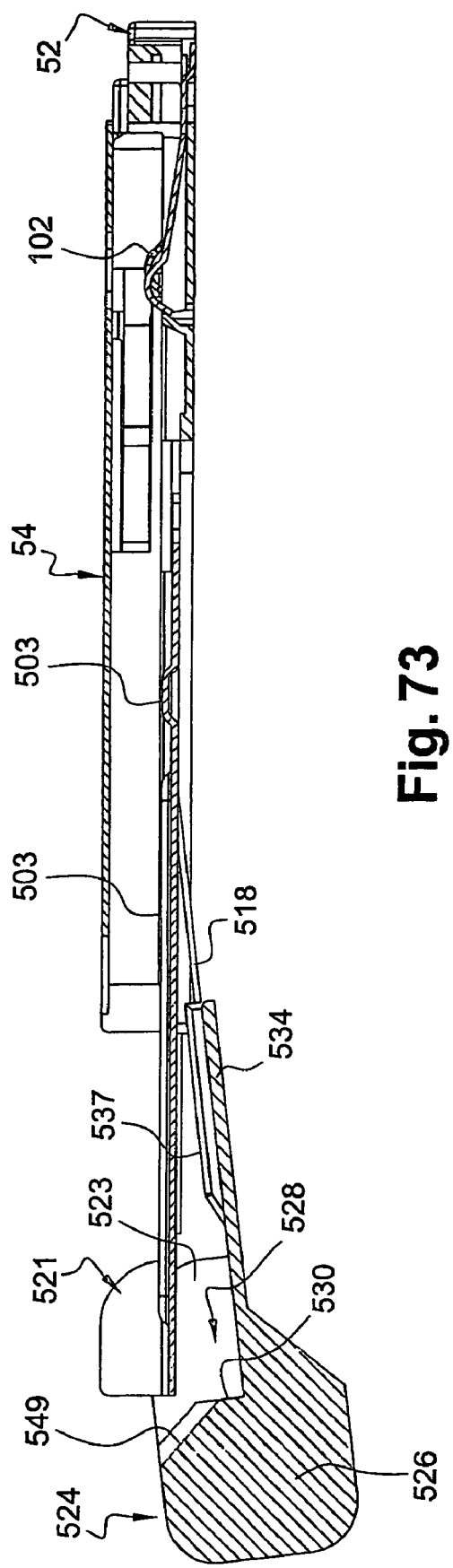
FIG. 73 is a view similar to that of FIG. 72 without the card.
Figure 74:
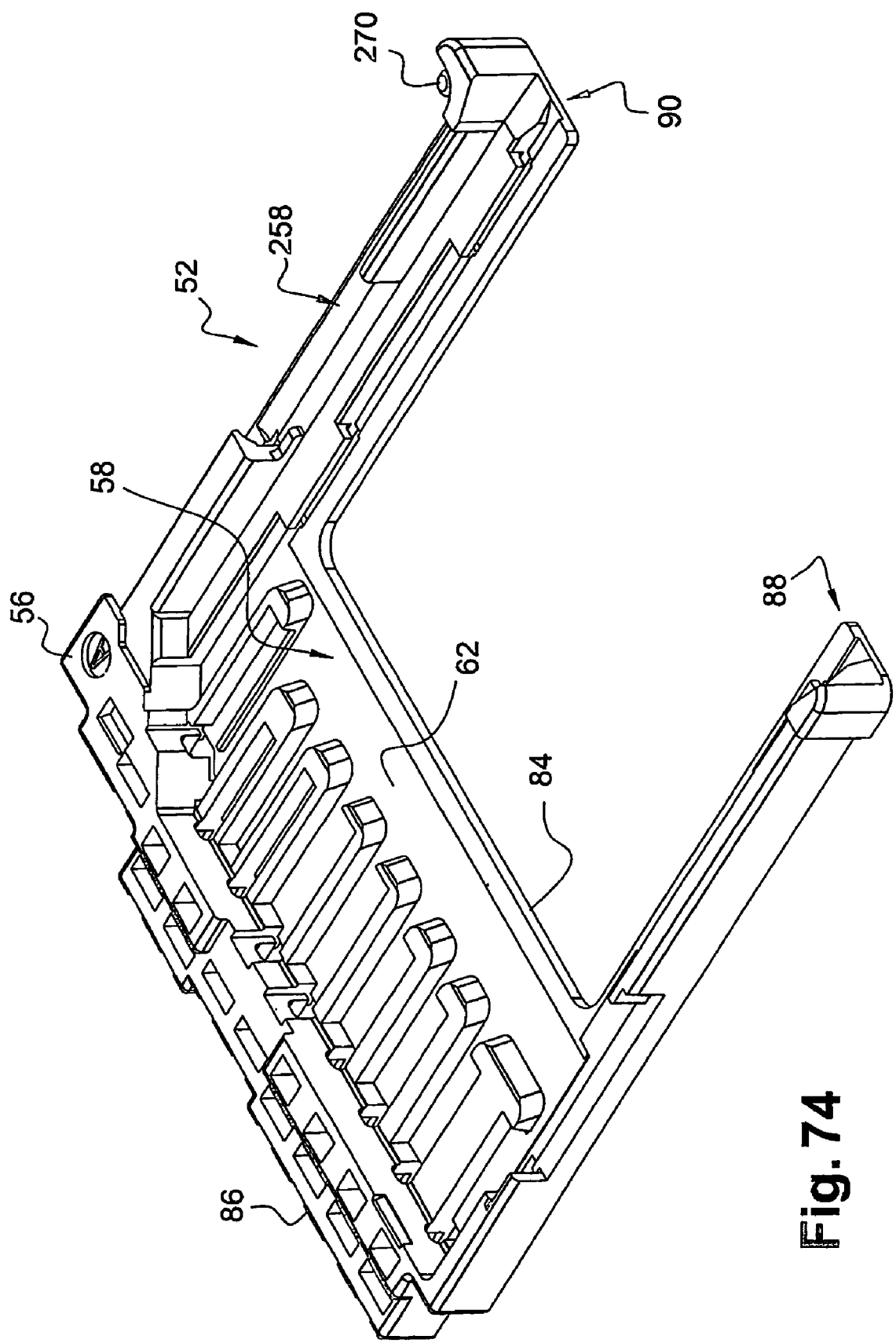
FIGS. 74 and 75 are two isometric views of the insulator support of the connector.
Figure 75:
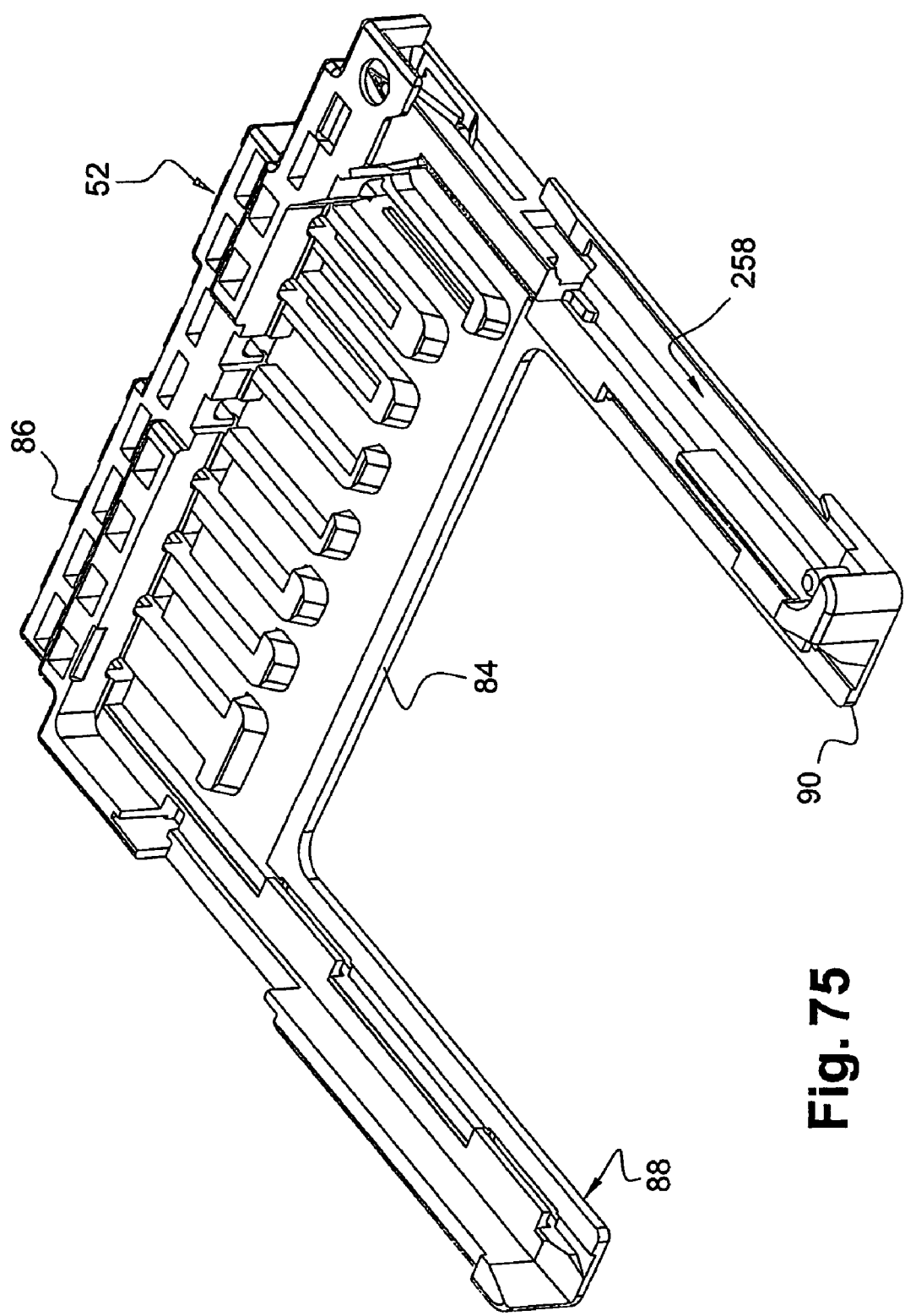

Once the position illustrated in FIG. 71 has been reached, in order to extract the card C from the slider 500, the user carries out a combined movement consisting in lowering the bar 526 (FIG. 72) of the gate 524 in order to clear the rear transverse face 68, so as to allow the card C to slide longitudinally rearwards.

This movement may be combined with a longitudinal extraction movement by pulling on the card, especially using the groove 73.

This combined movement is aided by the chamfer 549 which cooperates with the lower corner of the rear transverse edge 68 in order to fully lower the bar 526 thanks to the longitudinal pulling force applied to the card C by the user.

The design of the slider 500, with its arms 518 forming long elastic beams, makes it easier, especially compared with the first embodiment, to incorporate this type of connector into certain electronic appliances.

Of course, the total length is slightly increased owing to the presence of the chamfer.

The chamfer 549 also makes it easier to fit a card C into the slider 500 when the latter is in the ejected rear position.

This is because it constitutes a ramp forming a trigger for guiding the insertion of the front transverse edge 66 of the card, the insertion movement causing the gate 524 to swing downwards.

The insertion of the card is also facilitated by the lateral flanges 521, 523 which provide lateral preguiding of the card C.

Figure 81:
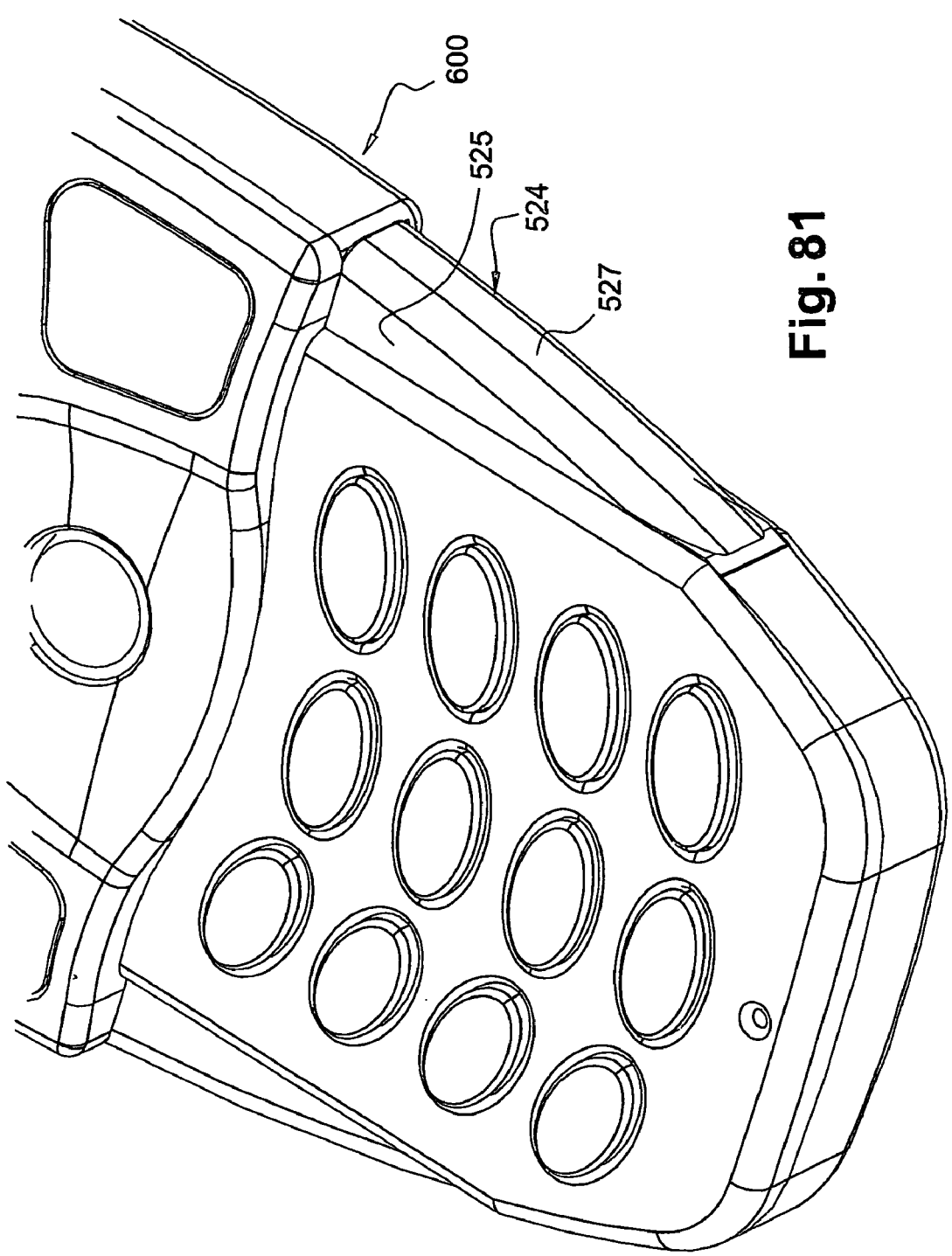
FIG. 81 is a detail, on a larger scale, of FIG. 80 in which the connector is shown in the closed and locked position of the slider.

As may be seen in FIGS. 80 and 81, the external design or style of the bar 526 of the gate 524 is complementary to that of the radio telephone so that, in the "closed" position of the slider and with or without a card, the style of the gate is in harmony with that of the telephone.

The gate is opened by simply pressing on the outer lateral face 527, pressing on it as on a trigger, and then releasing it in order to eject the slider, allowing thereafter either the card to be extracted from the slider or for it to be inserted into the slider.

The radio telephone 600 is a GSM-type telephone for example.

It may have one or more connectors according to the invention, each able to be matched to a different type of card.

In the fourth embodiment illustrated in FIGS. 83 to 100, the card is of the SD type with a large thickness (2.1 mm).

The card does not have a groove 73 for making it easier to extract.

The connector 50 is designed to be mounted beneath a card or printed-circuit board (not shown) and, for this purpose, the connection ends 104 (FIG. 84) of the contact blades 102 are bent upwards in the form of a U so as to extend above the upper face of the connector.

Figure 82:
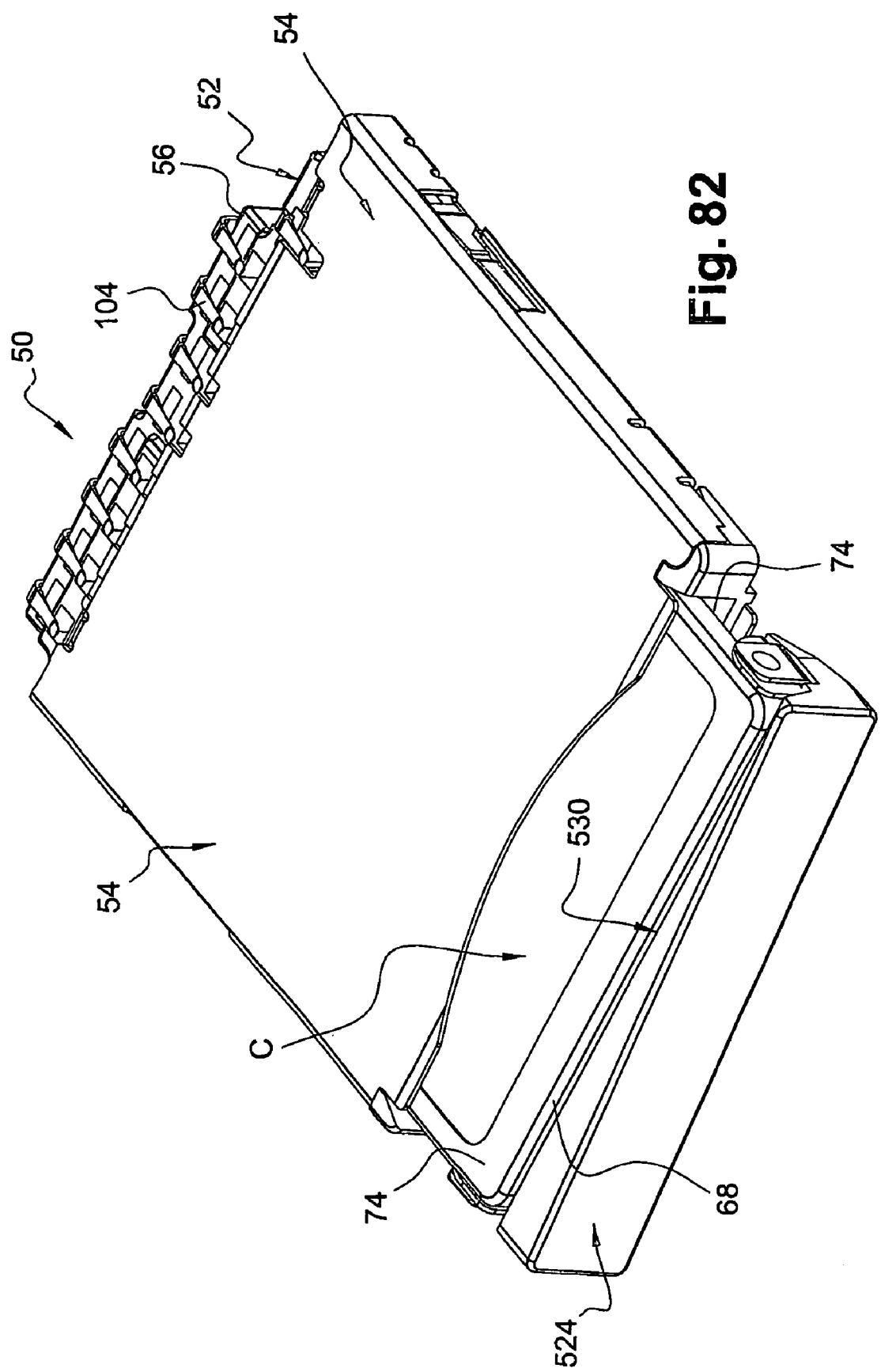
FIG. 82 is a view similar to that of FIG. 2 of a connector according to the invention in a fourth embodiment, suitable for an SD card of large thickness (2.1 mm)
Figure 83:
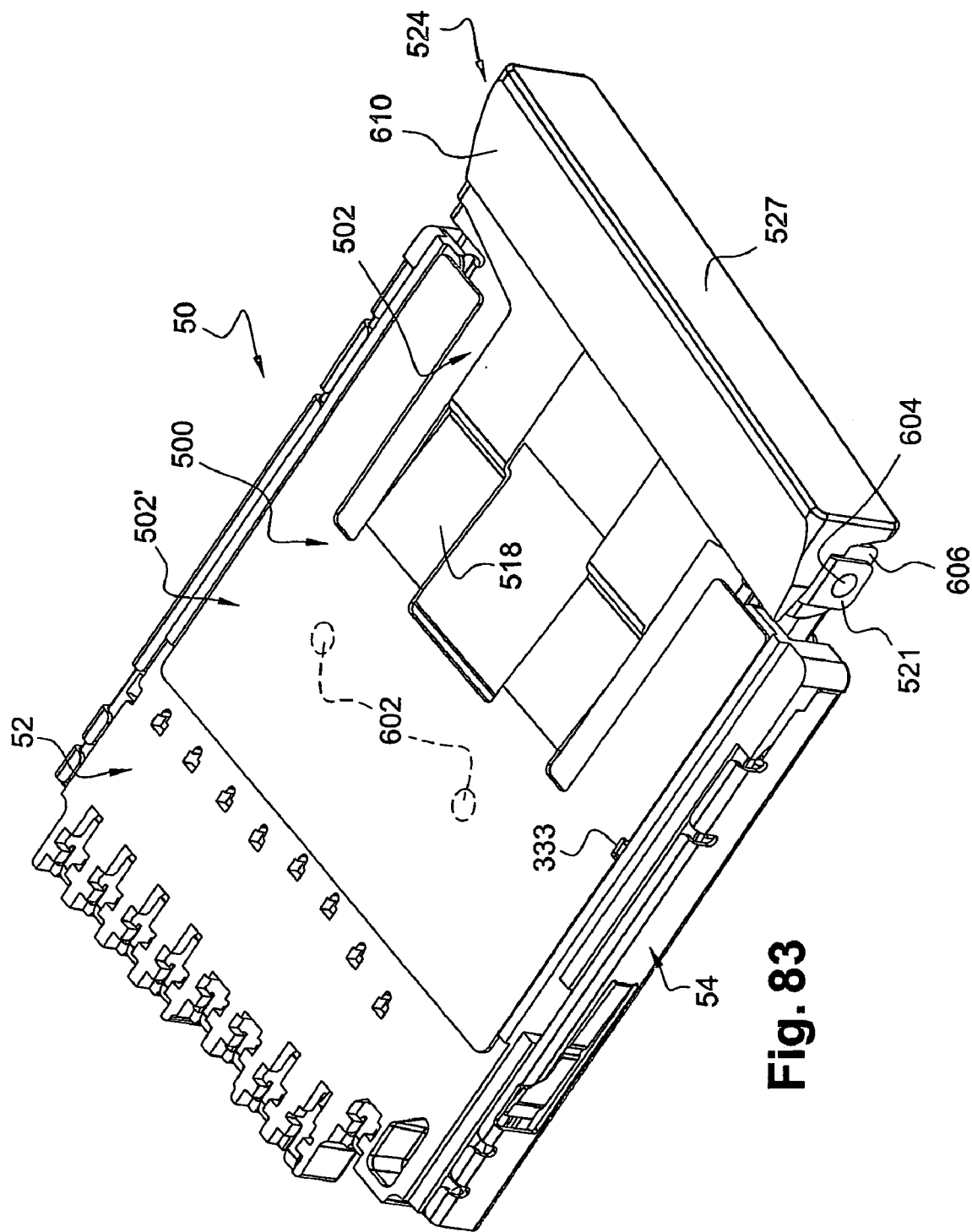
FIG. 83 is a bottom view of FIG. 82.
Figure 84:
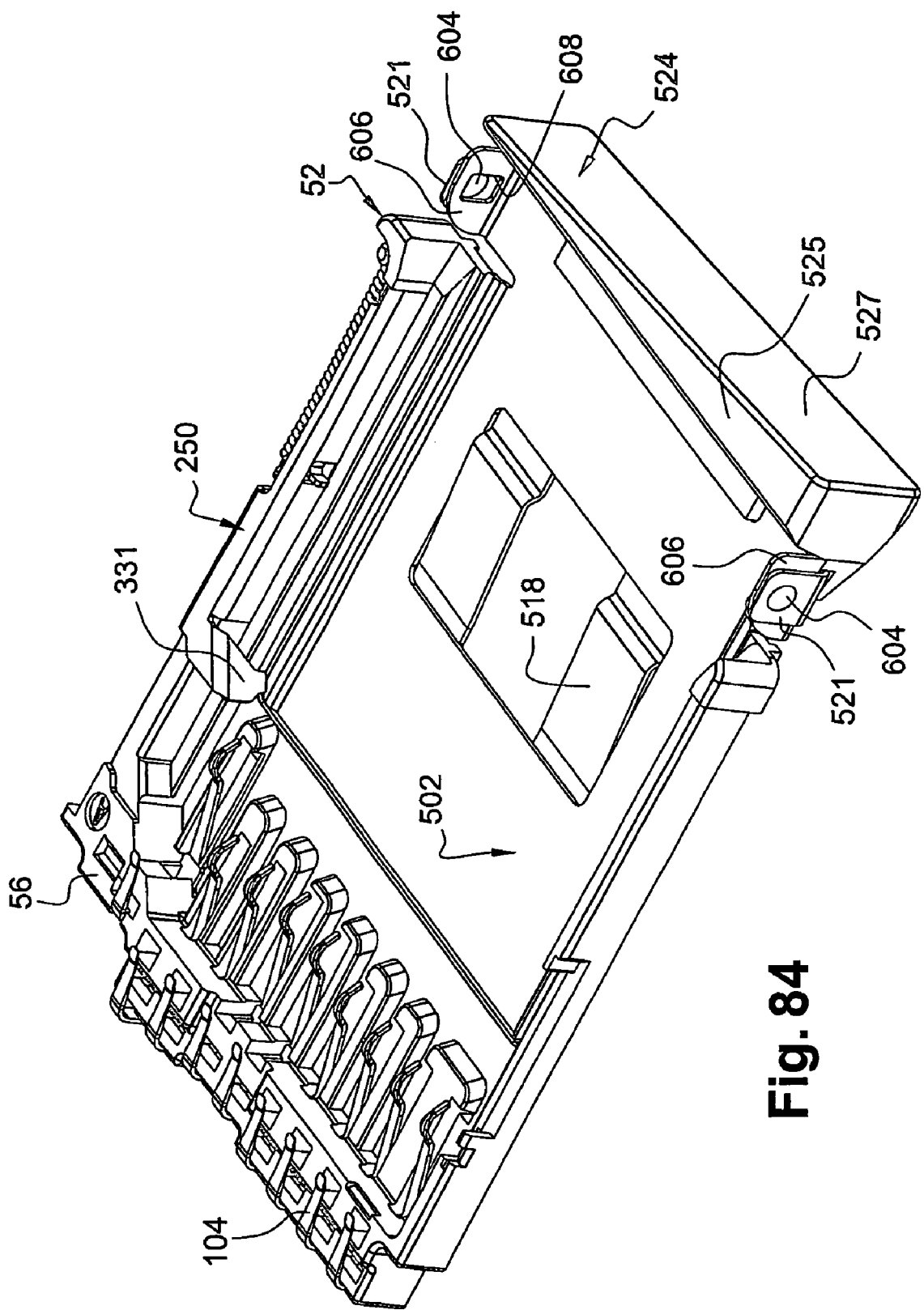
FIG. 84 is a view similar to that of FIG. 82, without the cover.
Figure 85:
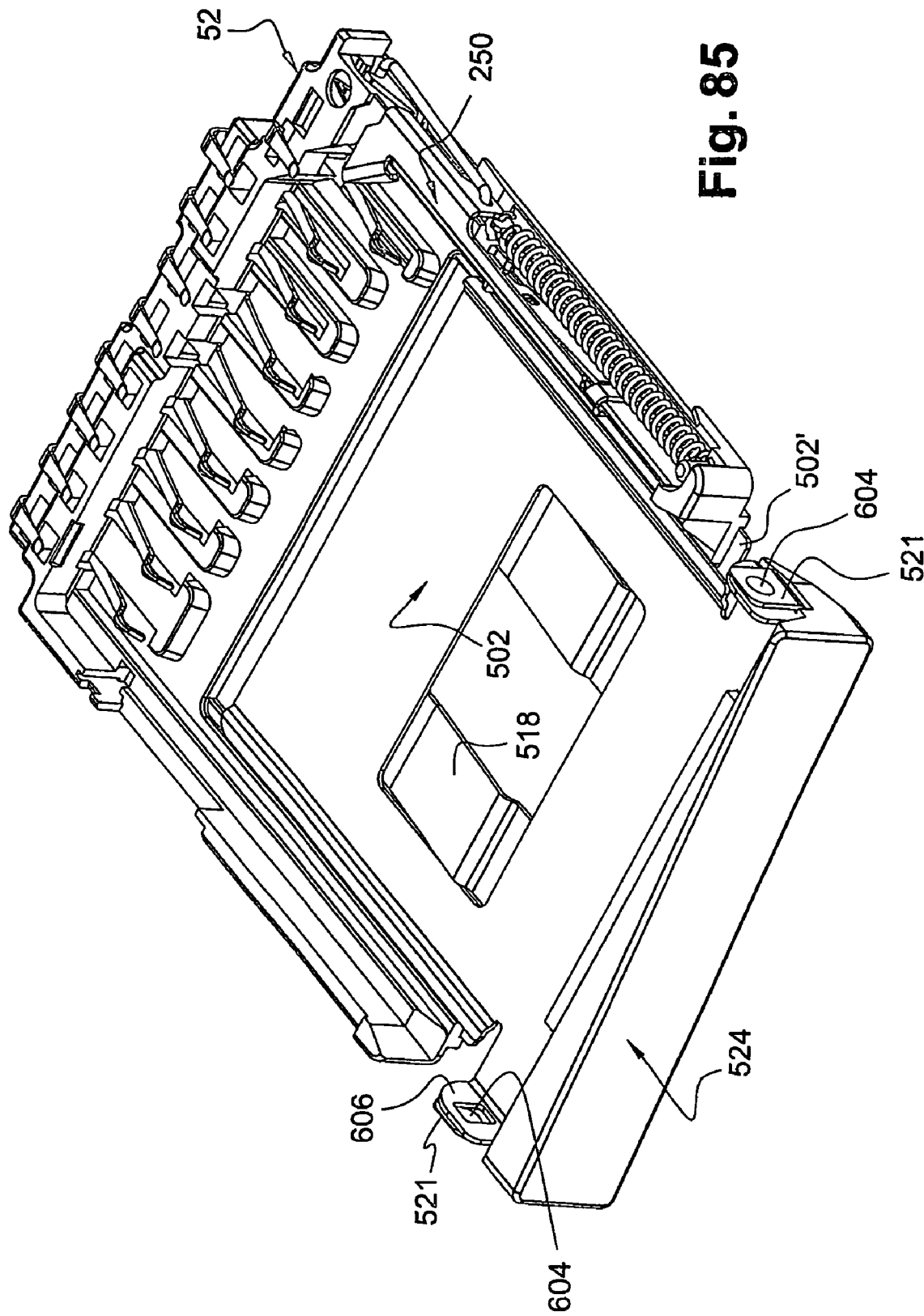
FIG. 85 is a view similar to that of FIG. 84 at another viewing angle.
Figure 86:
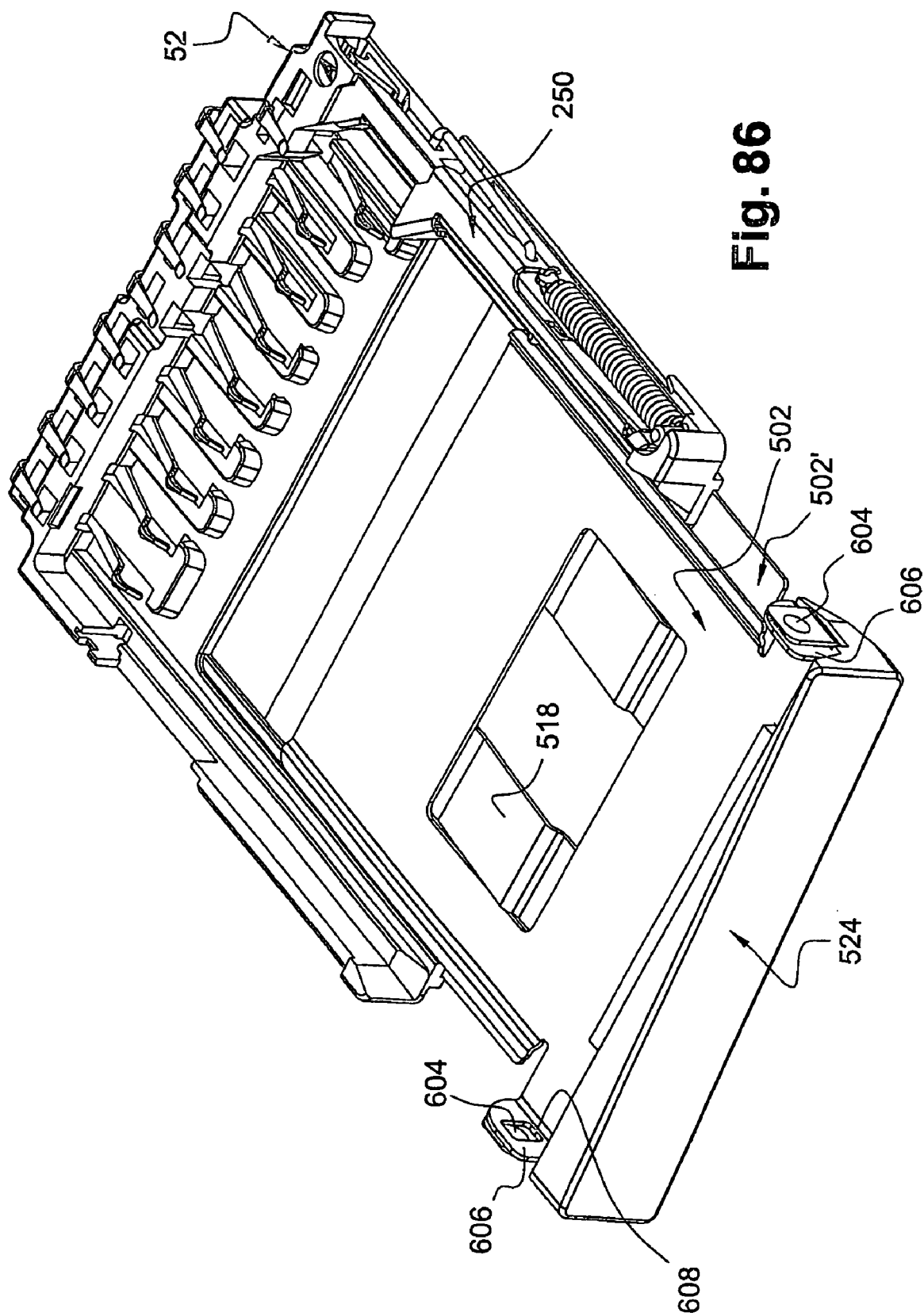
FIG. 86 is a view similar to that of FIG. 85 with the carriage in the ejected rear position.
Figure 87:
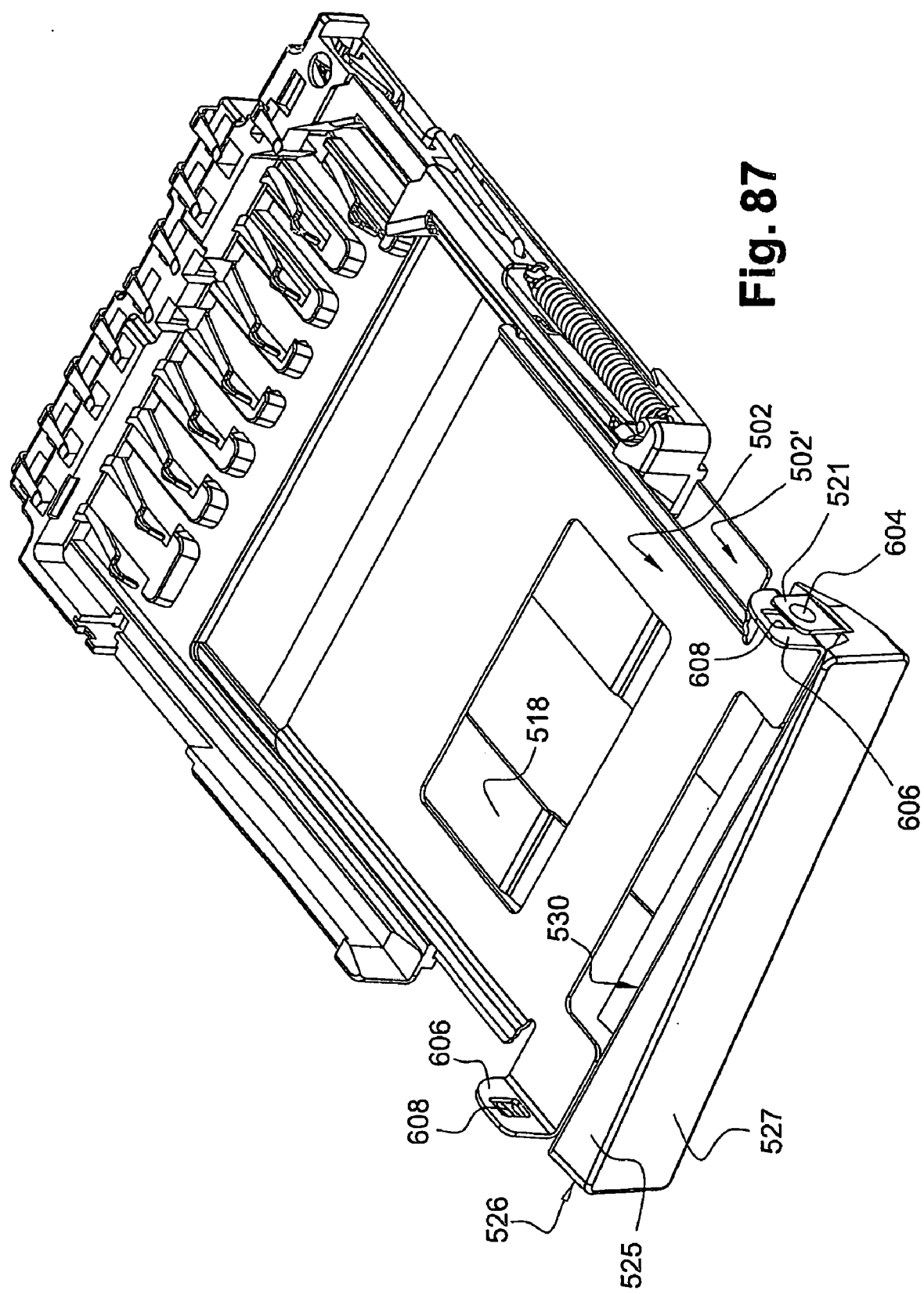
FIG. 87 is a view similar to that of FIG. 86 with the gate in the lowered position and blocked in this position.
Figure 88:
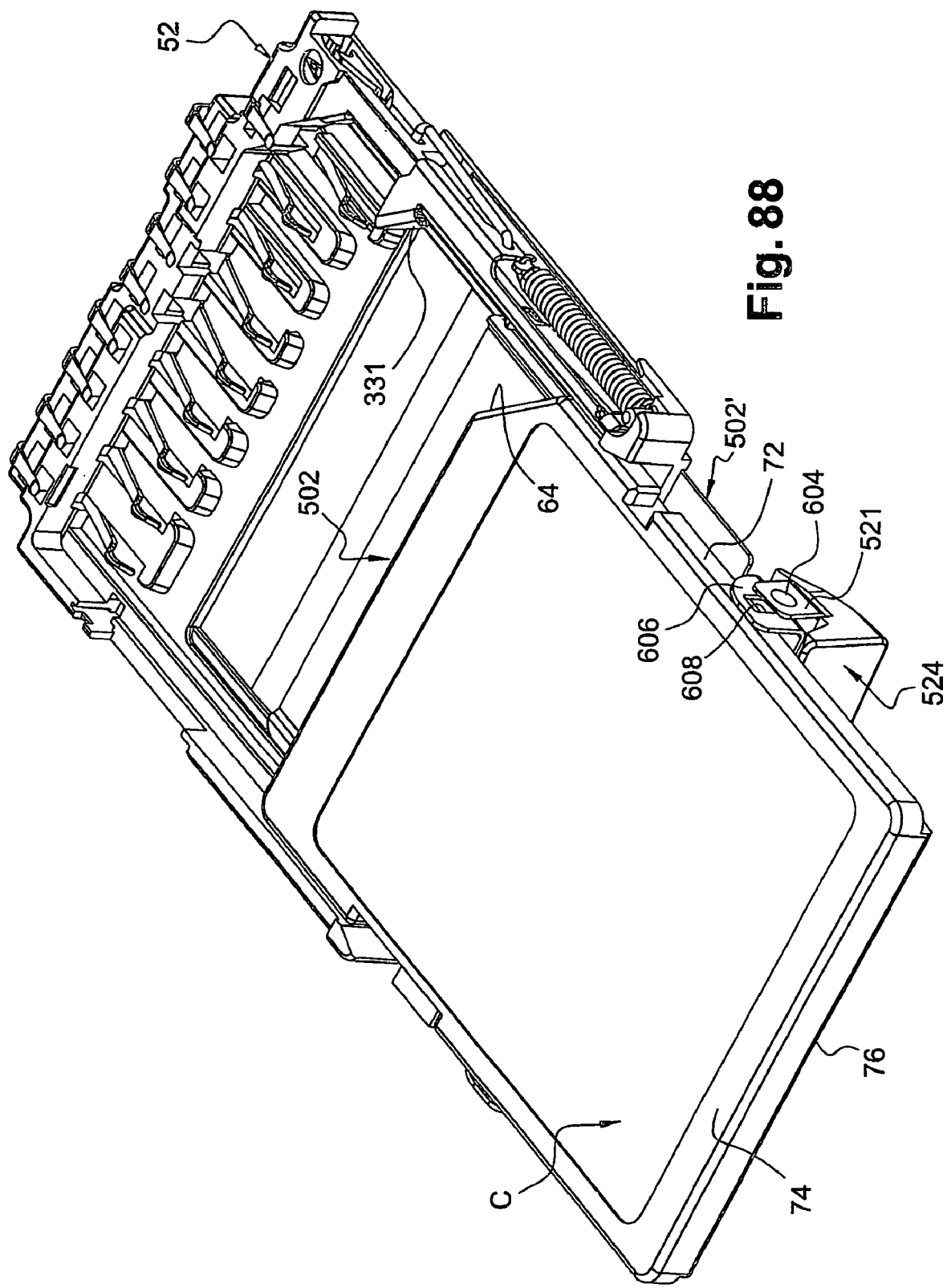
FIG. 88 is a view similar to that of FIG. 87 with a card.
Figure 89:
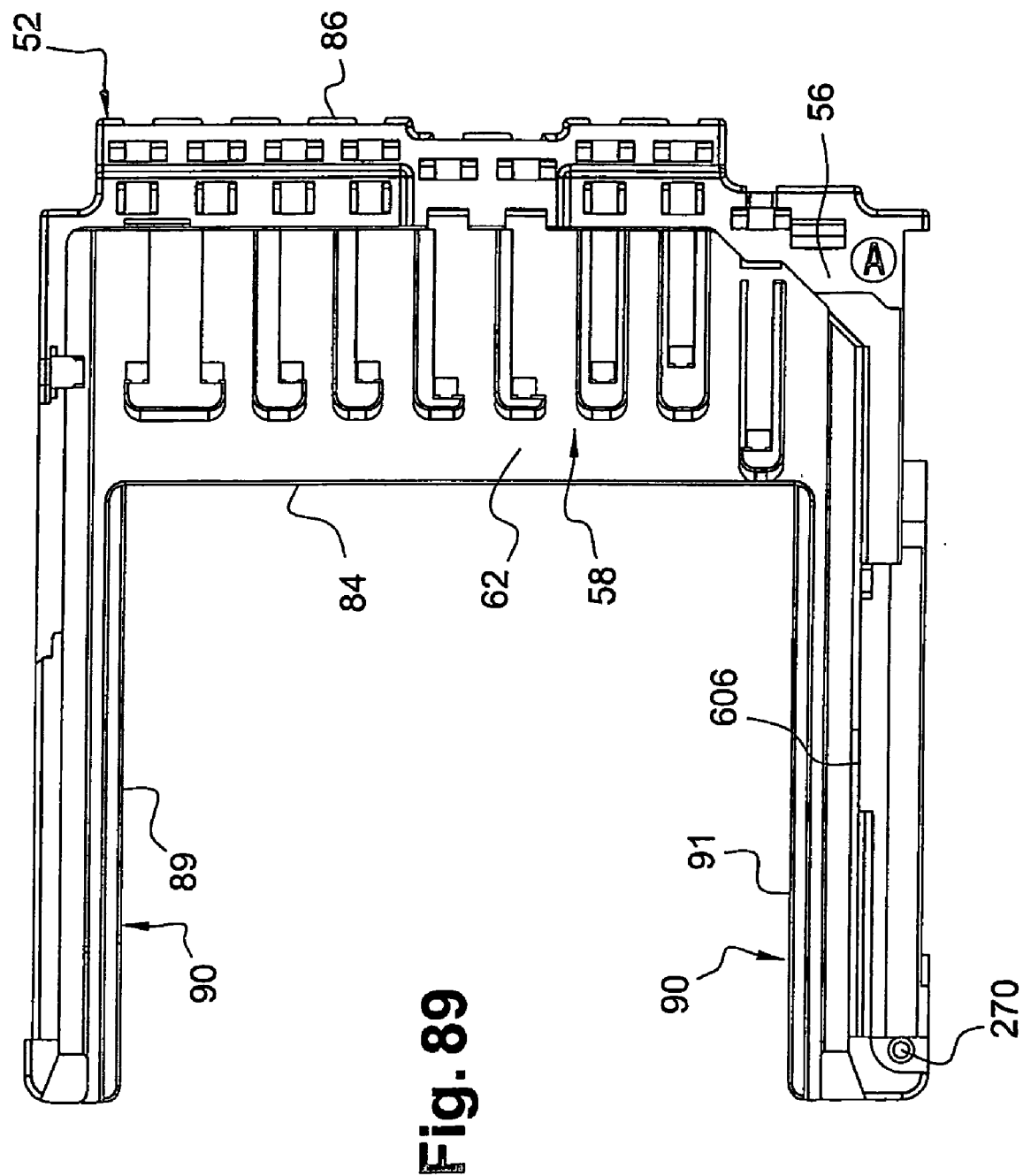
FIG. 89 is a top view of the insulator support of the connector.
Figure 90:
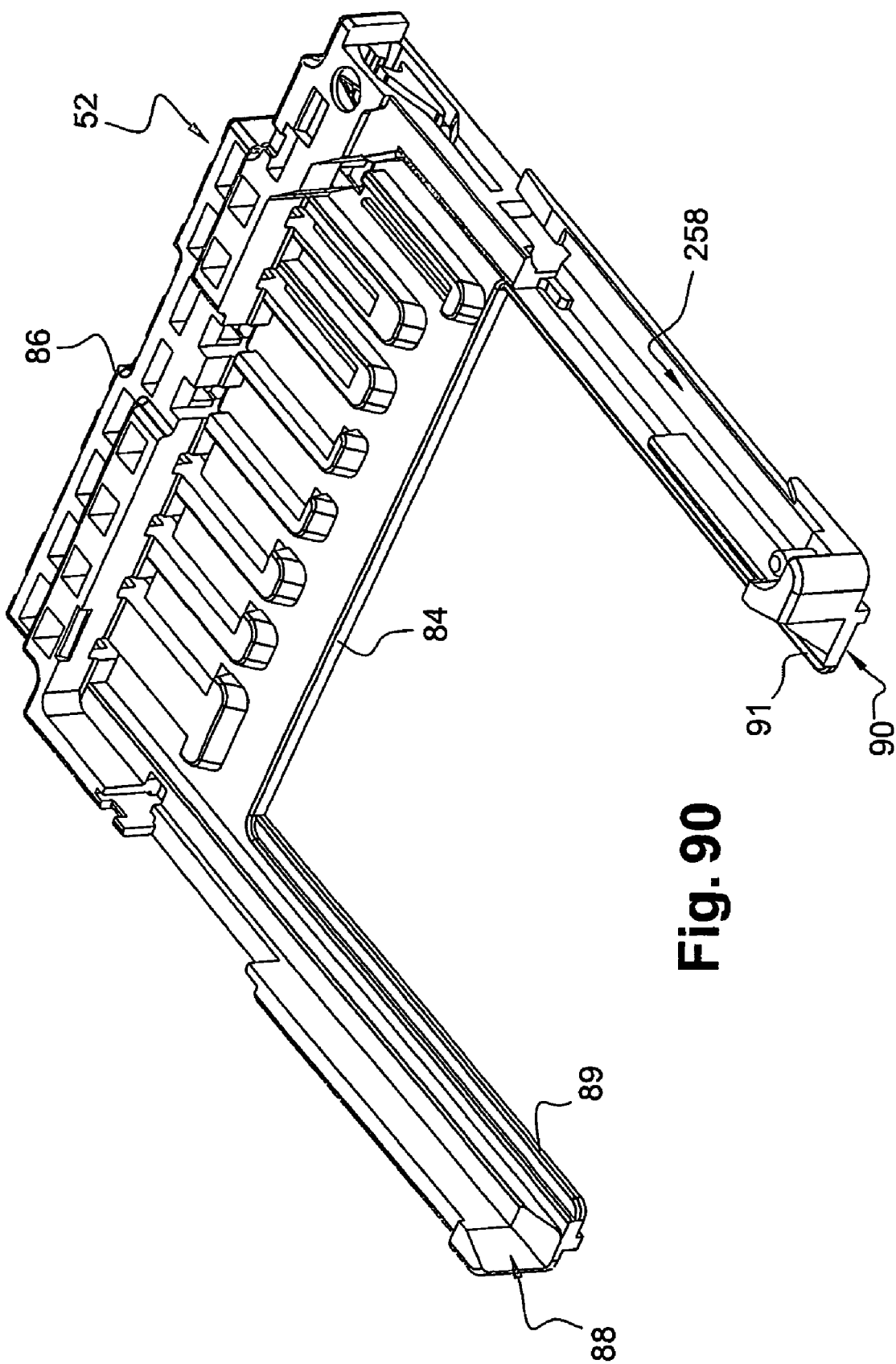
FIG. 90 is a top view of the insulator support of FIG. 89.

Of course, as may be seen in FIG. 82, the tabs 104 do not lie vertically opposite the metal parts of the cover 54.

Figure 93:
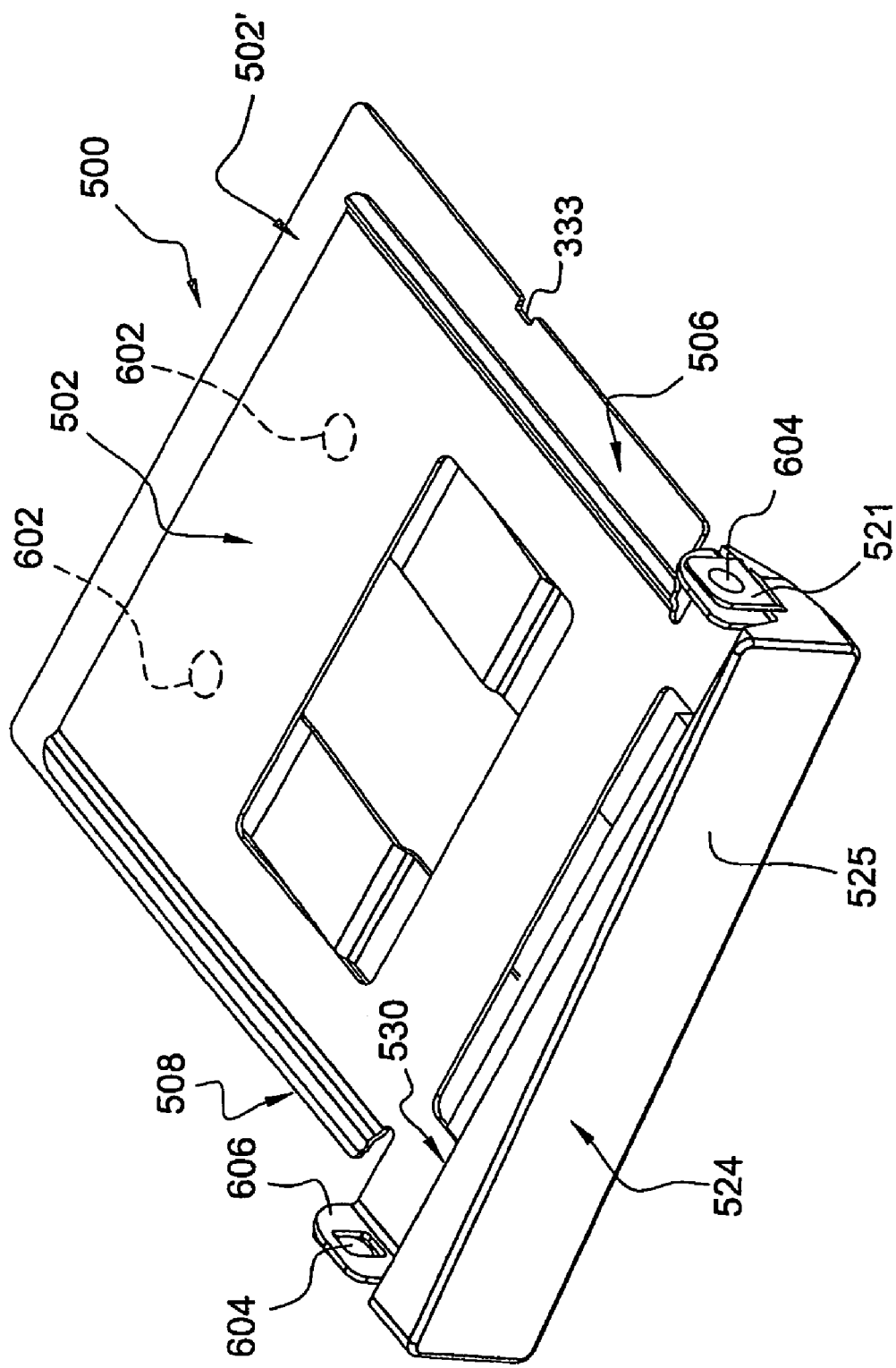
FIG. 93 is a isometric view of the slider in two parts with its gate, or bar.
Figure 94:
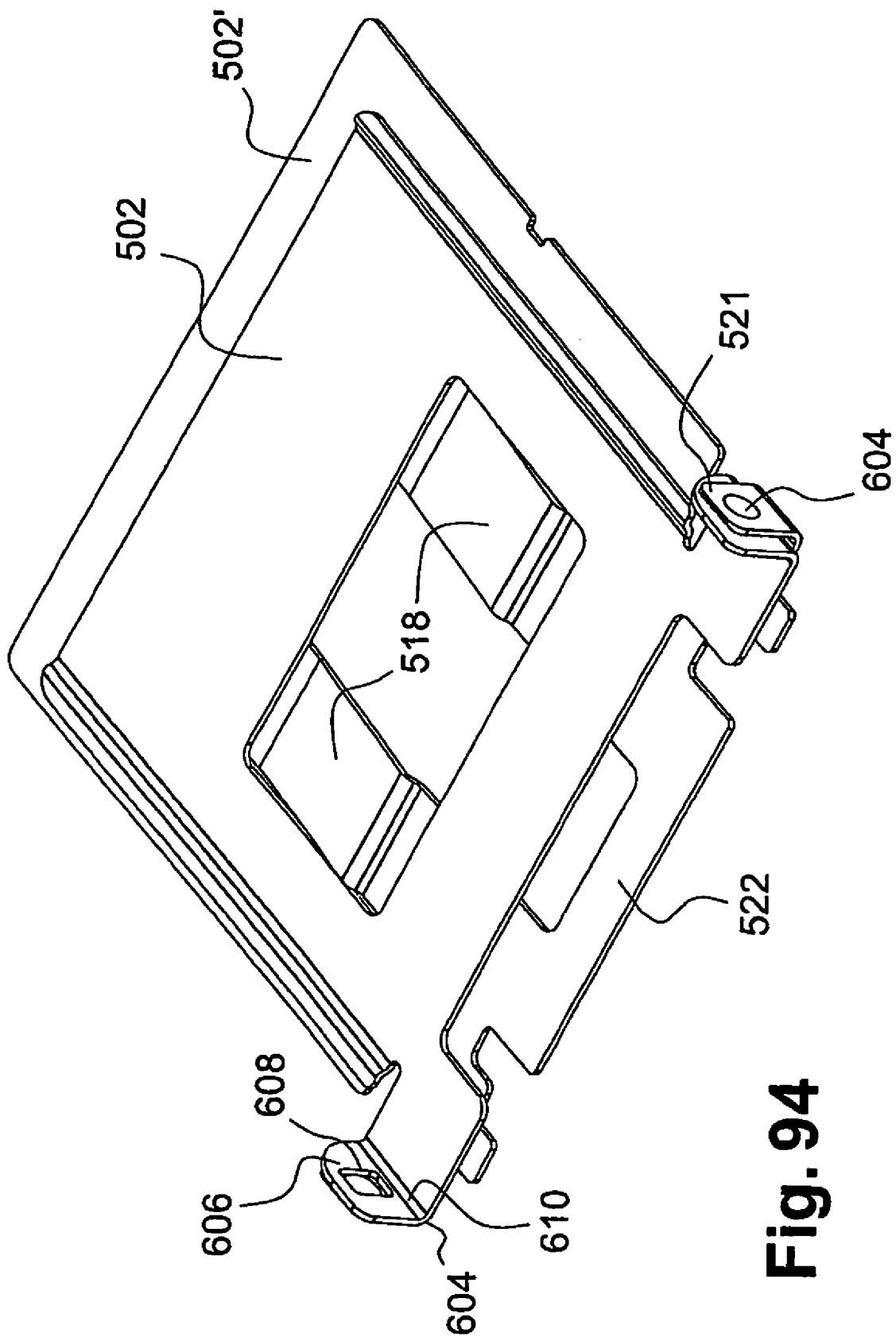
FIG. 94 if a view similar to the previous one, which illustrates the slider without the gate.

In this embodiment, the body of the slider 500 consists of two superposed plates 502 and 502' which, for example, are backside-welded or adhesively bonded in regions 602 (FIG. 93). Any other fastening technique may be envisaged, such as riveting, snap-fastening, etc.

The plates thus defined between them two lateral and longitudinal guiding slideways which receive the inner edges of the arms of the connector.

The arms 518 (FIG. 94) here are also very long and extended by the rear transverse bar 522 for fixing the gate 524 (FIG. 93) and by two lateral flanges 521, each having a boss 604 that projects transversely inwards.

Figure 99:
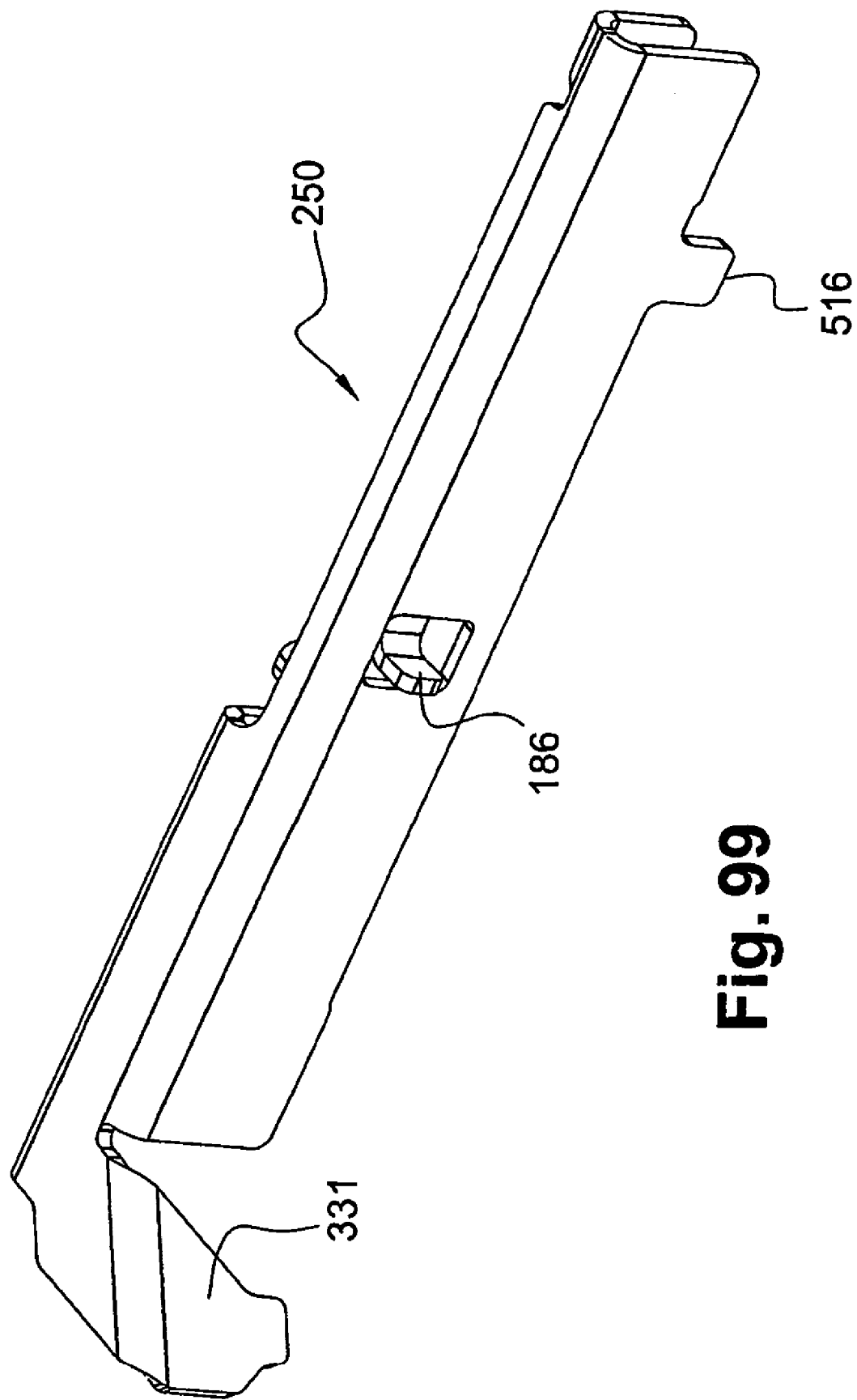
FIG. 99 is an isometric view of the ejection slide, or carriage.

In its right longitudinal lateral edge, the lower plate 502' has the coupling hole or notch 333 that takes the coupling finger 516 belonging to the ejection carriage 250 which, as may be seen in FIG. 99, is produced here near the rear longitudinal end of the slide.

To penetrate the notch 333 of the lower plate 502', the finger 516 passes through a longitudinal slot 606 formed in the insulator body 52 (see FIG. 89), the length of which allows the longitudinal displacements or travels of the carriage 250 relative to the insulator body 52.

Figure 95:
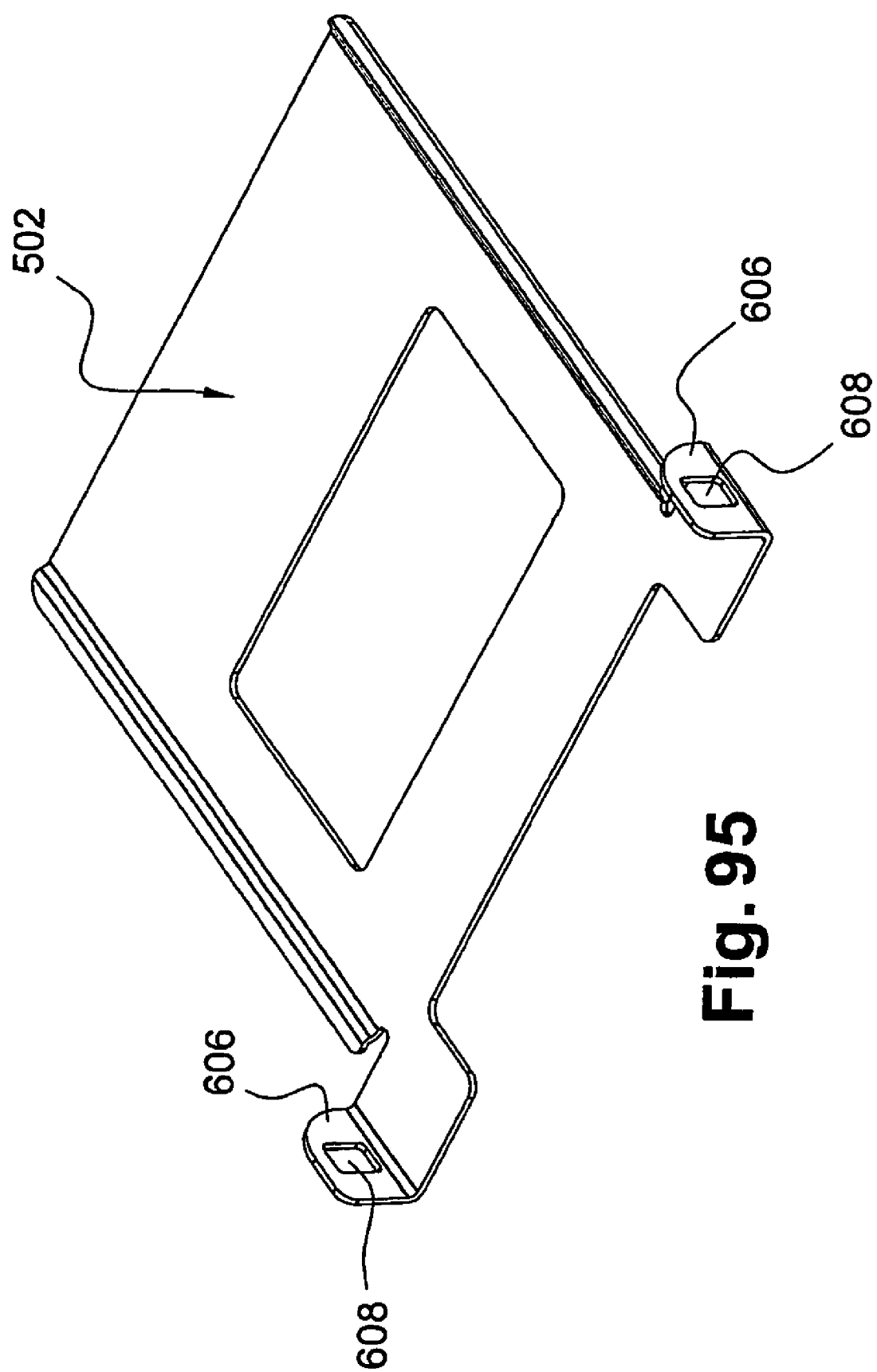
FIG. 95 is a isometric view of the upper constituent part of the slider.

As may be seen in FIG. 95, the upper plate 502 also has two longitudinal vertical flanges 606 that are received between the flanges 521 (FIG. 94) of the lower plate 502', each flange 606 having a window 608 in which an internal boss 604 of a flange 521 is normally housed.

Figure 96:
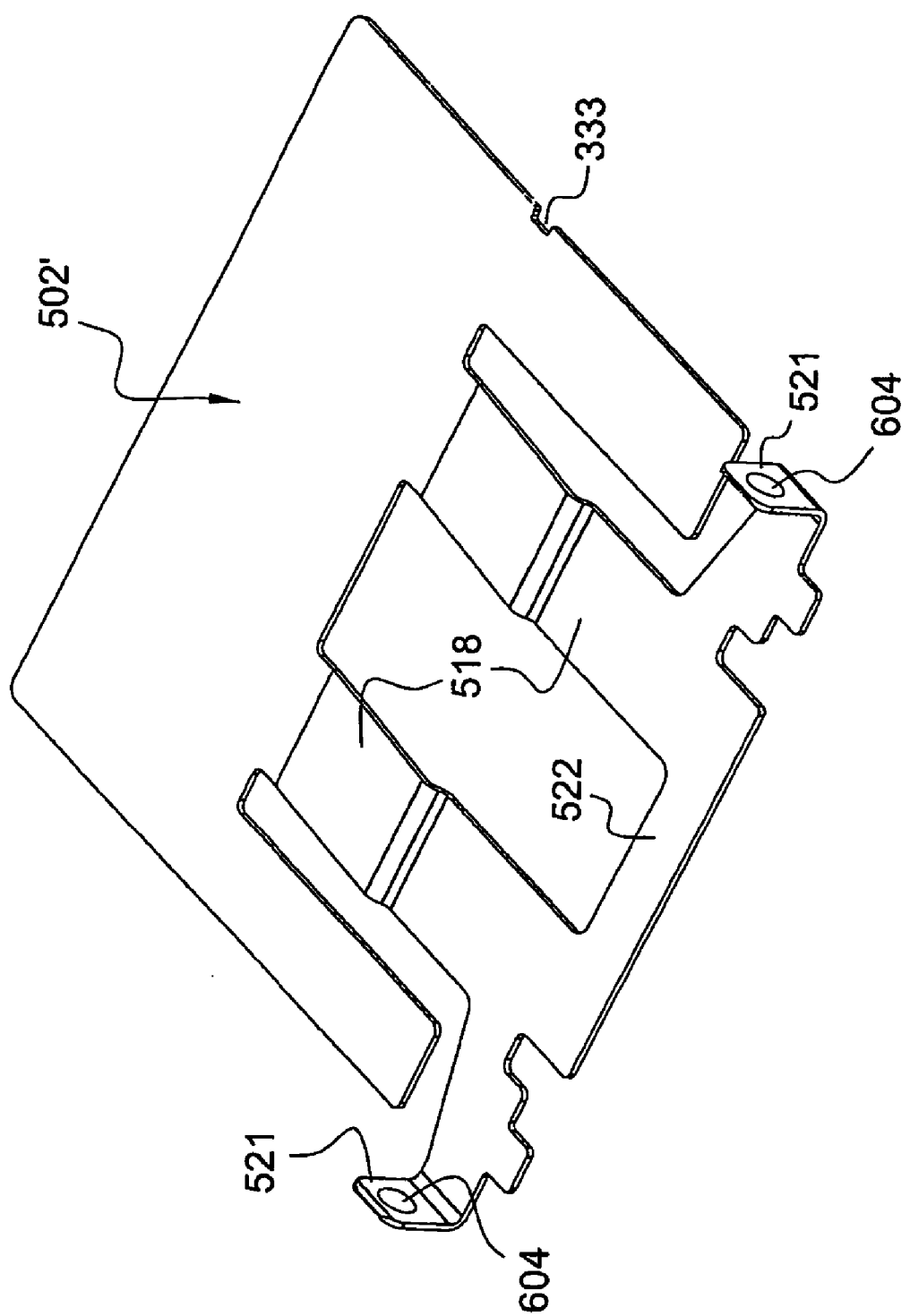
FIG. 96 is a perspective view of the lower constituent part of the slider.
Figure 97:
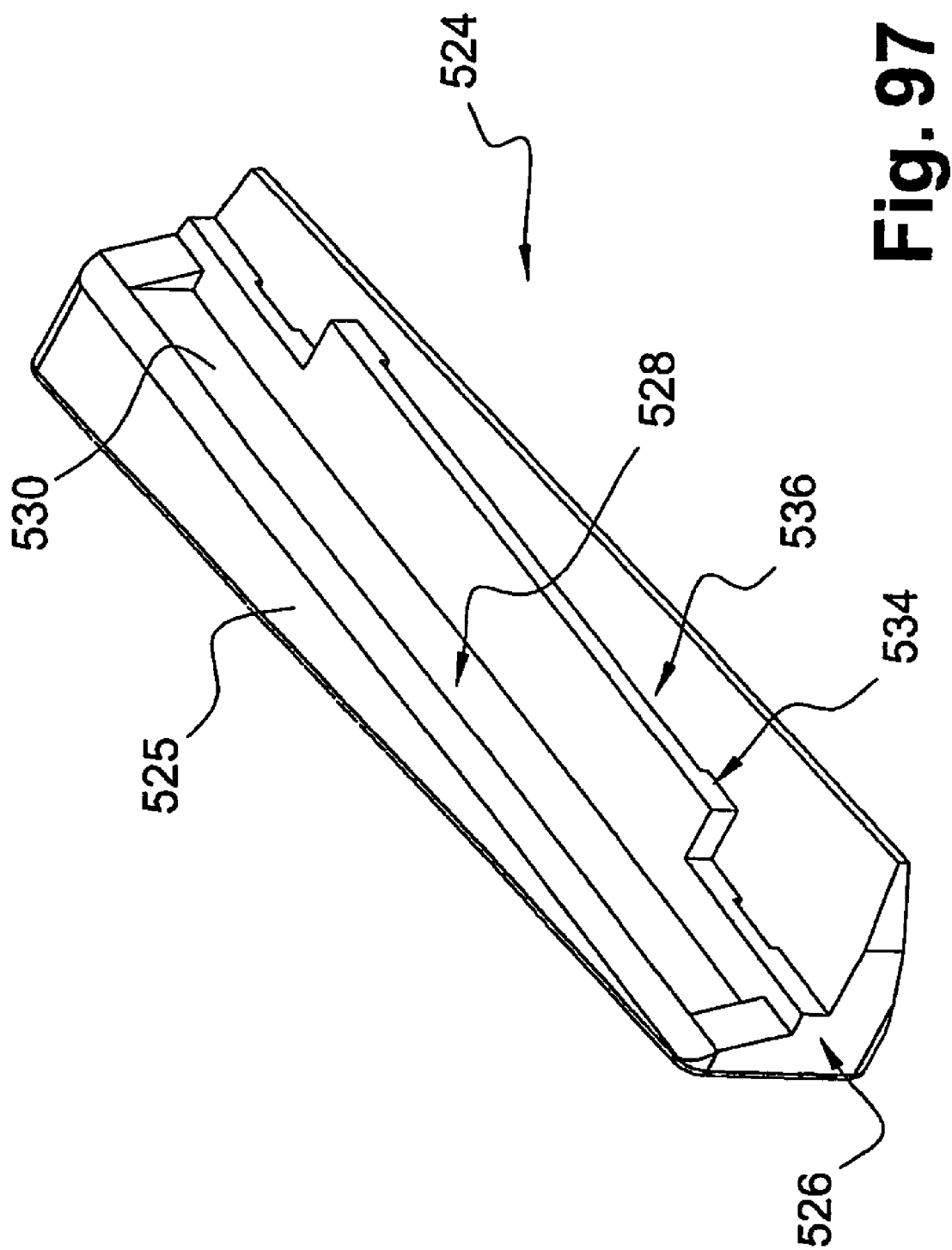
FIGS. 97 and 98 are two isometric views of the gate, or bar.
Figure 98:
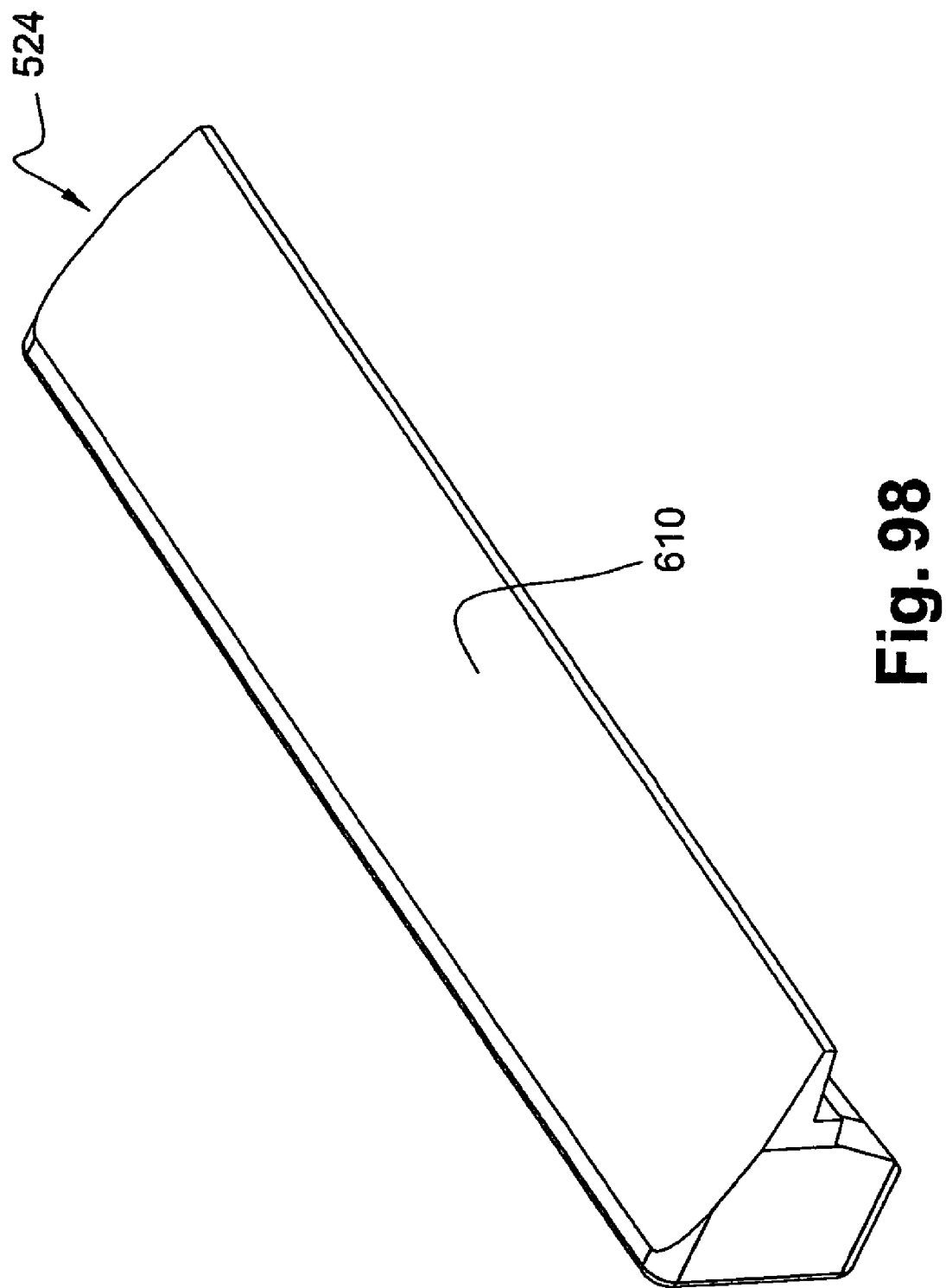

As may be seen in FIGS. 95 and 96, it is possible to lower the gate 524 by bending the arms 518 so that the bosses 604 come out of the windows 608 so as to be positioned beneath the lower longitudinal edges 610 of the flanges 606, thus temporarily retaining the gate 524 in the retracted low position.

This solution is advantageous as it makes it easier to extract the card when it does not have grooves in its upper face.

Figure 92:
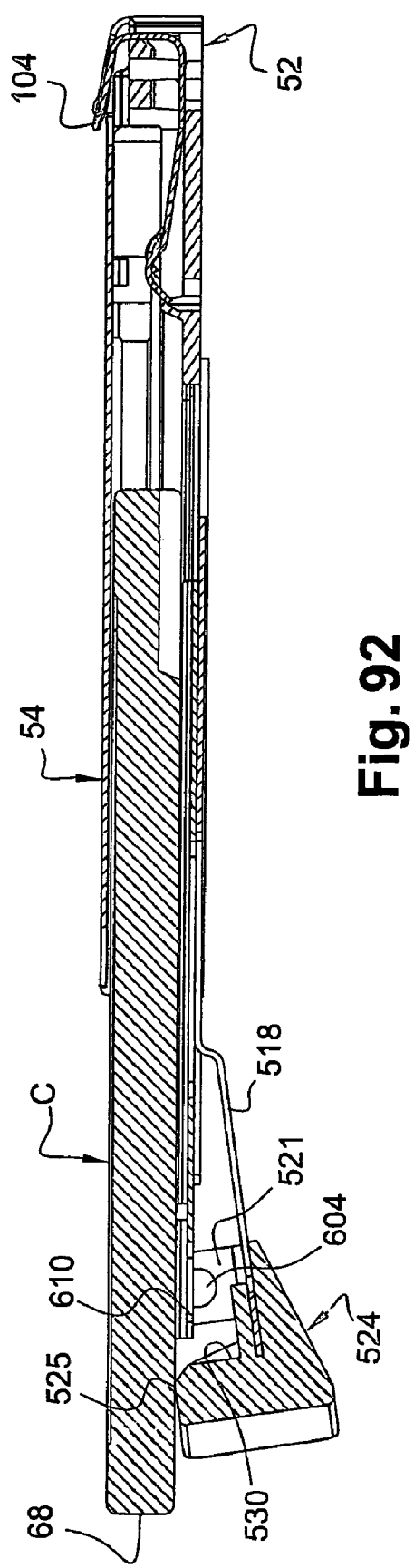
FIG. 92 is a view similar to the previous one with the card in the process of being extracted.

After ejection of the slide and the slider into the rear position, the user therefore starts by lowering the gate down to its blocking position illustrated in FIG. 91, and then extracts the card longitudinally as illustrated in FIG. 92.

When fitting a card, after the connector has been opened, that is to say when the slide and the slider are in the ejected rear position, the gate is normally in the high position with the bosses 604 housed in the windows 608.

The user can either insert the card directly, by pushing gently downwards on the gate, or, beforehand, lower the gate, temporarily blocking it in the low or lowered position as illustrated in FIGS. 91 and 92.

In the event of the gate being blocked in this position when the user closes the assembly, he pushes the gate forwards, the gate having an inclined lower ramp 610 that cooperates with a portion (not shown) of the electronic equipment fitted with the connector so as to act as a cam profile that automatically raises the gate with re-engagement of the bosses 604 in the windows 608.

The overall design according to the invention of a retractable mounted gate may, of course, be applied to a connector for a large SIM card having security-protected data stored in its chip.

The design according to the invention provides for a complete autonomous module that groups together the functions of card connector, card-holder carriage with push on/push off locking and unlocking, and gate for closing off the slot in the electronic equipment in which the module is mounted.

In addition, as explained above, the module allows the card to be removed according to a cycle comprising two separate and consecutive controlled steps. During the first step, the user ejects the card-holder carriage with the card, which remains in place in the carriage. During the second step, the user ejects or extracts the card from the slider, in which it was retained by the retention bar.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A smart card connector which has a housing that forms a card-receiving slot that receives a card by sliding the card forwardly into the slot, the connector including a slide assembly that is slideable in forward and rearward directions on said housing, an assembly spring that urges the slide assembly rearward, the slide assembly having a branch that presses against a front of the card so forward movement of the card moves the slide assembly forward and so that the slide assembly pushes the card rearward when released to do so, wherein:

said slide assembly includes a card-holding slider with a rear end having a retention bar which is urged upward toward a retention position wherein a front surface of the retention bar lies directly behind the slot to abut the card rear end, the retention bar being downwardly deflectable to a release position wherein the bar lies lower than in said retention position to allow the card to move largely rearward of the bar and out of the card-receiving slot.

2. The connector described in claim 1 wherein said housing includes an insulative support and a plurality of contact blades on said support to engage contact pads of a fully installed card, said card has a predetermined length in forward-rearward directions, said slider is slideable between a fully installed forward position wherein said contact blades engage contact pads of a fully installed card, and a retracted position that is rearward of said fully installed forward position by at least one-half centimeter; and including means for supporting said retention bar against downward deflection in said forward position of said card-holding slider and for allowing such downward deflection when said card-holding slider reaches said initial retracted position.

3. The connector described in claim 1 including:

a card biasing spring that is mounted on said slider assembly and that urges a card on the slider assembly against the front surface of the retention bar.

4. The connector described in claim 1 wherein:

said slider includes a resilient sheet that lies at the bottom of said card-receiving slot and that has a sheet rear part that is bendable about a lateral axis that is perpendicular to front and rear directions, and said retention bar is attached to a rear end of said resilient sheet rear part.

5. The connector described in claim 4 wherein:

said resilient sheet rear part forms a pair of laterally spaced flat resiliently bendable arms.

6. The connector described in claim 4 including a plurality of contact blades mounted on said insulative support, said contact blades having pad-engaging ends for engaging contact pads on the smart card, said pad-engaging ends lying in a predetermined pad-engaging end region in said card-receiving slot, and wherein:

said sheet has a front guiding part that lies under said pad-engaging end region and that is slideable in front and rear directions.

7. The connector described in claim 1 wherein:

said support has a pair of rear extensions with rails lying under laterally opposite sides of said card-receiving slot;

said slider comprises a piece of sheet metal with a part that lies at the bottom of said card-receiving slot, said piece of sheet metal having a pair of laterally opposite short arms with tabs bent about 180° to form slideways, with said rails each lying in one of said slideways.

8. The connector described in claim 7 wherein:

said retention bar has a card abutting front surface of a height less than the thickness of the card, and said retention bar has a ramp that extends at a rearward-upward incline from a top of said card abutting front surface.

9. The connector described in claim 1 including:

a latch that holds said retention bar in said downward release position when the retention bar is downwardly deflected while the slider assembly lies in a rearward retracted position; and until the retention bar is forced upward toward said retention position.

10. A smart card connector which has a housing that forms a card-receiving slot that receives a card that has upper and lower faces by sliding the card forwardly into the slot, the slot having a small vertical thickness and having a lateral width that is a plurality of times as great as said thickness, the connector including a slide assembly that is slideable in forward and rearward directions, the slide assembly having parts lying respectively forward and rearward of a card so the slide assembly and card move forward and rearward together, wherein:

said slide assembly includes a card-holding slider in the form of a plate with a center plate region that lies facewise against a lower face of a card that lies in said card-receiving slot, and a carriage that lies beyond a lateral side of said slot, both said slider and said carriage being slideable by limited distances in front and rear directions on said support;

a spring that urges said carriage rearward;

a double click mechanism connected to said housing and to said carriage which alternately latches said carriage in a forward operating position and releases said carriage to move rearward, when the carriage is repeatedly pushed forward by a small distance that is no more than 5 mm;

said slider and said carriage are independently slideably mounted on said housing, but are coupled so said slider and carriage slide forward and rearward together.

11. The connector described in claim 10 including:

a retractable bar connected to a rear end of said slider, and wherein:

said plate of said slider has a rear portion that is bendable about a lateral axis to lower and raise said retractable bar between a raised position wherein said bar lies against a rear edge of a card in said slot and a lowered position to allow the card to be moved largely rearwardly out of the connector.

12. The connector described in claim 10 including:

a retainer bar connected to a rear end of said slider, said bar having a card-abutting lower surface of a height that is less than the thickness of said card and that abuts the rear edge of a card lying in said slot;

said retainer bar forming a ramp that extends at a rearward-upward incline from the top of said card-abutting lower surface, to allow the rear end of the card to slide up along the ramp.

13. The connector described in claim 10 wherein said housing includes a lower insulative support and wherein said connector includes a plurality of contact blades mounted on a region of said insulative support, wherein:

said insulative support forms a recess under said mid region;

said plate has a front guiding region that lies below the level of said center plate region and that lies in said recess under said mid region of said support.

14. The connector described in claim 10 including two rows of blade contacts with upwardly projecting ends, and wherein:

said plate is of sheet metal and includes a switch plate part that engages a blade contact end in each of said two rows and disengages them, as the slider slides between forward and rearward positions.

15. A smart card connector which has a housing that forms a card-receiving slot that receives a card by sliding the card forwardly into the slot, the connector including a slide assembly that is slideable in forward and rearward directions on said housing, the slide assembly including a carriage that lies beside said slot and that is guided in forward and rearward sliding by said housing, a spring that urges the carriage rearward, and a double click mechanism that latches the carriage in a forward position and releases the carriage to move rearward when the carriage is pushed forward against, including:

a slider that includes a resilient sheet that lies directly under the card-receiving slot to support the card, and that has a retention bar that lies at the rear of the slider and that abuts the card, the slider being connected to the carriage so they move forward and rearward together, and the resilient sheet being bendable to lower the retention bar.

16. The connector described in claim 15 including an item of electrical equipment that has slot walls forming an equipment slot, and wherein:

said retention bar lies in said slot and adjacent to a lower one of said slot walls in the forward position of the slide assembly, and said retention bar projects at least partially rearwardly out of said slot in the slide assembly release position.

\* \* \* \* \*